United States Patent [19]

Beatty et al.

[11] Patent Number: 4,562,550

[45] Date of Patent: Dec. 31, 1985

[54] REMOTE LOAD CONTROL RELAY PROCESSOR

[75] Inventors: Robert M. Beatty, Warwick; Paul G. Huber; Edward B. Miller, both of West Warwick, all of R.I.

[73] Assignee: General Electric Company, Bridgeport, Conn.

[21] Appl. No.: 547,619

[22] Filed: Nov. 1, 1983

[51] Int. Cl.$^4$ .................................................. H02J 3/10
[52] U.S. Cl. ...................................... 364/492; 364/483; 307/39
[58] Field of Search ............................. 364/492, 493, 483; 307/38, 40, 113, 115, 140, 39, 107; 340/310 A, 825.06, 825.07

[56] References Cited

U.S. PATENT DOCUMENTS

| | | | |
|---|---|---|---|
| 4,153,936 | 5/1979 | Schmitz et al. | 364/493 |
| 4,167,786 | 9/1979 | Miller | 364/493 |
| 4,168,531 | 9/1979 | Eichelberger et al. | 364/900 |
| 4,173,754 | 11/1979 | Feiker | 340/310 A |
| 4,185,272 | 1/1980 | Feiker | 340/168 R |
| 4,196,360 | 4/1980 | Miller et al. | 307/270 |
| 4,213,182 | 7/1980 | Eichelberger et al. | 364/493 |
| 4,264,960 | 4/1981 | Gurr | 364/493 X |
| 4,347,575 | 8/1982 | Gurr et al. | 364/492 |
| 4,348,668 | 9/1982 | Gurr et al. | 364/493 X |
| 4,367,414 | 1/1983 | Miller et al. | 307/38 |
| 4,396,844 | 8/1983 | Miller et al. | 307/39 |
| 4,425,628 | 1/1984 | Bedard et al. | 364/900 |
| 4,484,258 | 11/1984 | Miller et al. | 364/492 X |

Primary Examiner—Edward J. Wise
Attorney, Agent, or Firm—Cushman, Darby & Cushman

[57] ABSTRACT

An improved relay actuating processor for a system that remotely control distributed electrical loads. The relay module is a part of a transceiver decoder that receives commands from a central controller for controlling the state of latching relays for controlling the power circuits of the loads. The improvements include: the use of a progressively variable pulse length relay actuation signal to shorten perceived response time; the provision of automatic power and reset detective and annunciation; a matrix arrangement for pulsing relays that minimizes the number of relay drivers required for a given number of relays to be controlled; utilizing a power clamp limiting circuit for protecting relay drivers from overcurrent; automatic verification of a control actuation command from the central controller; the use of an improved watch dog reset including AC coupling; warning (flicker) mode operation which provides a warning that lights in a given area will soon go off; and a multi-mode reset arrangement permitting the automatic testing of relays.

13 Claims, 53 Drawing Figures

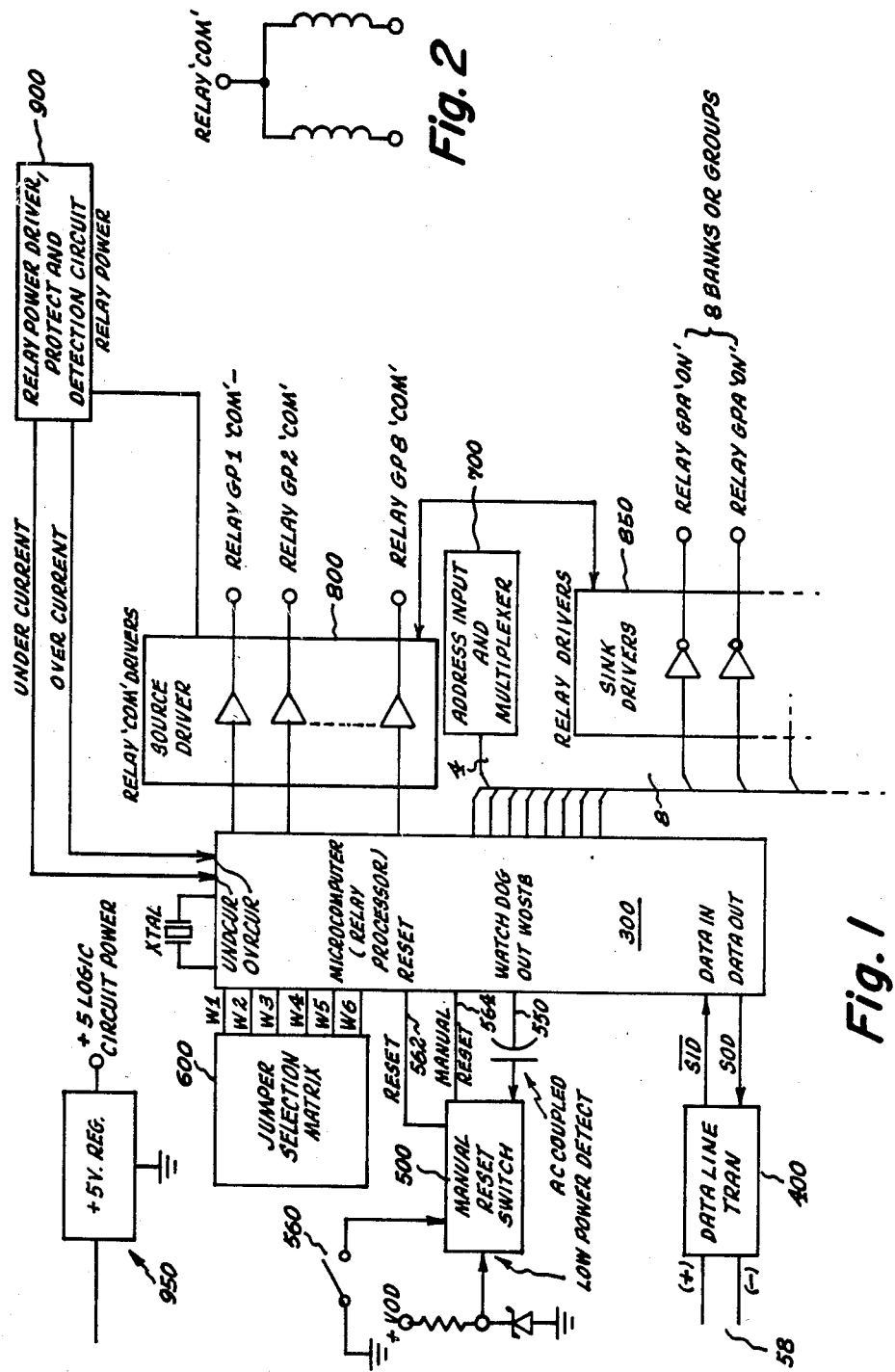

REMOTE LOAD CONTROL RELAY PROCESSOR

BACKGROUND OF THE INVENTION

There has been developed a system for remotely controlling electrical loads distributed over a wide area (such as a large office building or factory) from a microprocessor based central controller. That system is disclosed in U.S. Pat. No. 4,367,414—Miller et al, issued Jan. 4, 1983. The information disclosed in that patent is incorporated by reference thereto as if fully set forth herein. In the Miller '414 system, control instructions are issued by the central controller 50 and are transmitted to various transceiver-decoders 56 via a twisted pair cable 58 constituting a bidirectional communications channel. A particular transceiver-decoder that is "addressed" carries out the command by actuating one or more particular relays to make or break an electrical connection as desired. The central controller issues its control instructions in accordance with a predetermined schedule, in response to a measured parameter (such as light level or temperature) or in response to a user switch actuation sensed by a switch processor in the transceiver decoder and transmitted to the central controller over the bi-directional communications link, or in response to a user command telephonically transmitted to the central controller.

Although the Miller '414 system operates effectively as disclosed, further enhancements are now possible. This patent is directed to improvements in the transceiver-decoder, particularly to a relay control module for energizing remote control relays.

The enhanced transceiver-decoder is configured in a modular fashion. Separate switch and relay "modules" are provided to allow a user of the product to configure a remote control panel to meet his specific application needs. This modular construction is field adaptable allowing an electrician who has no electronic expertise to easily install, replace and service the panels. To do this, small modules are developed so that they can be easily handled and configured in the field. Therefore, a reduction in component count over the Miller '414 arrangement is achieved for driving the same amount of remote control relay loads. The response of a transceiver to relay actuation commands from the central controller is improved. The response time is increased to improve human acceptable perception of relay actuation. Furthermore, compensation for parametric shifts in relay characteristics is made to reduce the propensity for perceived failures of the remote control relay. This compensation is made in the actuating signal provided to the relay.

There is also provided improved protection circuitry to insure that faulty relays do not destroy the more expensive electronic modules. Since these remote control relays are actuated by electronic circuitry means, a short in the relay or an external wire can cause excessive current to be delivered causing a self-destruction of the electronic device. A power limiting circuit is needed which reduces this propensity and can annunciate relay faults so they can be traced and quickly replaced. Improved diagnostics is also provided to insure the integrity of the load actuation data base and speed the tracing of system faults.

There is also provided a special warning pulse sequence (flicker or warning mode operation) to warn the remote occupant that lights are about to go off. This will give the occupant time to call the computer to keep the lights on.

SUMMARY OF THE INVENTION

This invention relates to improvements in transceiver-decoders 56 shown in FIG. 1 of Miller '414. Now, each transceiver-decoder has separate processors for carrying out switch functions (sensing a condition charger or a user initiated contact closure and sending a message to central controller 50 and relay control functions (receiving a command from central controller 50 and controlling in response to that command, one or more relays in the power circuits of electrical loads to be controlled.

The transceivers according to this invention have some physical and functional differences from those of the Miller '414 patent. The notable physical and functional improvements are listed below:

Power Supply

A universal power input circuit is provided for all products rated for an input voltage range of 100 VAC to 347 VAC (RMS) at 47 to 100 Hz.

The power dissipation of the transceiver is kept as low as possible to eliminate the need of costly cooling techniques.

Watchdog Reset

A watchdog reset circuit is provided to reset the microcomputer chip in the unlikely event noise causes it to adversely execute erroneous instructions and latchings in a closed loop. The watchdog reset electrically resets the computer causing it to execute a power-up sequence described below.

Relay Control Protocol

The following is the protocol to be used when energizing an RR7 type latching relay on a given transceiver.

Only one relay is to be enabled at any given time. This will ensure the maintenance of proper design margins on the relay driver electronics.

The relays are to be individually pulsed with a minimum of 26 VDC for 3 progressive pulsing cycles as follows:

Cycle #1: 12 msec's per relay
Cycle #2: 24 msec's
Cycle #3: 48 msec's

The progressive control sequence provides the utmost in system throughput while compensating for an inherent failure mode in the relay. Since the nature of the centralized control system is based on specifying the state of all 16 relays of a transceiver, each relay is to be individually cycled in numerical order from number 1 to 16. The first sequencial cycling of these relays is defined as "cycle #1" with the indicate timing above. That is, relay #1 is pulsed for 12 msec's, then relay #2 to relay #16. Therefore, it will take less than 200 msec's to pulse all 16 relays of a transceiver in cycle #1. Since all normal relays will respond in less than 8 msec's, the throughput of the system will be maintained compared to the present product response of 200 to 400 msec's to pulse all 16 relays.

After completing cycle #1 of 12 msec's per relay, cycle #2 of 24 msec's and #3 of 48 msec's are to follow in the same sequence. The auxiliary cycles 2 and 3 are needed to compensate for a shift in the relays operating characteristics. A fault in the relay can be compensated for by increasing the time duration of the energizing pulse to the relays. The auxiliary cycles are an attempt to reduce perceived failures due to relay faults. A relay that fails to operate during cycle #1 may be caught during the longer auxiliary cycles 2 and 3. Therefore, it can take approximately 1.4 seconds to fully complete the cycling of all relays in a 16 relay bank of a transceiver.

For a 32 relay (double address) transceiver, the relay processing is to be delivered in a similar fashion as indicated above. However, to ensure a reasonable system throughout or response an alternating cycling method can be used depending on which address is received first. The addressed that is received first is the one processed first. Once a cycle for a given bank of 16 relays is started, i.e. cycle #1, 2 or 3, the transceiver must complete the cycle before a decision can be made to start cycling the other band of 16 relays. If a subsequent transmission is received for the other bank of relays while the first bank is in a relay processing cycle, the other bank is to immediately start relay processing with cycle #1 upon the completion of the present cycle of the first bank of relays. Once the other bank of relays finishes its first cycle, the next cycle #2 or #3 is to continue on the first bank of relays. This process of alternating relay banks and incrementing to the next cycle continues until both banks have completed all three relay processing cycles.

When processing individual relay commands it is acceptable to use one pulse of 48 msec's in duration per relay.

Relay Driver Circuit Considerations

The relay drivers are derated over the operating temperature range to ensure that a minimum of 20% design margin is maintained. Furthermore, the relay driver circuits are protected against short circuits in relay wiring with the appropriate current limiting to ensure that safe operating limits are not violated. Appropriate noise filtering and static discharge protection must be included in the design to protect the integrity of the transceiver board. Relays can be remotely mounted up to 500 feet away from the transceiver panel via the standard 20 AWG remot control wire.

The following is a list of particular objectives of the present invention relating to the relay module.

1. To provide a pulsed output matrix process for relay actuation. An 8×8 source/sink switching matrix is provided to control up to 32 remote control relays. This allows the energizing of 64 separate coils utilizing just two monolithic integrated circuits. These two circuits contain 8 sink drivers for sinking current and 8 source drivers for sourcing current to each of the selected coils.

2. The pulsed output matrix relay control scheme provides the ability to group two wires with a single source/sink combination selecting one out of the 64 relay coils. Therefore, there are 64 combinations of two wires out of 96 wires chosen by this 8×8 selection matrix. This reduces device count providing a smaller size highly reliable lower cost product offering while allowing modular construction with fewer interconnecting points. The ability to select 2 out of 96 points to control 64 relays is novel and distinguishable over the prior art where individual coils were separately energized.

3. Provide a means to actuate relays utilizing a progressive variable pulse length actuation signal. This progressive variable pulse length signal to actuate momentarily controlled remote control latching relays will provide the utmost in system throughput while compensating for the varying electromechanical characteristics of the relay. The progressive pulse width process impresses a multiplicity of pulses of varying widths to drive a given relay. These pulses compensate for shifts in mechanical characteristics of the relay. The variable length of each pulse cycle, as described below, allows for a fast throughput since all good relays will respond in the first cycle. Those relays that have experienced a parametric shift will be caught in subsequent cycles without penalizing the overall response of the system. Therefore, both short pulses for throughput purposes and long pulses to compensate for shifting relay characteristics are provided to drive the relay to insure the utmost in system throughput and response while reducing the propensity for perceived relay failures. In this manner all 16 relays of a transceiver can be energized with 200 msec. In a 32 relay panel all 32 relays can be energized in 400 msec as opposed to 1.6 sec in the prior art.

4. Provide a staggering relay actuation scheme increasing the response of a double address (32 relays) transceiver module. It is possible for a transceiver to be configured as two logical 16 relay addresses. Since the relay module is physically one device but responding to two unique addresses, as described in the prior art, the throughput of the relays waiting to be processed in the second address often is forced to wait for the completion of the processing of the first address. A staggering of the first cycle of relay actuation has been provided to allow a faster throughput of all relays on a given transceiver panel.

5. To provide a relay actuation power drive clamp and current foldback to protect the driver circuits. The invention provides a power limiting circuit to protect the relay drivers so that they operate within safe operating ranges. This eliminates the need for further heat sinking and provides fault tolerance to handle faults due to installation errors that may result in short circuits on relay driver lines. This short circuit may be caused by installation problems or through faulty controlled devices such as relays. In addition to a power clamp limiting the power delivered to drive the relay a current foldback means is provided to shut off the relay drivers upon the sensing of an over-current condition. The current foldback technique reduces the need for power dissipating elements and further increases the reliability of the driver electronics. Therefore, once a fault is detected it is immediately removed from the circuit. An additional overcurrent and undercurrent sensor is provided to allow the detection and annunciation of relay driver line faults caused by faulty relays or short circuits. This annunciation is available through the central controller means to allow easy and quick fault isolation.

6. To provide an automatic feedback and verification of relay actuation. A means has been provided to verify proper relay actuation at the completion of the relay actuation process. This automatic verification is self-initiated by the transceiver and thereby eliminates the need for polling of relay states by the central controller means. This reduces communication traffic on the data link connecting all transceivers back to the central controller. Furthermore, over-current detection and relay fault detection are also automatically provided and annunciated over the data link back to the central controller so that system problems can be easily traced. Fault detection and traceability are greatly enhanced by this automatic annunciation of relay actuation.

7. To provide an automatic power-up and reset detection annunciation. Upon the application of power or through an internal or externally generated reset the transceiver module immediately communicates its condition back to the central controller means. This annunciation of power-up reset conditions will allow the central controller to correct relay states and insure data base agreement and integrity between the central controller and remotely located transceiver panels. The automatic annunciation of system resets can detect remote use or tampering and provide a self-correcting function insuring that relay states are in the pre-programmed condition. The automatic reset annunciation will further allow the central controller means to detect transceiver malfunctions and annunciate problems. Furthermore, it allows the restoration of the transceiver panels to the proper state.

8. To provide a multi-mode reset for providing power-ON reset, under-voltage detection and clearing, CPU watchdog reset and manually initiated reset of the transceiver electronics and/or relay states. A manually initiated reset is provided to provide a backup control and a circuit checkout function during installation. The manual reset function has 3 basic modes of operation. They are: group ON/OFF control, individual circuit control, and automatic cycling of individual circuit controls. The individual circuit control allows the installer to insure the proper circuit connection to the numbered relays controlled by the transceiver panel. The group ON/OFF control provides the user with the ability to force the relays into a desired state backing up the central controller means. A watchdog reset is provided to force the computing device into a known state. This watchdog reset circuit is initiated after an absence of the sequential device missing a predetermined cycle. Furthermore, an under-voltage detection can also trip this watchdog circuit protecting against erroneous operation during a power brown-out. A reset apparatus is A.C. coupled to detect missing pulses using a hysteresis compensated comparator connected to an oscillator in a wired ORed tied to the under-voltage detection ANDed with the pulse reset input. The A.C. coupling of this watchdog reset function insures that a malfunction of the sequential Mealy-Moore machine will not defeat the reset function since it is independent of the D.C. steady state of the device. Sequential machines would fail to operate in a proper program sequence which would cause its input/output pins to remain in a steady state condition. The prolonged continuous output will trigger the reset.

9. A method by which specified relays would be pulsed off for a short (approx. 1 sec) period then put back on so as to flick the lights warning the occupant of a light shutoff typically 1 minute later.

These objectives are achieved by providing an improved remote load control relay module. The transceiver of the Miller '414 system is modularized with separate switch, relay and power supply modules. This invention relates to the improvements over the prior art in the relay control module known as a transceiver previously disclosed in Miller '414. The invention provides a new method and apparatus to energize remote control relays to increase the system's reliability, lower product cost and increase the overall product's response to control actuation commands. This relay transceiver is configured so as to plug into a mother board of a transceiver-decoder and is capable of controlling 16 or 32 relays. As in the Miller '414 system, the transceiver connects to a low voltage twisted pair data communication line which is routed around a facility connecting the remotely located transceivers or load control processors to the central controller means. The transceiver is responsible for forcing in a relay state as commanded by the central control means. Furthermore, two way communication is provided to insure verification of relay actuation and annunciation of any system faults. In addition to the new relay control process, improved diagnostics are included to provide easy fault isolation, detection and annunciation.

BRIEF DESCRIPTION OF THE DRAWINGS

FIG. 1 is a block diagram of the relay module according to the present invention;

FIG. 2 is a schematic diagram of a latching relay of the type to be operated by the relay module according to the present invention;

DETAILED DESCRIPTION OF THE PREFERRED EMBODIMENT

Figure 3A:
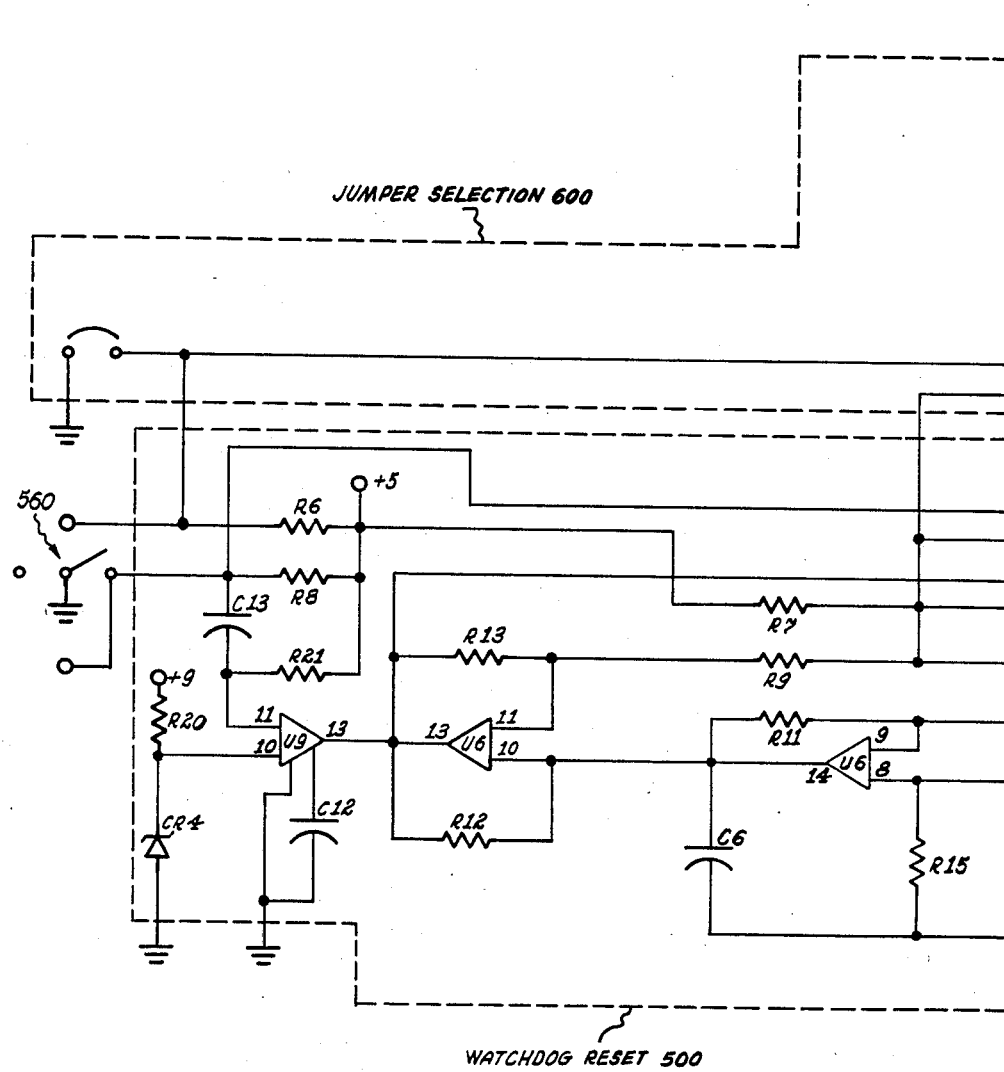
FIG. 3 (including FIGS. 3a-3c) is a schematic diagram of the relay module with the data line transceiver omitted. A schematic diagram of the data line transceiver portion of the relay module can be found in the Miller '414 patent, FIG. 8, incorporated by reference into this application.

Referring now to FIG. 1, there is shown a block diagram of the relay module, also known as a "relay output module", according to the present invention.

The central controller (reference numeral 50 shown in FIG. 1 of the Miller '414 patent) communicates with a plurality of transceiver decoders via a bi-directional communication link. In the preferred embodiment, this bi-directional communication link is constituted by a twisted pair 58 (corresponding to twisted pair 58 shown in FIG. 1 of the Miller '414 patent). A relay processor 300, preferably an 8049 microcomputer, receives commands from twisted pair 58 and sends information to the twisted pair via a data line transceiver 400. Data line transceiver 400 was shown in detail in FIG. 8 of the Miller '414 patent and therefore will not be detailed in schematic form.

Data line tranceiver 400 couples relay processor 300 to the common communication link (twisted pair 58) used to transmit serial data to and from the central controller (not shown but corresponding to central controller 50 in the Miller '414 patent). Data line transceiver 400 contains both a receiver and a transmitter to facilitate bidirectional data communication. Both the transmitter and receiver are optically isolated from any ground reference thereby providing a noise immuned balanced driver capable of rejecting common mode disturbances and receiving differential signals. Serial data is transmitted in a similar fashion as described in the Miller '414 patent and is received from the data line over the SID line. Transmitted, output data is impressed onto the data line via the SOD line.

Associated with processor 300 is a watchdog reset circuit 500 including a watchdog timer 500 and associated circuitry. Watchdog reset circuit 500 is responsible for causing or generating a reset pulse to processor 300 under the following conditions:

A. Power on: when power to the system is first applied.

B. Low power: when the power to the system falls below a predetermined operating voltage.

C. Watchdog Time-Out which results when the processor 300 fails to retrigger the watchdog timer 550 within a predetermined time interval. The trigger to the watchdog timer is reset every time processor 300 causes a pulse on the watchdog out line. This line is AC coupled to the watchdog circuit to insure only transitions cause a reset. By forcing processor 300 to pulse its watchdog output line, it is insured that the system will remain in a deterministic state. If for any reason processor 300 fails to reset the watchdog timer within a predetermined time interval, timer 500 will force a reset on the rest line of processor 300 in an attempt to restart it. This will self correct the system to a deterministic state reducing the system's vulnerability to spurious signals.

D. Manual Reset Switch: There is provided a manual reset switch 560 which when activated causes a reset pulse to appear on a reset line 562 and a manual reset line 564. Processor 300 can execute one of three reset modes or sequences determined by the manual user. A reset pulse is generated periodically until the watchdog reset signal appears acknowledging the proper operation of processor 300. After a reset, processor 300 will enunciate the occurrence on the data line.

A jumper selection matrix 600 is used to select an operating mode of a relay module. This allows a multiplicity of functions to be achieved with essentially one apparatus configuration. By the use of the jumper selection matrix 600, the apparatus can be particularly configured for a special application. The jumpers are:

W1 (not applicable)
W2 (not applicable)
W3 (not applicable)
W4 (communication, new or old format)
W5 (not applicable)
W6 (16 or 32 relays).

An address input multiplexer 700 provides for the multiplexing of address bits into processor 300. This allows the multiple use of a common set of input/output lines to processor 300.

Relay source drivers 800 and relay sink drivers 850 together constitute the driver circuitry for operating latching relays ultimately controlling the distributed electric loads. Drivers 800 and 850 provide a multiplying matrix used to energize 2 out of 96 relay lines from an 8×8 driver circuit. This reduces the number of costly interconnections and driver electronics necessary to energize the bank of 32 latching (3 wire) relays. (It is contemplated that the relay driver circuitry will operate latching reays of the type showing schematically in FIG. 2.)

There is provided relay power, driver protect and fault detection circuitry 900. This circuitry regulates the power delivered to the relays. It provides current limiting to protect the relay driver electronics from shorted relays or faults. It also flags processor 300 to alert it to fault conditions on the under and over current lines so that the processor can immediately shut off relay drivers 800 and 850 to avoid damage and reduce the need for heat sinking of the driver electronics. Furthermore, processor 300 will enunciate any system fault over the data line.

There is further provided a five volt regulator 950 for supplying power to the logic circuits.

Relay processor 300 functions as a sequential logic machine that is configured by firmware to perform all the control and communication processes discussed above.

Figure 3B:
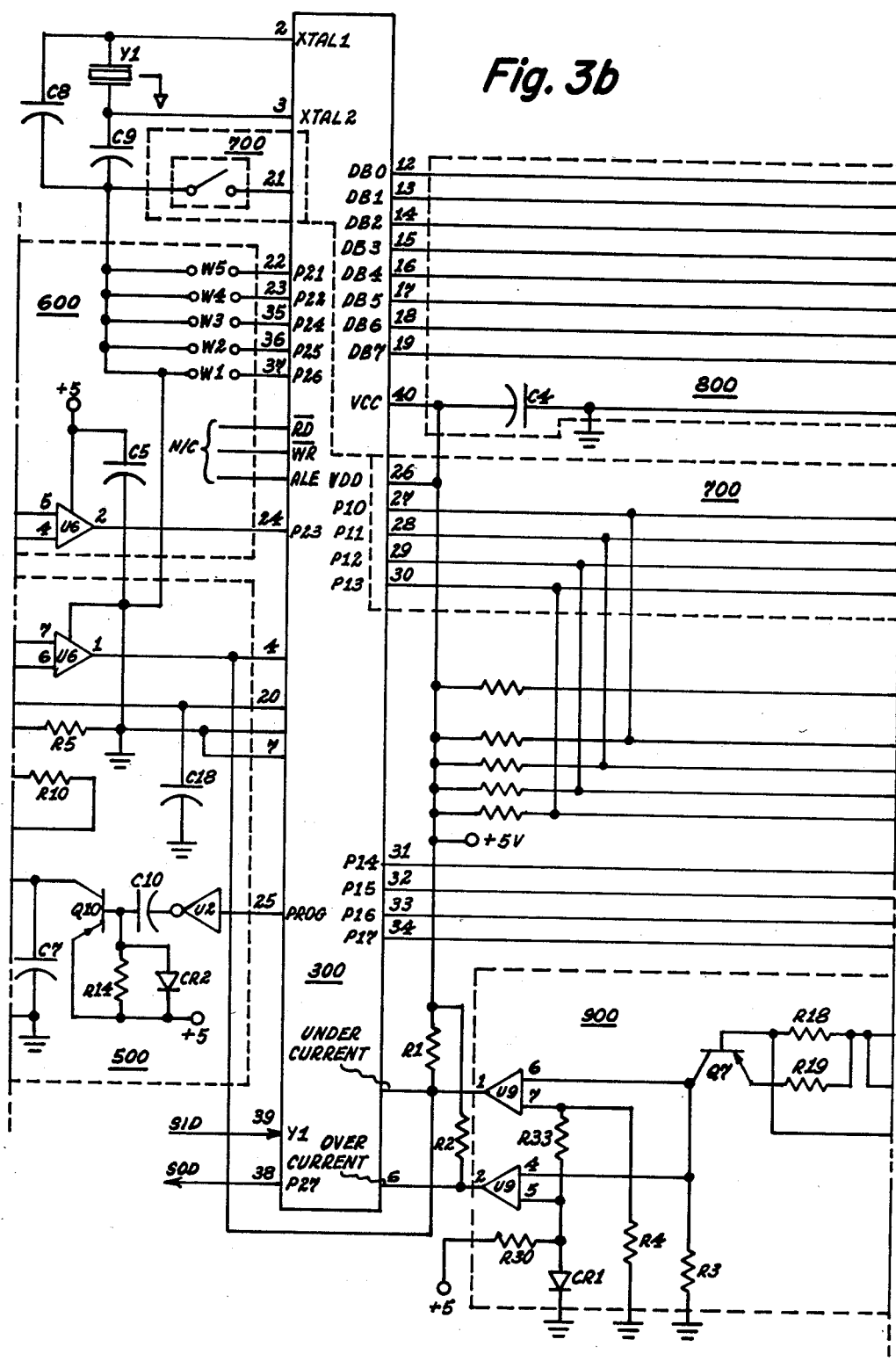
Figure 3C:
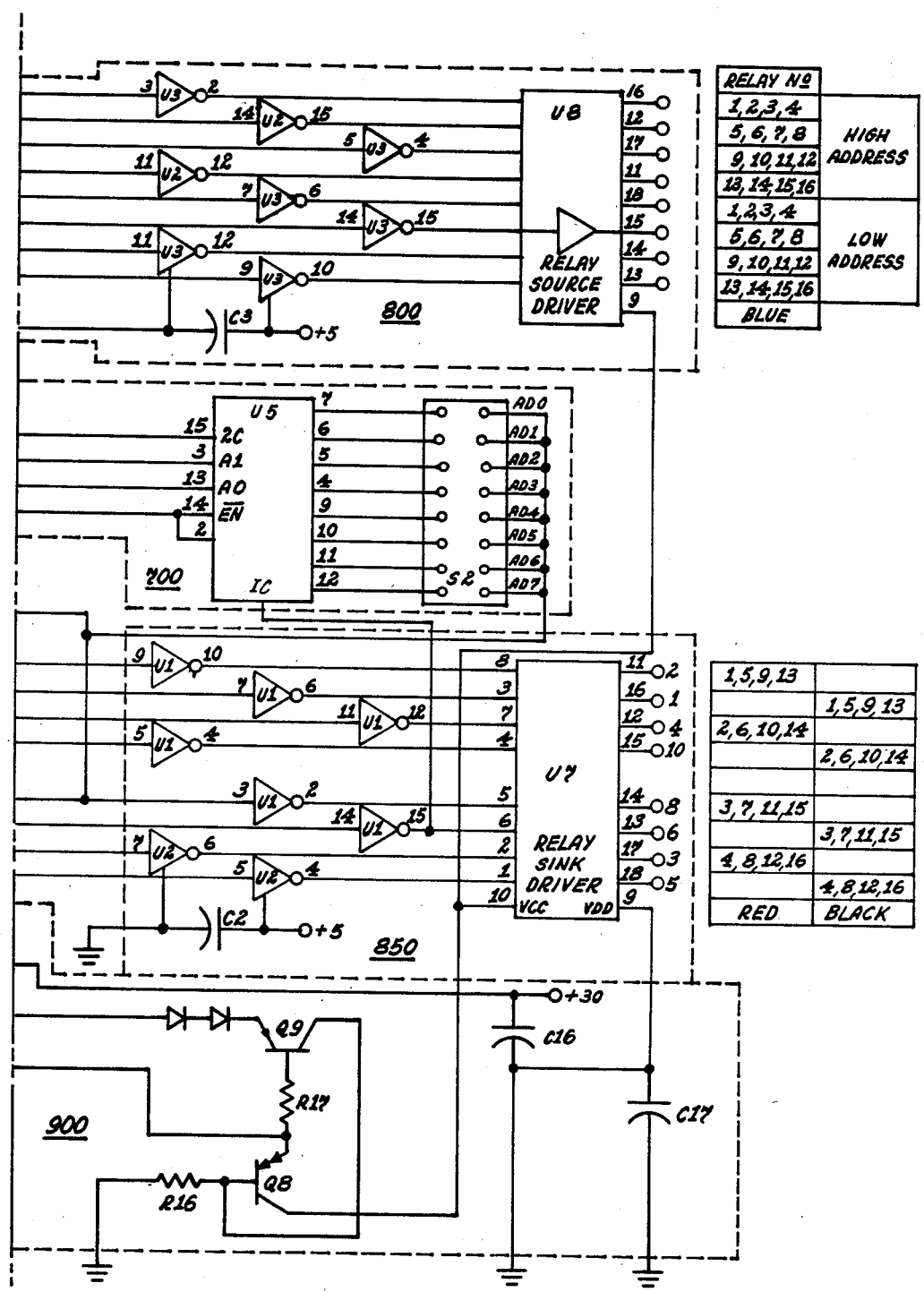

Referring now to FIG. 3 (including FIGS. 3a–3c) there is shown a detailed schematic diagram of the relay module shown in block form in FIG. 1.

Watchdog Circuit 500

Watchdog reset circuit 500 has several functions. The first function is a power-on reset function. The second function is a voltage monitoring function that holds processor 300 in reset whenever its power goes below predetermined limits. The third function is to act as a watchdog for processor 300. In normal operation, processor 300 will send a string of signals through its Pin 25, the Prog pin, to constantly reset an RC combination. Should the microprocessor get hung up in an endless loop, or get "lost" in its program, the RC combination will time out and provide a series of reset pulses to processor 300, allowing the system to restart without manual intervention by the customer. The watchdog sequence starts with pulses appearing on processor Pin 25. This pin is under software control in the processor. It is directly connected to Pin 9 of U-2 which is an inverter. Inverter U-2 in this case is used as a buffer. This buffer drives C-10, a 470 picofarad capacitor which in turn drives the base of Q-10 a 2N2907. When processor 300 signal goes high causing the inverted buffered signal to go low, the base of Q-10 conducts current pushing a pulse of current into C-7 through the collector of Q-10 and charging C-7. R-15 is the constant determining resistor. The combination of R-15 and C-7 determine how often the pulses must come from the microprocessor to prevent a watchdog reset. In this case, the time constant is 100 milliseconds. R-14 is connected across the base emitter junction of Q-10 and serves to turn off Q-10. CR-2 provides a current path to the current on C-10 when the signal from the buffer inverter is a high level going signal. The primary purpose of C-10 is to provide DC isolation of the reset signals from the microprocessor. In this type of coupling it is not the absolute level of the signal from the microprocessor that determines when a watchdog reset occurs, rather it is the period between transitions of the microprocessor signal that determines when a watchdog reset will occur. Assuming a high level voltage on C-7, R-15, this high level voltage appears on the minus input Pin 8 of a comparator U-6. Since the minus input is at a higher voltage than the positive input, then the output of this comparator will be low. This low level signal is directly connected to the minus input of comparator input Pin 10, another section of U-6, and since in this case the minus input is less than the positive input, the output of this comparator section on Pin 13 will go into the high impedance state allowing R-13 to pull up the reset line, although delayed by C-18. C-18's prime function is to provide a power-on reset. It will hold the processor invest upon the event of power-on for approximately 500 milliseconds. Should the watchdog pulses cease to occur, Q-10 will stop charging C-7; C-7 will discharge thru R-15 and the voltage on Pin 8 will drop below the voltage on Pin 9 of the comparator, forcing Pin 14 into a high impedance state. R-12 will charge C-6 until the point that the voltage on Pin 10, the minus input of the comparator, will exceed that of Pin 11, the positive input of the comparator. The comparator will then clamp low on the output Pin 13 and put the processor into a reset state. It will be held in that reset state until R-12 discharges C-6. This time constant is approximately 20 milliseconds. Thus when the processor fails to give watchdog pulses, the reset line will be given a series of 20 millisecond reset pulses. The rise time on this reset pulse will be determined by R-13 and C-18 and will be very slow as a result. This is of no consequence to the processor which has built in reset hysteresis. R-10 and R-11 provide hysteresis in the comparator circuit for the RC time constant just as R-9 and R-13 provide the hysteresis for the oscillator function. The savings of two resistors was achieved by using R-7 and R-5 combination as a voltage reference. This provides the voltage reference of approximately 2.5 volts and is used in several instances. The low voltage reset circuit operates using R-20 and CR-4 as a 4.3 volt reference into the comparator U-9. This voltage reference is fed into a minus input Pin 10 and is compared to the 5 volt supply of the processor on Pin 11, the positive input. When the processor supply drops below 4.3 volts, the processor is held in reset through this comparator output Pin 13. In this module a reset can also be manually initiated by pushing on the reset button which is coupled through the voltage monitor circuit via C-13. Thus pressing the reset button puts a low level signal on C-13 and pulls Pin 11 the positive input of the comparator to a low level, generating a reset pulse to processor 300. The processor can distinguish this pulse from a watchdog pulse because this signal is also fed to the positive input Pin 7 of U-6 whose output drives Pin 1 of the processor 300. Processor 300, by monitoring this Pin 1, can tell whether a reset was initiated by the watchdog circuit or by manual intervention. The timing of this reset pulse is not critical and is determined by the C-13, R-21 combination which provides a 1 millisecond pulse to the reset line. Minus input of this reset button comparator is tied to 2½ volt reference previously mentioned. The output of this comparator is called the relay-bar output.

Jumper Select Section of the Relay Module 600

The only jumper allowed to go offboard is the size-select jumper. Since it is going offboard, it must be buffered and is buffered using a comparator Pin 5 positive input on U-6 with a pull-up resistor R-6. The minus Pin 4 is connected to the 2.5 volt reference. The Pin 2 the output of this comparator is fed to Pin 24 of processor 300. When no connection is made to Pin 5 of the comparator, Pin 2 of the comparator feeds the microprocessor a high level. This indicates a 32 relay module. When the jumper is installed to ground on Pin 5, Pin 2 also goes low indicating a 16 relay module. The other jumpers use the internal pullups of processor 300 and are activated by putting jumpers to ground. The first jumper is called the feature jumper. The second jumper W-2 is not used. The third jumper W-3 is the type jumper. The fourth jumper W-4 is the communications mode jumper and the fifth jumper is not applicable to the relay-only module. With the relay-only module all jumpers are omitted. One other connection is made to this same port is using a dip switch and is address bit 8 of the address select. It feeds Pin 21 of processor 300. C-8 and C-9 are the start-up and harmonic filters for the crystal Y-1.

Address Decode Circuitry 700

The address decoder circuit 700 decodes the address bits one at a time using a 74LS156 as a decode mechanism. The 74LS156 is used in the dual two-line to four-line decoding mode. This is necessary because it shares control lines with the relay sink driver U-7. Pins 3 and 13 are used as the data input while Pin 15, Pin 1, and Pin 2, Pin 14 connected together are used as enable lines. Using these three lines of control enable allows the multiplexing of control information and address information. The combination of Pin 2 and 14 can be viewed as an overall chip enable. It is active low. Pin 1 can be viewed as the enable pin for the first two-line-to-four-line converter. It is active high and enables the outputs on Pins 7 through 14. The second two-to-four converter enable pin is Pin 15 and is active low. In order to determine which address lines are set on the dip switch pull Pin 2 and 14 low and then choose one of the two banks of two-to-four converters. For example, one might put Pin 1 high enabling the first bank of two-to-four conversion. If then both Pins 2 and 13 were zeroes, that is low levels, then Pin 7 would be activated by a pulled low on the output. If the address line zero dip switch is closed, the output of the LS 156 pulls the input line going to port 1, data bit 4, low. If that address line dip switch is open, the pull-up resistor connected in conjunction with this dip switch pulls the line high and a high-level signal would be read. If one now wanted to read the next address bit location, one again pulls Pin 2 and 14 low as a chip enable, put Pin 1 high as the first bank oif two-to-four selector enable while leaving Pin 15 high to disable the second bank of two-to-four conversion, set Pin 3 address 1 input low and set Pin 13 a zero input high. This would enable Pin 6 low on the output side which is connected through the address switch selector to port 1, data bit 4, input. Similarly, the other address lines may be read when using the second two-line to four-line converter. Pin 1 is put in a low state, Pin 2 and 14 are enabled and Pin 15 is put into a low state to enable the second bank, that is, outputs 9 through 12. Pin 1 and 15 could not be tied together and Pin 2 and 14 used as the enable lines because when 1 and 15 are tied together, one of the two decoders will always be enabled. When a relay is being pulsed, this output could interfere with proper pulsing of the relays.

Relay Output and Control

The data bus port is used to control the source drivers 800 for the relays. The data bus outputs are isolated using CMOS buffers for the purpose of providing adequate drive to the source driver, a Sprague UDN2981A. A high level source current approximately 1.35 milliamps is required to drive the 2981. This high level of source current is not available in TTL type of buffers. The UDN2981A is rated for maximum output of 500 milliamps, however, it is specified at 350 milliamps. Therefore a selected version of the UDN2981A is required. It must be specified at 500 milliamps with a known forward drop.

Port 1 is used to drive sink drivers 850. They are also buffered using CMOS buffers for the same reason as for the source driver case. The sink driver, 9 ULN2813A, is manufactured by Sprague, and is rated for 600 milliamps of current and is specified at 500 milliamps. This is adequate for this application.

To activate a particular relay, first the source driver for the blue wire of the relay is activated, followed by the activation of the proper sink driver (red or black wire). Diodes are provided on the mother board to block current leakage paths.

Driver Protection Circuitry 900

The drivers are protected by a combined current limit circuit and interrupt circuit for processor 300. The purpose is to limit current to the relay drivers as well as to interrupt the processor in the event of an overcurrent condition so that the processor will shut off the appropriate drivers. By involving the processor in the loop, two ends are achieved. One is that the processor is made aware that there is a fault condition somewhere in the relay control loop and secondly, by using the processor to turn off the drivers, no heat sink is needed on the pass transistor used in the driver protection circuit. The protection circuit uses a single sense resistor but two separate sensing circuits.

One sensing circuit involving Q-7 and R-19 is a linear circuit. It takes the voltage generated across R-18 and converts it into a current. This current is transformed into a voltage by R-3. This voltage is fed into two comparator inverting inputs. The overcurrent comparator has its positive reference set at approximately 600 millivolts by the combination of R-30 and CR-1. The second comparator has its voltage reference set at approximately 300 millivolts by the combination of R-33 and R-4 driven by the 600 millivolt voltage reference. This sets an overcurrent indication when the current-clear driver exceeds about 690 milliamps. Conversely, the end of current indicator is triggered whenever the current goes below approximately 340 milliamps. The overcurrent output Pin 1 and U-9 directly drives the interrupt pin of the microprocessor and causes an interrupt of the normal processor routine. The output of the undercurrent indicator Pin 1 of U-9 drives T0 of the microprocessor which is polled in the microprocessor's software. R-1 and R-2 serve as pullups for the respective comparators.

Q-8 is the pass transistor for which all current for relay driving must pass. It is normally turned on via R-16. It does not require any other drive because it is a PNP transistor. Q-9 acts as a non-linear switch to shunt off base drive in the event of an overcurrent situation. The threshold for this switching action is determined by the combination of CR-8, CR-9, and the base emitter drop of Q-9. R-17 serves to limit the base current through Q-9 in the event of a direct short circuit being applied to the collector of Q-8. When the voltage across R-18 the current sense resistor exceeds approximately 1.8 volts, Q-9 conducts shunting current to the base and turning off Q-8. It was found to be necessary to have this Q-8, Q-9 combination even though the microprocessor responded approximately 12 microseconds to the interrupt. The source drivers and the sink drivers could not withstand the current supplied by the power supply if there is a dead short from source driver to sink driver. This current would be in excess of 1 amp, and it was found that in approximately 4 to 5 microseconds, the drivers went into unrecoverable second breakdown.

The Q-8, Q-9 combination circuit then protects the drivers for that time without the necessity of heat sinking Q-8. This circuit is designed as a saturation type circuit, that is, normally Q-8 is saturated on and Q-9 is completely cut off. Only in a fault condition does Q-9 switch full conducting switching Q-8 completely off. Of course, in prolonged situations, a balance would be reached with Q-9 and Q-8 both partially conducting and in a high power dissipating mode. However, the microprocessor will have responded to the interrupt caused by the overcurrent condition and turned off the sink and source drivers and Q-8 dissipates very little power.

There is provided a 5 volt regulator (not shown in FIG. 3) which consists of a 3 terminal regulator, a 78M05, and associated decoupling capacitors. Worse case power dissipation occurs with a 20% error on the high side of the 9 volt source. In a worse case current draw of 150 milliamperes is 0.7 watt. This would mean that without a heat sink this regulator will have a 43° C. rise in temperature. This is acceptable given that the ambient environment will not exceed 60° C. and the rated junction operating temperature is 150° C. We will safely be at 100° C. worse case operating temperature.

The following is a descriptive of the software for the 8049 microprocessor for use in the Enhanced Transceiver Decoder. The software listing in object code form is reproduced in full in Appendix No. 1, forming a part of this patent.

Software To Hardware Interface Specification

The following table provides a function for each PIN of the relay processor:

| Pin | Function | Pin | Function |
| --- | --- | --- | --- |
| 1 | RELAY/UNDCUR | 21 | ADDR8 |
| 2 | XTAL1 | 22 | N.C./MODE |
| 3 | XTAL2 | 23 | COMM |
| 4 | RESET | 24 | SIZE |
| 5 | N.C. | 25 | WDSTB |
| 6 | OVRCUR | 26 | VCC |
| 7 | GND | 27 | RON1/G2ADRS |
| 8 | N.C. | 28 | ROFF1/ADRIN1 |
| 9 | N.C. | 29 | RON2/ADRIN0 |
| 10 | N.D. | 30 | ROFF2/ADRSEN |
| 11 | N.C. | 31 | RON3/ADRINP |
| 12 | R0SRC1 | 32 | ROFF3/G1ADRS |
| 13 | R0SRC2 | 33 | RON4 |
| 14 | R0SRC3 | 34 | ROFF4 |
| 15 | R0SRC4 | 35 | N.C. |
| 16 | R1SRC1 | 36 | N.C. |
| 17 | R1SRC2 | 37 | N.C. |
| 18 | R1SRC3 | 38 | SOD |
| 19 | R1SRC4 | 39 | SID |
| 20 | GND | 40 | VCC |

COMM 0 = NEW
SIZE 0 = ONE ADDR
1 = NEW/OLD
1 = TWO ADDR

The following table is a relay selection matrix:

| | BANK 0 (LOW ADDR) | | | | BANK 1 (HIGH ADDR) | | |
| --- | --- | --- | --- | --- | --- | --- | --- |
| RLY | ON | | OFF | RLY | ON | | OFF |
| 1 | R0SRC1 | RON1 | R0SRC1 ROFF1 | 1 | R1SCR1 | RON1 | R1SCR1 ROFF1 |
| 2 | R0SCR1 | RON2 | R0SCR1 ROFF2 | 2 | R1SCR1 | RON2 | R1SCR1 ROFF2 |
| 3 | R0SCR1 | RON3 | R0SCR1 ROFF3 | 3 | R1SCR1 | RON3 | R1SCR1 ROFF3 |
| 4 | R0SCR1 | RON4 | R0SCR1 ROFF4 | 4 | R1SCR1 | RON4 | R1SCR1 ROFF4 |
| 5 | R0SCR2 | RON1 | R0SCR2 ROFF1 | 5 | R1SCR2 | RON1 | R1SCR2 ROFF1 |
| 6 | R0SCR2 | RON2 | R0SCR2 ROFF2 | 6 | R1SCR2 | RON2 | R1SCR2 ROFF2 |
| 7 | R0SCR2 | RON3 | R0SCR2 ROFF3 | 7 | R1SCR2 | RON3 | R1SCR2 ROFF3 |
| 8 | R0SCR2 | RON4 | R0SCR2 ROFF4 | 8 | R1SCR2 | RON4 | R1SCR2 ROFF4 |
| 9 | R0SCR3 | RON1 | R0SCR3 ROFF1 | 9 | R1SCR3 | RON1 | R1SCR3 ROFF1 |
| 10 | R0SCR3 | RON2 | R0SCR3 ROFF2 | 10 | R1SCR3 | RON2 | R1SCR3 ROFF2 |

-continued

| | BANK 0 (LOW ADDR) | | | | BANK 1 (HIGH ADDR) | | |
|---|---|---|---|---|---|---|---|
| RLY | ON | | OFF | RLY | ON | | OFF |
| 11 | ROSCR3 | RON3 | ROSCR3 ROFF3 | 11 | RISCR3 | RON3 | RISCR3 ROFF3 |
| 12 | ROSCR3 | RON4 | ROSCR3 ROFF4 | 12 | RISCR3 | RON4 | RISCR3 ROFF4 |
| 13 | ROSCR4 | RON1 | ROSCR4 ROFF1 | 13 | RISCR4 | RON1 | RISCR4 ROFF1 |
| 14 | ROSCR4 | RON2 | ROSCR4 ROFF2 | 14 | RISCR4 | RON2 | RISCR4 ROFF2 |
| 15 | ROSCR4 | RON3 | ROSCR4 ROFF3 | 15 | RISCR4 | RON3 | RISCR4 ROFF3 |
| 16 | ROSCR4 | RON4 | ROSCR4 ROFF4 | 16 | RISCR4 | RON4 | RISCR4 ROFF4 |

For example,
BANK 1 RLY 13 ON = RISRC4, RON1
BANK 0 RLY 7 OFF = ROSCR2, ROFF3

The following table represents address input multiplexing:

| ADR1NP | G1ADRS | G2ADRS | ADRIN1 | ADRIN0 | ADRSEN |
|---|---|---|---|---|---|
| A0 | 0 | 1 | 0 | 0 | 0 |
| A1 | 0 | 1 | 0 | 1 | 0 |
| A2 | 0 | 1 | 1 | 0 | 0 |
| A3 | 0 | 1 | 1 | 1 | 0 |
| A4 | 1 | 0 | 0 | 0 | 0 |
| A5 | 1 | 0 | 0 | 1 | 0 |
| A6 | 1 | 0 | 1 | 0 | 0 |
| A7 | 1 | 0 | 1 | 1 | 0 |
| 1 | 1 | 1 | x | x | 0 |
| 1 | x | x | x | x | 1 |

Figure 4:
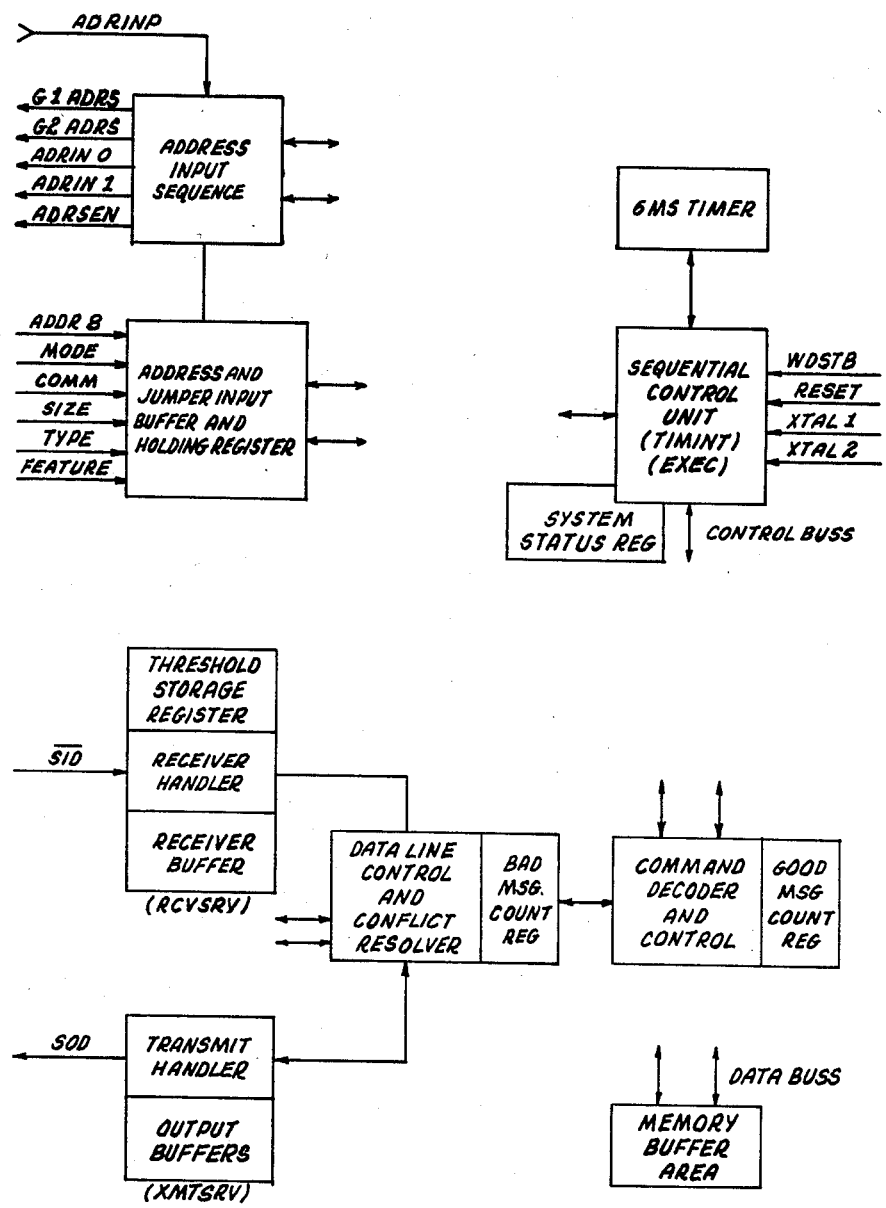
FIG. 4 is a block diagram showing the various functional blocks of the firmware associated with the relay processor (microcomputer) shown in FIG. 1.
Figure 5:
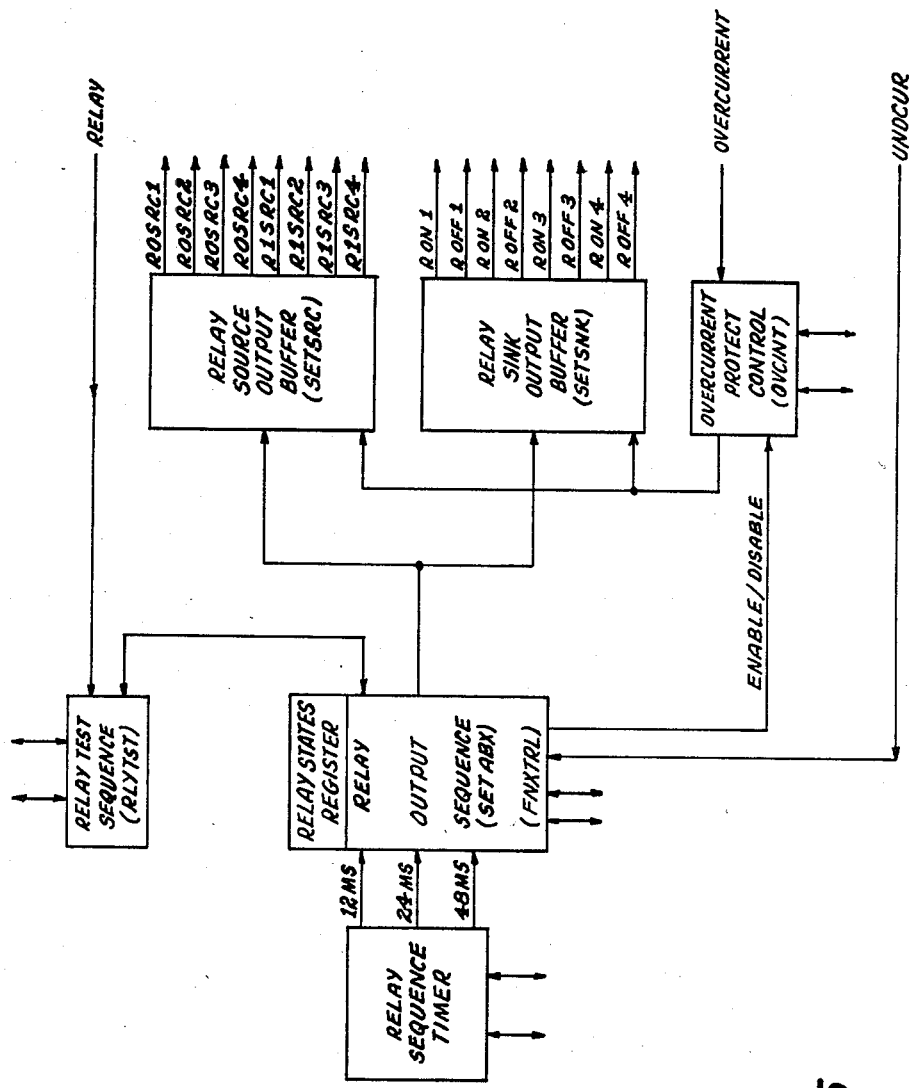
FIG. 5 is a further block diagram illustrating the function of firmware associated with the relay processor (microcomputer) shown in FIG. 1.

Referring now to FIGS. 4 and 5 there is shown in general block diagram form the functional units carried out by firmware associated with processor 300 shown in FIG. 1. This firmware is embodied in the object code listing set forth in complete form in Appendix 1. The function shown in FIGS. 4 and 5 are detailed further in FIGS. 6-50.

The relay transceiver is comprised of the previously described hardware apparatus and several software or firmware procedures and processes described below. The block diagram of the relay transceiver is depicted in FIGS. 4 and 5 and provides a functional description of each of the software process blocks.

Referring now to FIG. 4, the sequential control unit is formed by the TIMINT (timer interrupt service routine) and the executive (EXEC) routines. The purpose of this section is to provide the timing (6 msec timer) and monitor the status of the various other processes. It is further responsible for the task dispatching to all process functions.

The address input sequence and address and jumper buffer holding registers described in the MODIDN process provides a means of uniquely identifying a relay transceiver, as well as configuring the product via user or manufacturing installed jumpers to support various selectable features.

The command decoder operates upon data contained in the memory buffer area consisting of messages received from the data line receiver. The DECODE process checks the validity of the messages (through parity or checksum calculations), the proper address (ADRCHK process) and the command type. The command decoder will place the proper data into the memory buffer area and status registers of the sequential control unit for subsequent dispatching to the proper task to perform the desired action. The decoding of a valid message results in the incrementing of a good message count register used for internal system diagnostics.

A receiver means (RCVSRV) similar to that described in Miller '414 can be utilized in order to convert the incoming serial data stream into a parallel form in the memory buffer area suitable for command decoding.

In addition, a transmitting means (XMTSRV) similar to that described in Miller '414 can be utilized in order to convert parallel data from the memory buffer area to the serial format of the common data line.

FIG. 5 details the operation of the relay service process. A relay output sequencer (RLYSRV) determines the proper timing intervals for pulses of relay actuation current in conjunction with the TIMINT timer interrupt service routine. Once the proper relay for service is determined by the output sequencer (and the SETABX and FNXTRL process), commands are given to the relay source output buffer and relay sink output buffer (described in the SETSRC and SETSNK process) in order to actuate the relay multiplexing hardware and install the desired relay state.

An overcurrent protect control function is shown on the diagram and is comprised of the external overcurrent detect and limiting hardware and the OVCINT overcurrent interrupt service routine which stops the flow of current should an overcurrent condition be detected.

Finally, a relay test sequencer exists which can be invoked by a user in order to assist in proper installation of the product and diagnose faulty wiring or relays. This function is described in the RLYTST process.

Relay Handler Module (Firmware That Controls Relay Drive Circuits and Driver Protection Circuit)

The Relay Handler is a collection of several software procedures whose purpose is to install desired ON/OFF states onto mechanically latching relays. A typical relay transceiver is comprised of 16 or 32 mechanically latching relays. Each group of 16 relays has a bank associated with it resulting in a maximum of 2 banks for 32 relay transceivers. The 2 banks correspond to addresses assigned to each relay transceiver. Therefore, each relay transceiver can respond to up to 2 addresses. The even address is associated with Bank 0 while the odd address is associated with Bank 1. If a transceiver is defined to have a single address for response, that address will be equal to the binary selection applied by the user to the address switch on the transceiver. This address, in the case of a single address TRD, can be either even or odd.

Relay processing occurs in a sequential fashion beginning with the first relay of a bank and continuing in order through the last relay of a bank. Three passes of installation will be made for each bank. These three passes, numbered 1, 2, 3, correspond to progressively increasing current pulse duration applied to the relay coil (pass 1 is a duration of 12 milliseconds; pass 2 is a duration of 24 milliseconds; and pass 3 is a duration of 48 milliseconds).

Since a normally functioning mechanically latching relay will respond to a state change within the shortest interval of time (pass 1), the throughput is determined by this pass and corresponds to 12 milliseconds per relay. However, due to possible parametric shifts of relay characteristics, it is possible that some relays might not change their state within the pulse duration of pass 1. Subsequent passes of increasing pulse width are then applied in order to change the state of any relay which may be responding in a more "sluggish" manner. The 48 millisecond pulse width of pass 3 was determined to be the maximum time required for a change in state to occur in a mechanically latching relay with an abnormal shift in its parameters.

An entire bank of relays is serviced within a given pass. At the end of each pass, an attempt is made to install any data for the other bank of relays. By swapping banks of relays every pass it is possible to maximize the observable throughput for both banks. This is because a bank of relays does not have to wait for the other bank's three passes of 12, 24 and 48 milliseconds to complete in order to begin servicing for its initial pass. (However, it must wait for the current pass to complete.)

In addition to installing desired states onto the up to two banks of mechanically latching relays, the relay handler will perform the required multiplexing for the 64 ON/OFF coils of the relays through its 8 bit output structures and associated relay multiplexing hardware. In addition, the handler also maintains a register of states for the relays containing the ON/OFF indications, and provides for infinite queing of commands received over the common data line for altering the states of relays. Either individual relays, multiple relays or entire banks of 16 relays can be altered. And, finally, the relay handler will recongize both overcurrent and undercurrent detections from the associated relay multiplexing hardware which may or may not be indicating an abnormal condition.

Before further analysis of the relay handler can be undertaken, it will be necessary to describe the data structures used in the servicing of relays. These data structures are utilized in such a manner as to allow the pulsing of a single relay coil at a time. The data structures are used in order to remember which relay coil is being pulsed as well as the desired duration of that pulse and information necessary to pulse additional relays in the future. By coupling this information together with a proper interval timer, it is then possible for the microprocessor to initiate the pulsing of a relay coil and then continue with other non-related tasks such as communicating over the common data line. After the proper interval of pulsing has transpired, it is then possible to restore the state of the relay handler, by utilizing the data structures, and continue pulsing further relays.

There is a master status register (known as the Relay Module Status Register) which indicates if relay servicing has been active in the past and if so, which of the two banks were active. In addition to this master status register, there are additional registers which are duplicated for each bank of the transceiver. They are: the relay status register for a bank; the relay holding register for a bank; the relay working register for a bank and the relay states register for a bank.

The relay status register for each bank contains information indicating if that bank was active (in other words, was having relay states installed by the relay handler) as well as an indication if data is awaiting installation in the relay holding buffer. Also contained in the relay status register, for a bank that is active, is the number of the relay that was last serviced, a pass number from 1 to 3 (which indicate the duration of the pulses to be applied to relay coils) and, if necessary, a flag indicating that the first relay of a given bank for a particular pass is to be installed without delay (this would indicate a need for immediate servicing of that relay without waiting the customary amount of time between servicing of relays).

Queuing of commands which affect the state of relays is achieved by placing the required data for the relay service into a relay holding register. This register is broken into two parts. The first part, or mask portion of the holding register, is used to indicate the presence of a desired action for a given relay. A "1" value in the mask portion of the register indicates a need to service the relay number corresponding to that position (the first bit, data bit 0, corresponds to relay number 1; the last bit, or data bit 15 of the register, corresponds to relay number 16). The second portion of the holding register contains the states desired for particular relays. A value of "1" will indicate a desired ON action, while a value of "0" will indicate a desired OFF action.

The relay working register is similar to the holding register in that it is broken into two parts, a mask and a state portion. However, it contains the actions which are to be installed onto the currently active bank of relays. Since this information is maintained separately from the holding register, it is then possible for an initial set of relay actions to be installed from the working register while future actions are being held in the relay holding register. The current actions on an active bank of relays will proceed to completion before information in the holding buffer will be acted upon.

The final data structure used by the relay handler module is a relay states register for each bank of relays. This 16 bit register will contain a "1" value in each position corresponding to a relay that is in the ON state and a "0" value in each position corresponding to a relay in the OFF state. Data Bit DB0 through DB15 correspond to relays numbered 1 through 16.

The primary procedure of the relay handler module is the Relay Service Routine, RLYSRV. The Relay Service Routine is a procedure invoked by the main executive of the relay transceiver. Its purpose is to control the actions of the relay handler, manipulate and maintain the required data structures, and perform relay pulsing as needed. A flow diagram depicting the relay service process is indicated in FIGS. 6, 7 and 8.

Figure 6:
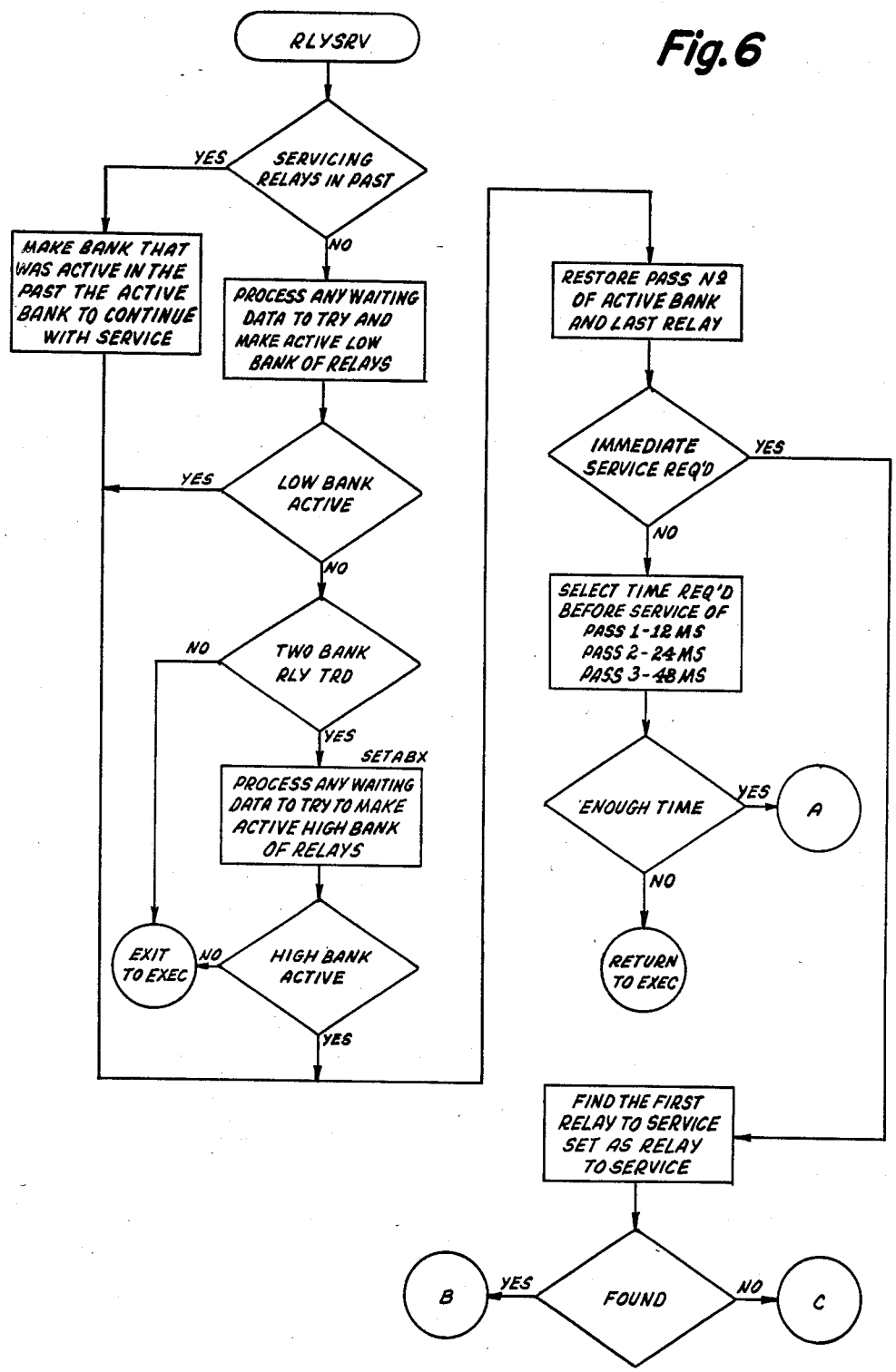
FIGS. 6-51 are detailed flow charts illustrating the functions carried out by firmware associated with the relay processor; and APPENDIX 1 is a complete listing of the object code associated with the relay processor which carries the functions illustrated in FIGS. 4-51.

Referring to FIG. 6, on entry to the relay service routine, a test is made to determine if relays were being serviced in the past by checking the relay module status register. If relay processing was indeed active in the past, then the bank that was active is restored by the SETABX routine such that the pass number, last relay number and immediate service requirement flag reflect the last action performed on that bank. If relays had not been servicing in the past, then the SETABX routine is invoked in order to process any relay data that may be waiting in the holding buffer for the low bank of relays. If that process is successful, then flow continues as indicated in FIG. 6. If it is not possible to make the low bank of relays active, a test is made to determine if the transceiver is a two-Bank (32 relay) transceiver. If the second bank of relays does not exist, then the process completes and control returns to the executive. However, if the transceiver does contain two banks of relays, then the SETABX routine is called once more in order to process any relay actions that might be waiting in the holding buffer for the high bank of relays. If no data is awaiting servicing, then the process completes and control returns to the executive. Otherwise, the pass number, last relay number, and flag indicating a need for immediate service has been established as indicated for the bank of relays that is now active. If immediate service for the bank is required, then the first relay to be serviced within that bank is established by the FNXTR0 process. If a relay is found, then the flow continues at connector B of FIG. 7. Otherwise, if a relay is not found then the process continues with connector C of FIG. 8.

If immediate servicing for a bank is not required, then a selection is made of the time interval required before further servicing can occur. This corresponds to an interval of 12 milliseconds for pass 1, 24 milliseconds for pass 2 or 48 milliseconds for pass 3. If the required interval of time indicated by the pass number has not elapsed, then the process completes and control returns to the executive. Otherwise, the flow continues as indicated on FIG. 7 at connector A.

Figure 7:
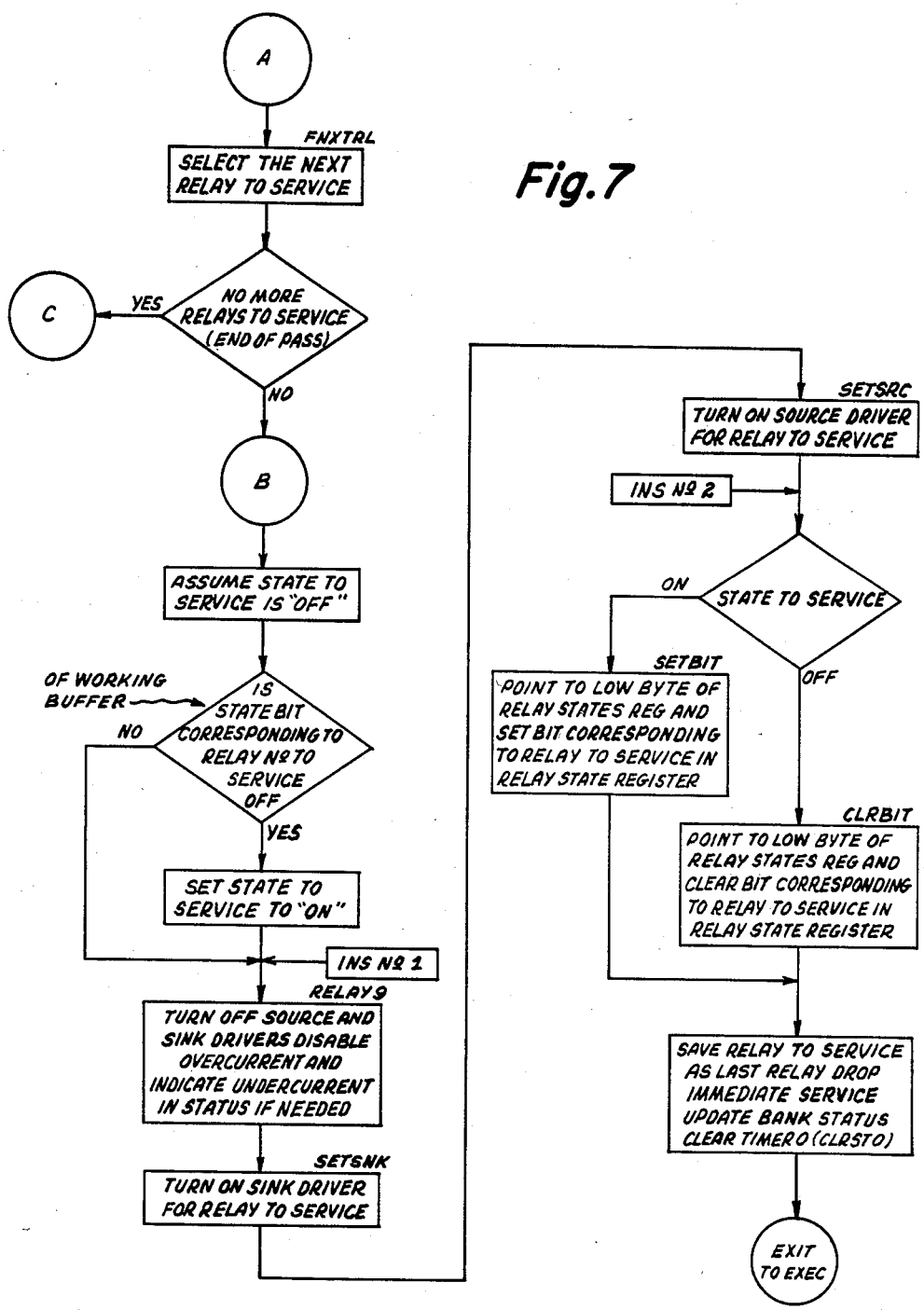
Figure 8:
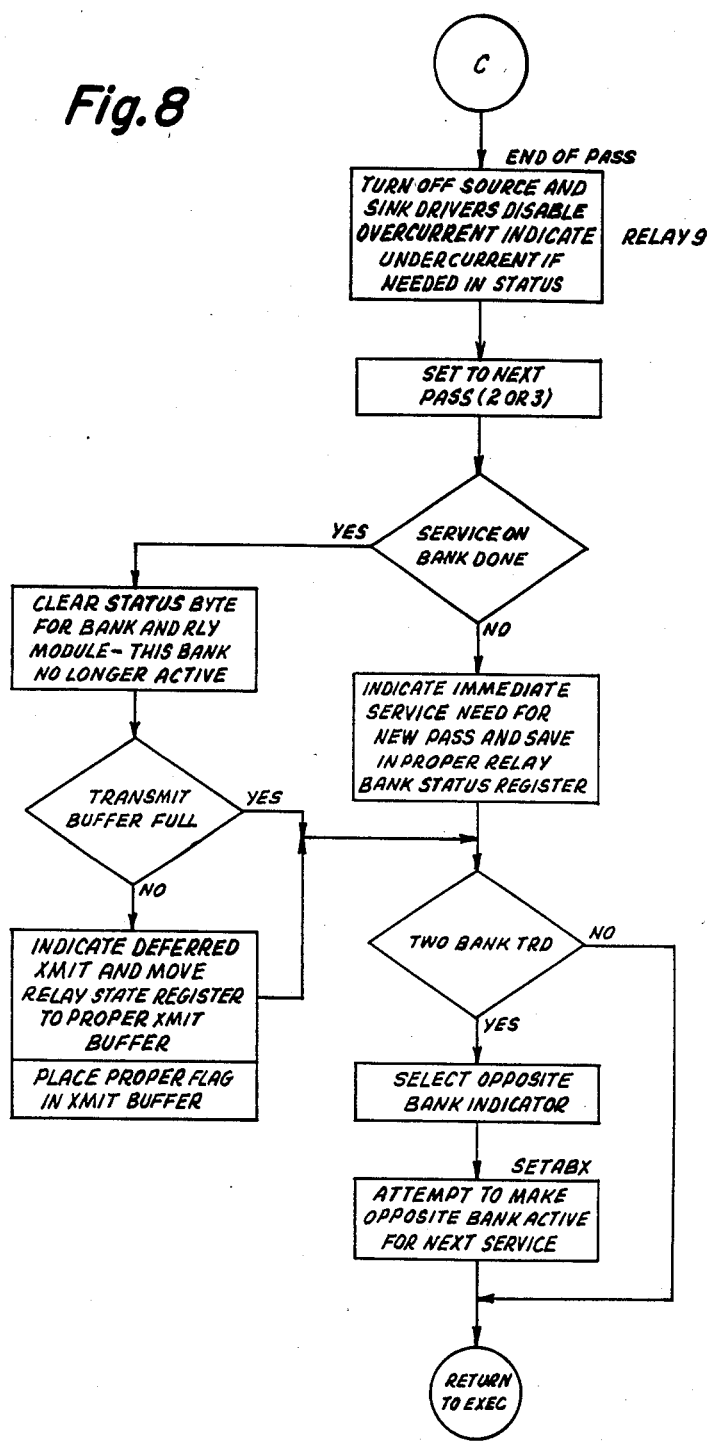

The flow description of the relay service module continues with FIG. 7. At connector A the process FNXTRL, or Find the Next Relay, is invoked in order to select the next relay to service. If a relay to service cannot be found, this indicates the end of a pass and the process continues with connector C, FIG. 8. Otherwise, continuing to connector B, the state for the relay found is assumed to be OFF. The state bit corresponding to the relay number to service in the working buffer is then tested to see if an ON state is desired. If the relay is indeed to be turned ON, then the state to service register is set to ON and flow continues as indicated in FIG. 7.

Both the source and sink drivers are turned to their OFF or no current condition. The overcurrent detection hardware is disabled and an undercurrent flag is set in the STATUS register if needed by the procedure RELAY 9. SETSNK is then invoked in order to turn on the sink driver for the relay to service. SETSRC turns on the source driver for the relay to service and following this test a test of the state to service is performed. If the relay was set to an ON condition, then a pointer is set to the low portion of the relay states register and a bit is set corresponding to the relay to service in the relay state register by the procedure SETBIT. On the other hand, if the relay was turned off then the low portion of the relay states register is pointed to and a bit is cleared corresponding to the relay to service in the relay state register by the procedure CLRBIT. Flow continues for both states by saving the relay to service as the last relay, dropping any immediate service requirement, and updating the relay status register for the proper bank. The procedure is then complete and control returns to the executive.

The final figure for the relay service module is FIG. 8 which begins at connector C. This process is entered whenever the end of a pass has been detected. Both source drivers are turned OFF and the overcurrent detection hardware is disabled. If needed, a flag corresponding to an undercurrent detection is set in the STATUS register of the transceiver by the procedure RELAY 9. The pass number is then incremented (to pass 2 or 3). A test is then performed to determine if the service for the bank is now complete (on completion of pass 3). If the service has completed, then the status byte for the bank and the status byte for the relay module are cleared to indicate that the bank is no longer active. A test is then performed to see if the tranmit buffer is currently in use. If so, then the process continues as indicated by the figure. Otherwise, a desire for deferred transmission is indicated and the relay state register is moved to the proper transmit buffer along with a flag indicating a transmission of relay states. The process then continues as indicated in the figure.

If the test for completion of relays service determines that there are more passes to be performed on the bank, then the flag indicating a need for immediate service is set, the new pass number is saved, and the last relay number is set to 0 in the proper relay bank status register. A test is then made to determine if the transceiver contains two banks of relays. If not, then the process completes. Otherwise, the opposite bank is requested and the procedure SETABX is invoked in order to attempt to make the opposite bank active for the next relay service. The procedure RLYSRV is then complete and control returns to the executive.

The routine, SETABX, or Set Active Bank X, is invoked by the relay service module, in order to activate a bank of relays for servicing. SETABX performs this task by restoring the required information for relay servicing and performing a transfer of relay data from the relay holding register to the relay working register, if required.

Figure 9:
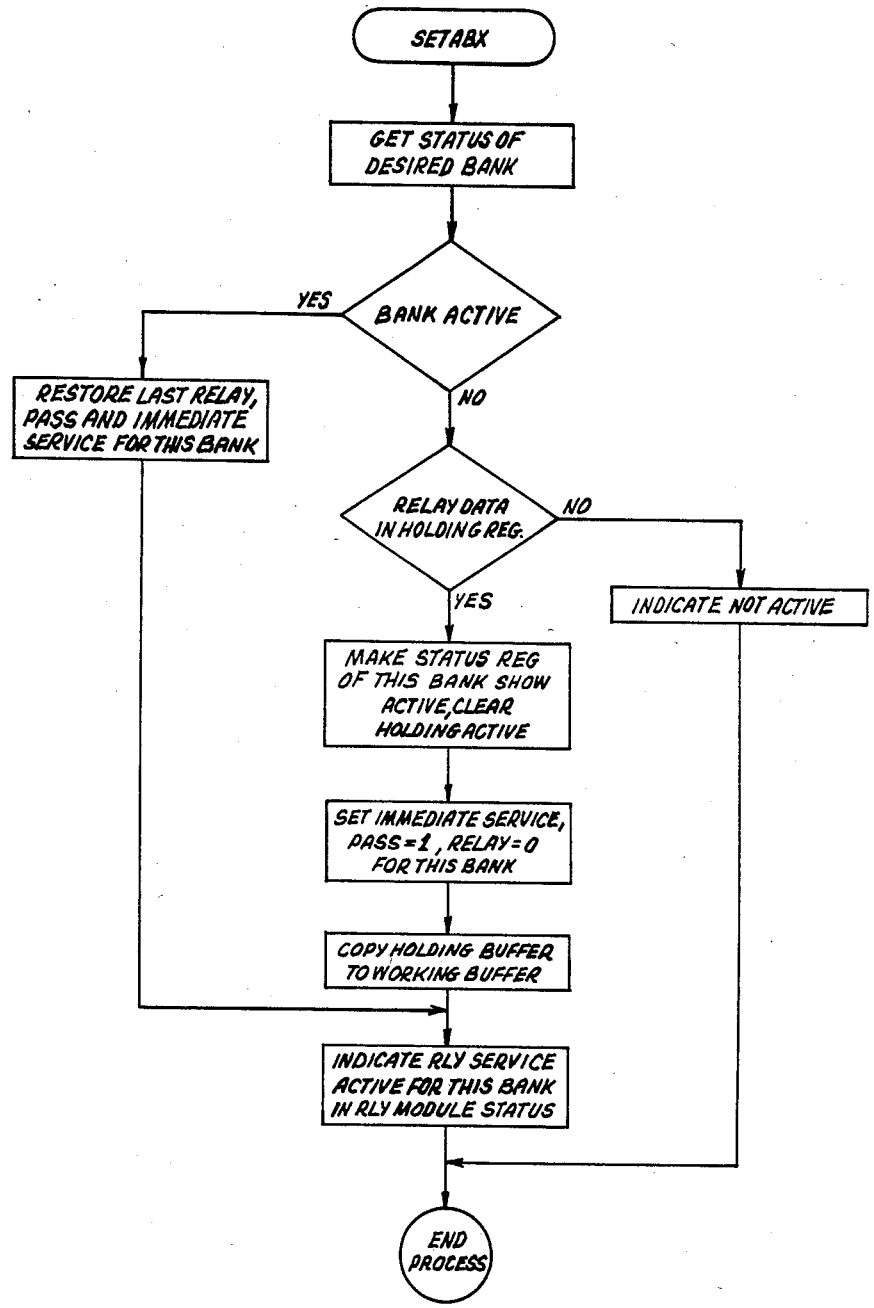

Referring to FIG. 9, the flow description of the process SETABX, the status register for the desired bank is fetched. A test is then made to determine if that bank of relays was active for relay servicing in the past. If so, then the last relay serviced, the pass number and the flag indicating an immediate service request is restored and flow continues as indicated. Otherwise, a further test is performed to determine if there is relay data waiting servicing in the relay holding register. If not, it is indicated that the bank cannot be made active and the process ends.

If there is data waiting servicing in the the bank is updated to show an active indication and the flag indicating holding data available is cleared. Next the immediate service request flag is set, the pass number is initialized to pass 1 and the relay number is set to 0. The holding buffer is then copied to the working buffer and an indication is given that the bank of relays is now active for servicing in the relay module status register (RLMODS). This completes the description of the SETABX routine.

Figure 10:
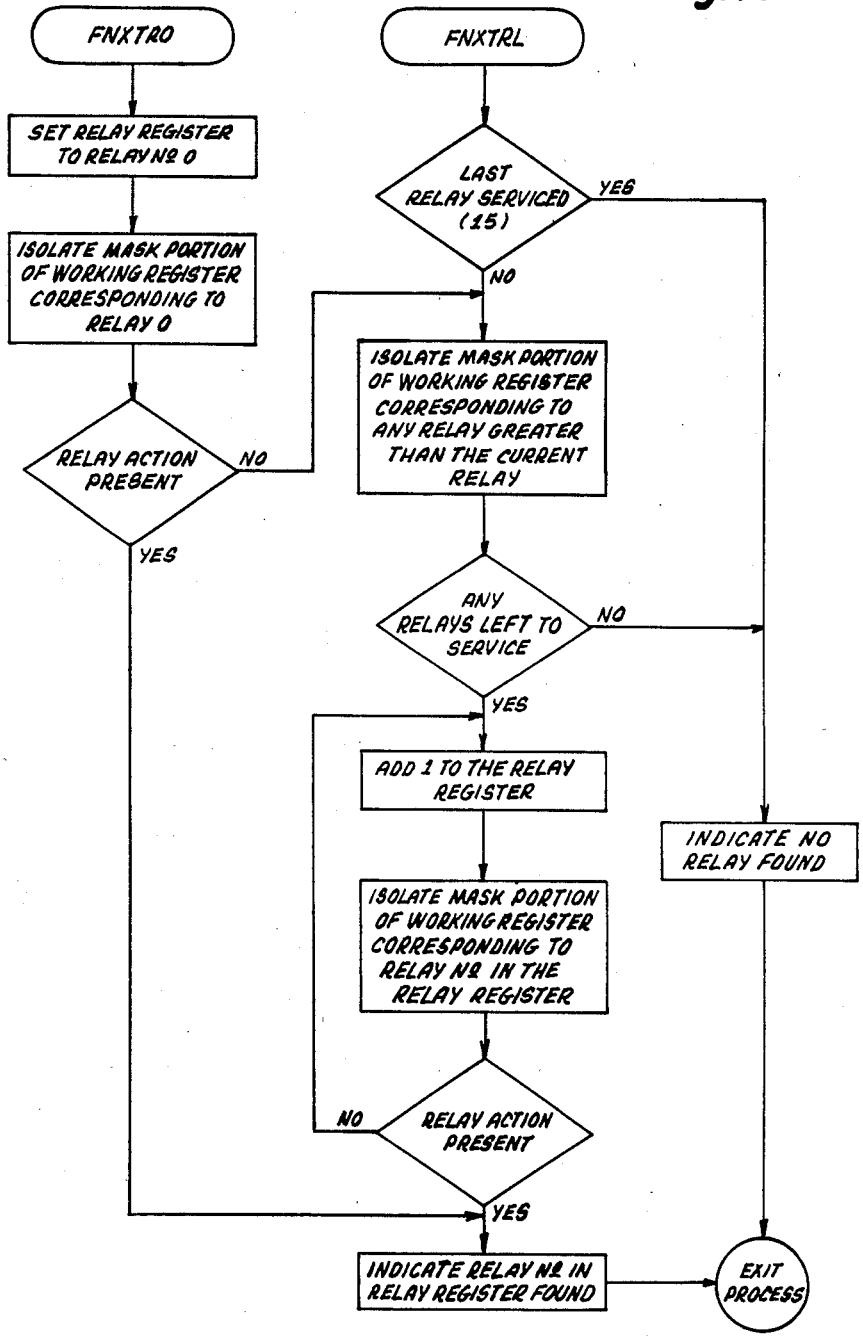

The routine FNXTRL, or Find the Next Relay, is responsible for scanning the mask portion of the working register in order to detect relay positions that have been indicated for servicing. A flow chart for this routine is indicated in FIG. 10.

The FNXTRL routine begins by checking the last relay serviced to see if it was relay 15. If so, then there are no more relays to be serviced and a flag is set to indicate that no relay is found. The process then aborts. If the last relay serviced was not number 15, then the mask portion of the working register is isolated corresponding to any relay position greater than the current relay. A test is then performed to determine if any relays remain to be serviced in the bank. If not, an indication is made that no relay can be found and the reoutine exits. Otherwise, a 1 value is added to the relay register and the portion of the working register mask corresponding to the relay number in the relay register is isolated. A test is then performed to determine if there is a relay action present in that position. If so, then a flag is set to indicate that the relay number in the relay register has been found and the process exits successfully. If no relay action was present then the loop of adding 1 to the relay register and isolating the bit position corresponding to the number in the relay register and the test for relay action present in that position continues until such time that a relay is found to be active in that position.

As was described above in the RLYSRV module, whenever the initial service for a bank is made, a special procedure entitled FNXTR0 is called in order to find the first relay to service for a given bank. Referring again to FIG. 10 for the FNXTR0 label; the relay register is set to relay number 0. Then the mask position of the working register corresponding to relay number 0 is isolated and a test is performed to determine if there is relay action present in that position. If not, the flow continues as indicated on the diagram. If so, then an indication is made that the relay number in the relay register has been found and the procedure exits. This completes the description for the FNXTRL routine.

Figure 11:
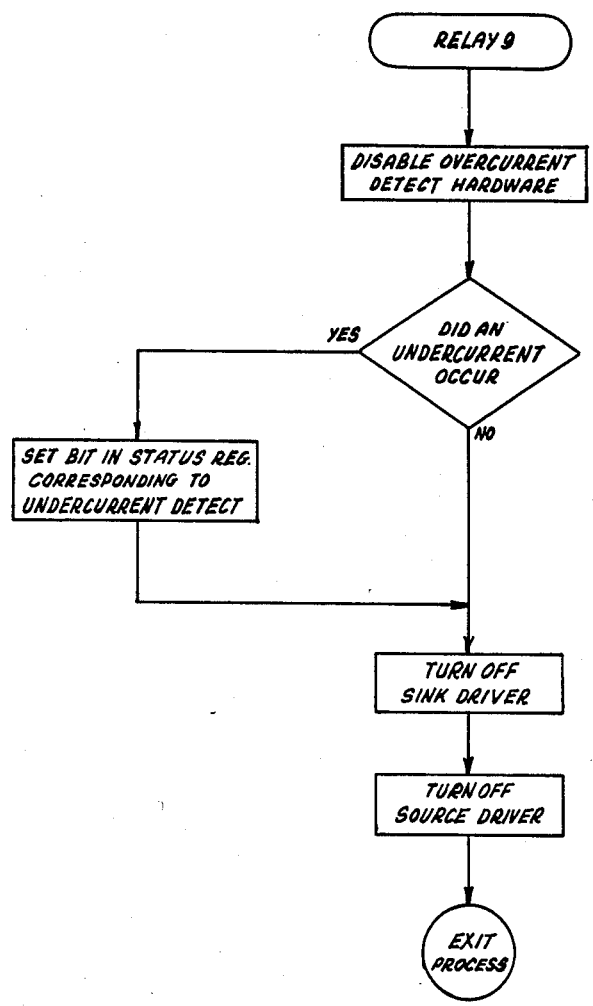

The procedure RELAY9 is called by the relay service module in order to complete the servicing of a relay for a previous relay service. As indicated in FIG. 11, the overcurrent detection hardware is disabled and a test is performed to determine if an undercurrent condition occurred while servicing the relay. If it did, then a bit is set in the STATUS register of the transceiver corresponding to an undercurrent detection. Otherwise, both the sink and source driver are turned off as indicated completing the process.

Figure 12:
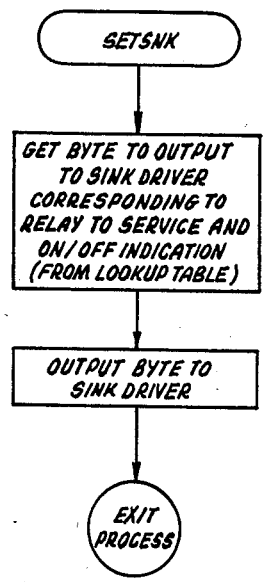

SETSNK, or the Set Sink Driver routine described in FIG. 12, is responsible for enabling the sink driver hardware for a relay service. As indicated, it will get a byte to output to the sink driver hardware (obtained form a lookup table) corresponding to the relay to service taking into account the ON/OFF indication. The byte is then output to the sink driver and the process completes.

Figure 13:
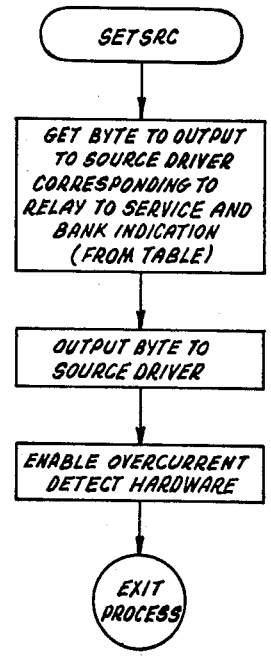
Figure 14:
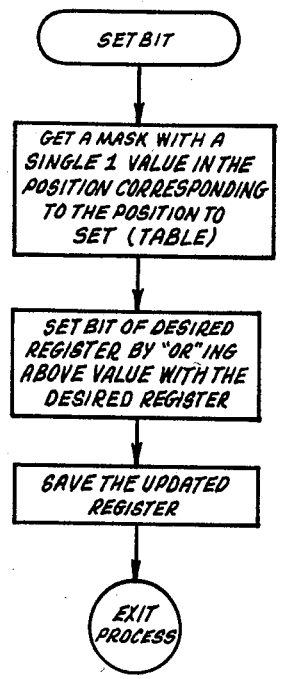

The SETSRC, or Set Source Driver routine described in FIG. 13 operates in a similar fashion for setting the source driver to the desired condition. The byte to output to the source driver (obtained from a lookup table) corresponding to the relay to service and the bank indication is output to the source driver. Following this, the overcurrent detection hardware is enabled completing the process.

The SETBIT and CLRBIT routines are two utilities responsible for setting a desired bit within a register or clearing a desired bit as needed. A flow description for the SETBIT routine is given in FIG. 14. A mask with a single 1 value in the position corresponding to the position to set is retrieved from a table. The desired bit is then set in the register by ORing the above value with the desired register. The new value is then saved as the updated register contents, completing the process which then exits to the calling routine.

Figure 15:
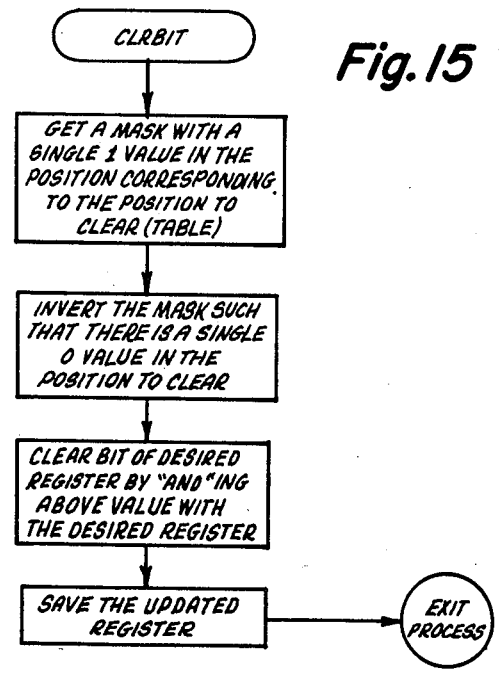

FIG. 15 depicts the flow for the Clear Bit routine. A mask with a single 1 value in the position corresponding to the position to clear is obtained from a table. This mask is next converted such that there is a single 0 value in the position to be cleared. The desired bit is then cleared by ANDing the above value with the desired register. This new value is then saved as the updated register, completing the process.

Figure 16:
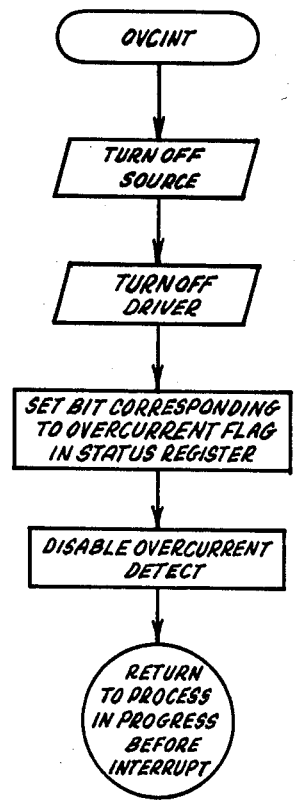

FIG. 16 describes the overcurrent interrupt service routine which is entered whenever the external hardware detects an overcurrent condition while servicing relays. As depicted in the figure, the source driver is turned OFF following by the sink driver resulting in 0 current flow through the relay coil. A bit is then set within the STATUS register corresponding to an overcurrent detection. The overcurrent detection hardware is then disabled to avoid further detection of the same overcurrent condition. The process then completes and control returns to the procedure in progress before the overcurrent detection interrupt occurred.

This completes the description of the Relay Handler Module. In summary, the Relay Handler provides a means of installing desired states onto mechanically latching relays; a means of performing the required multiplexing for actuation of the external hardware; a means of identifying and controlling two separate banks of relays; a means of staggered service of banks in order to maximize throughput; a means of maintaining a register of relay states; a means for infinitely queuing commands for altering the relay states; a means for performing actions on individual, multiple or entire banks of relays; a means of recognizing and indicating a detection of an undercurrent indication while servicing a relay; and finally, a means of recognizing and indicating the detection of an overcurrent condition and also disabling the relay multiplexing hardware in order to protect it from damage due to the overcurrent condition.

Momentary Pulsed Output for Mechanically Latching Relays

In order to provide a group of pulsed output devices from a normally mechanically latching relay transceiver, modifications to the previously described relay handler module were required. The object is to synthesize a pulsed output from a mechanically latching relay. In the normal relay service, each relay will receive three pulses of current in order to cause a state change to occur. These three pulses are of varying lengths in order to accommodate shifting relay parameters, as previously described. In order to implement the pulsed output TRD, it was decided that the first two passes would proceed as normal allowing standard relay installation to occur with 12 and 24 millisecond pulses. However, for pass three, an additional procedure is invoked in order to force all of the relays OFF. This is done because a pulsed output is a mono-stable device (the device is normally in the OFF condition and will be pulsed to the ON condition brierfly followed by a return to the OFF condition).

Referring back to FIG. 7, there are locations indicated on the diagram for insertion of two procedures in order to implement the pulsed output TRD.

Figure 17:
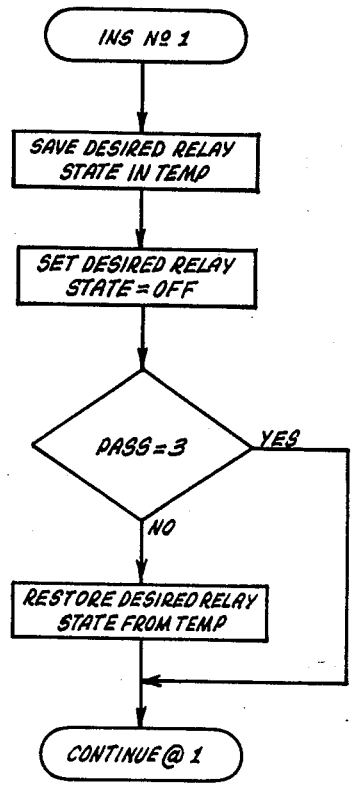

Referring now to FIG. 17, there is a description of INS #1. The desired relay state is saved in a temporary register. Next, the desired relay state is set equal to the OFF condition. A test is then performed to determine if the pass number for relay installation is equal to 3 (the final pass of 48 millisecond duration). If not, then the relay state desired is restored from the temporary register to its original OFF or ON value and the code continues at the point where the first insertion was made. On the other hand, if the pass was equal to 3, then the desired relay state is left in the forced OFF condition and the process continues at the point where the routine was inserted in the relay service module. The effect of this process is to allow normal OFF/ON state changes to occur on passes 1 and 2 while forcing an OFF state change to occur on the final pass (3).

Figure 18:
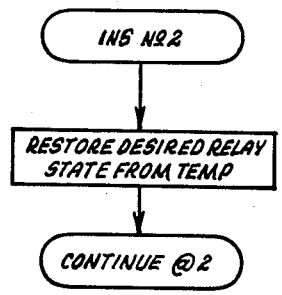

The second insertion (INS #2) required to implement the pulsed output is described in FIG. 18. The desired relay state is restored from the temporary register to its original OFF or ON condition completing the inserted process. The program continues with the code remaining at the end of the second insertion. The original relay state is restored in the second insertion in order to insure that the relay state registers will have the proper OFF or ON indications built into them. Had this not been performed, the relay states would indicate the monostable condition for the pulsed output (OFF). It was desired to allow the relay table to indicate reception and processing of a relay pulse command and not to indicate the actual ON/OFF state of the relays (which for the pulsed output would normally be the OFF condition).

By providing an alternate method, as described in the two insertions, for installing relay states it is possible to provide a means of simulating a monostable output device with a bistable output device, i.e., a mechanically latching relay. This modification allows the actuation of contactor type load devices which would normally require a pulsed actuated start or stop signal.

Warning Mode (Flicker) for Imminent Load Level Changes

There is a need to provide a warning for imminent load changes. In a typical installation, for example, a small office with no windows and only a door, might contain only one lighting circuit. This circuit can have two possible conditions—either ON or OFF. In a typical scheduled control application the lights or some other load for that office might be turned immediately to the OFF state resulting in a potential safety hazard for the occupant of that closed office space. A traditional means for solving this problem would be to provide two or more lighting circuits enabling them to be controlled independently in such a means as to warn the occupant of an upcoming change in the load condition. However, this method has a drawback in that it requires additional expense for extra controls and wiring.

This section describes a means of using a single point control circuit (typically lighting) in order to warn an occupant of an upcoming change in load condition. The warning indication consists of five steps. First, all desired loads are turned OFF. Next, a delay of 1½ seconds follows. Third, all desired loads are turned back ON. Following this, a 30 second delay is entered. Finally, in the fifth step, all desired loads are turned back OFF. The OFF—Delay 1½ Seconds—ON cycle serves to flick the lights and issues a warning to the occupant. The 30 second delay allows time for the occupant to override a pending load change. Finally, the command to turn the loads OFF insures that unoccupied offices will have their lights turned off as desired.

In order to provide the warning function it was necessary to modify three previously described routines. To begin with, due to the long time delays involved, an additional timer similar to the first timer described, was created with 16 bit resolution for 6 millisecond timer interrupts in order to timeout the 1.5 and 30 second time delay.

Figure 19:
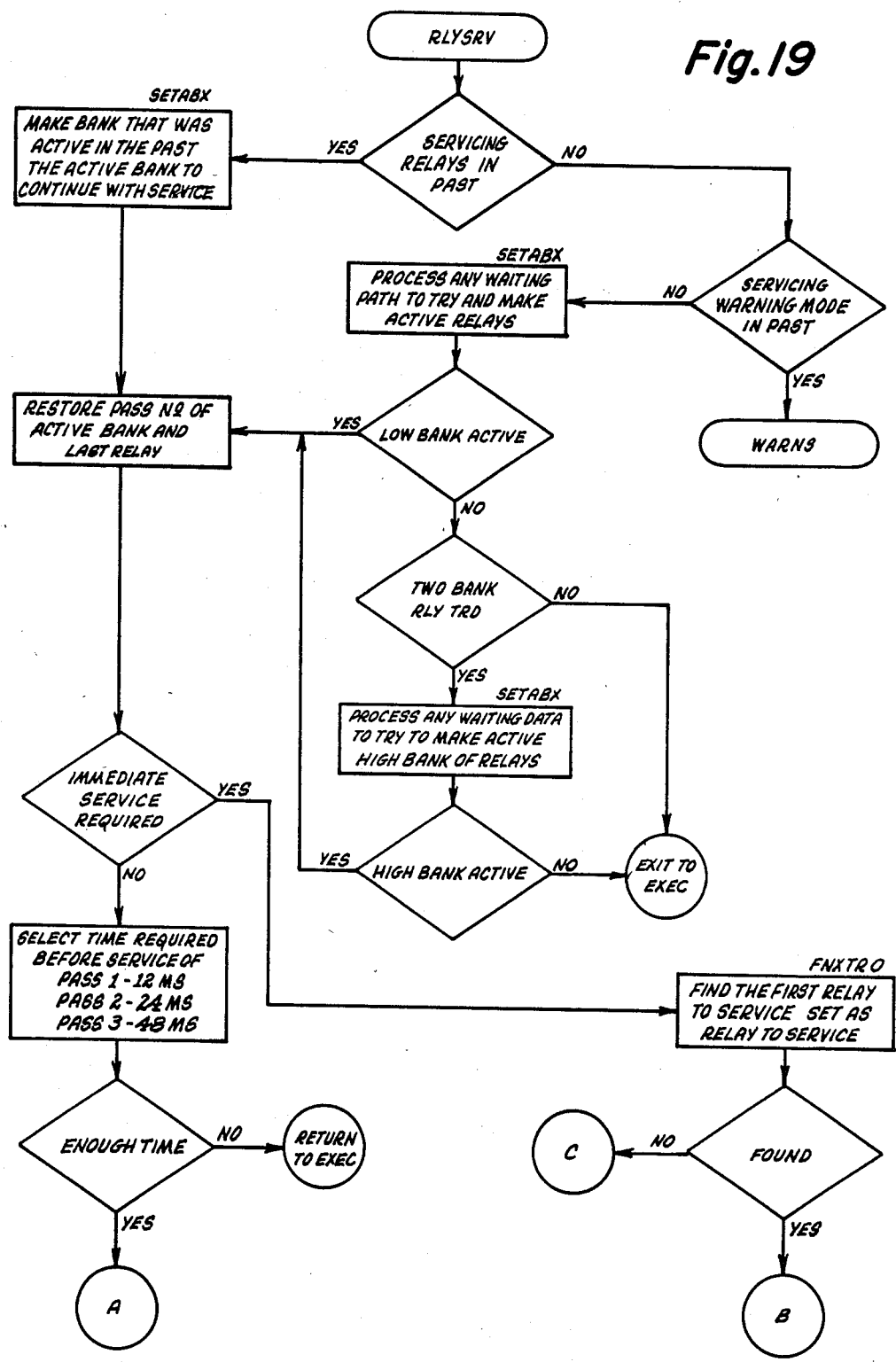

FIG. 19 describes the modification to the relay service routine (of FIG. 6) in order to provide warning mode. All that was necessary was the addition of an additional test, so indicated on the diagram, to determine if the relay service module was servicing a warning mode in the past. If not, then the flow continues as indicated on the diagram. Otherwise, the procedure continues with WARNS, the Warning Service Routine.

Figure 20:
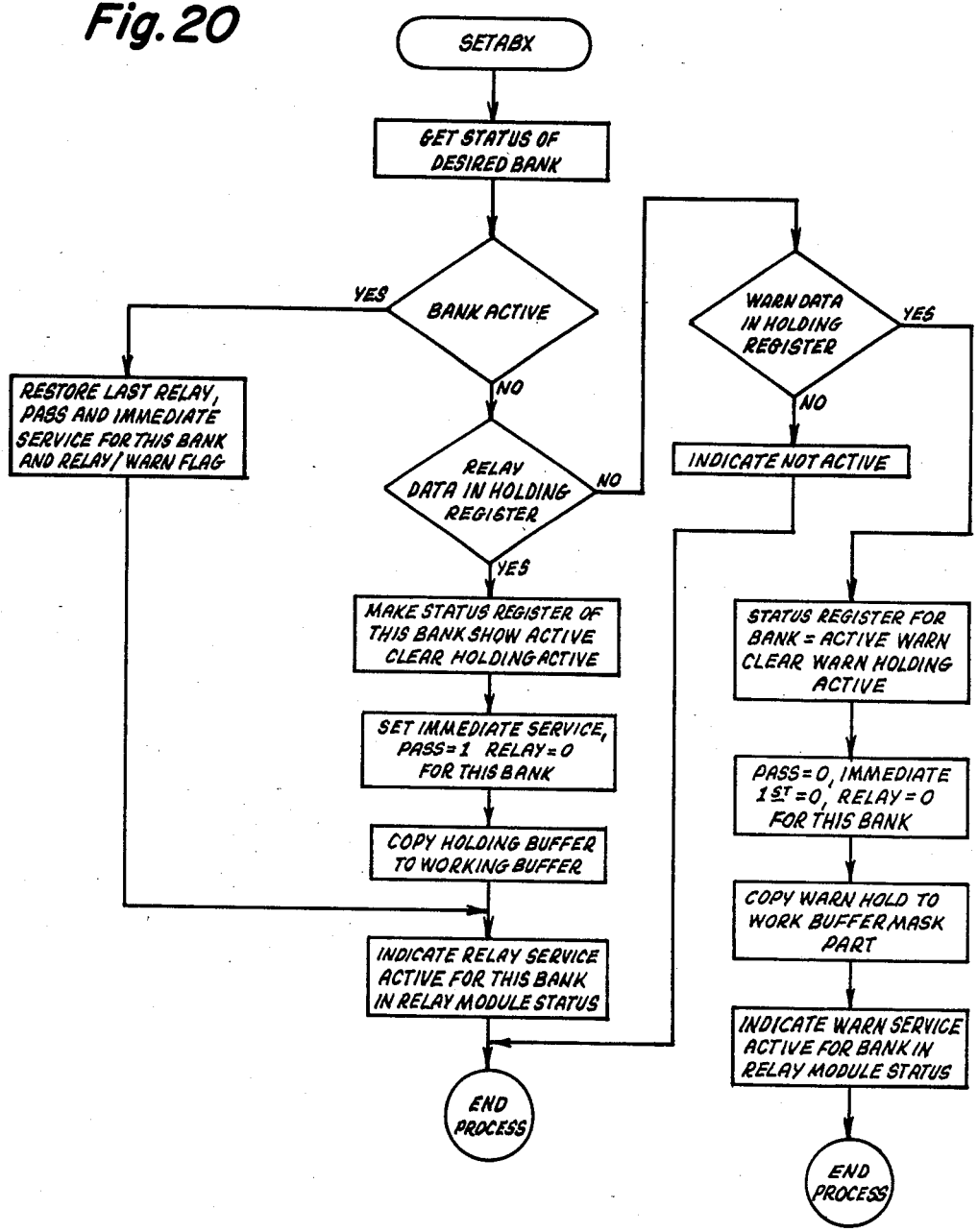

FIG. 20 describes the modifications required for the SETABX routine (of FIG. 9). To begin with, if the bank was previously active then an additional flag indicating either relay servicing or warning servicing must be established, as indicated on the diagram. In addition, if the bank was not active and relay data was not available in the holding register, then a test is made to determine if there is warning data waiting in the holding register. If not, then service is not active. Otherwise, as indicated on the diagram, the status register for the desired bank is set to indicate active warning service. The warning buffer holding flag is then cleared, pass 0 is set and the immediate first service flag is reset to 0. Next the warning holding buffer is copied to the mask portion of the working buffer and finally an active warning service is indicated for the proper bank in the relay module status.

Figure 21:
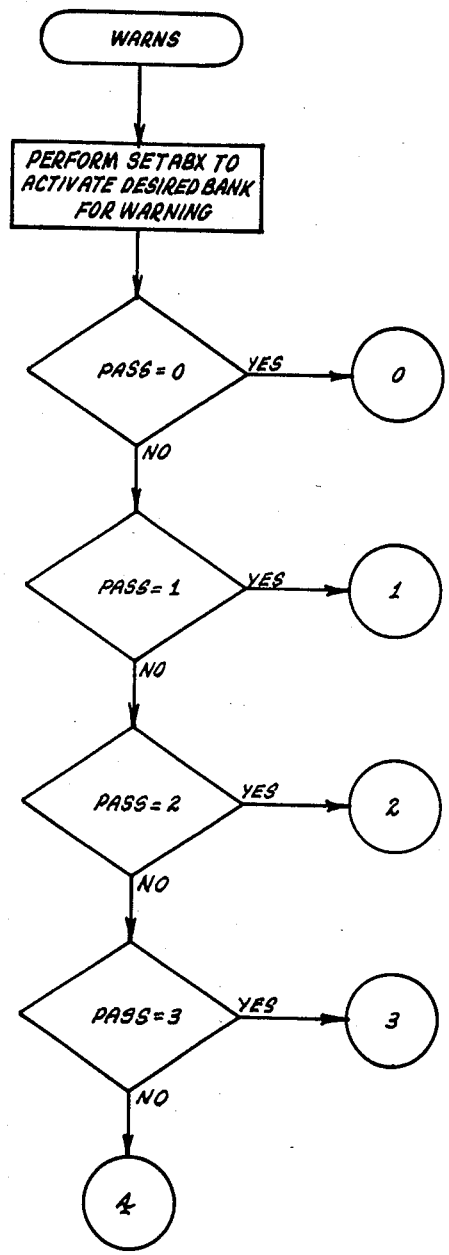

FIG. 21 describes the WARNS or Warning Service procedure. On entry to this process SETABX is invoked in order to active the desired bank for warning indication. A test is then performed to determine which pass number is currently in process. Control branches to Connectors 0 or 1 of FIG. 22 or 2, 3 or 4 of FIG. 23, as indicated.

Figure 22:
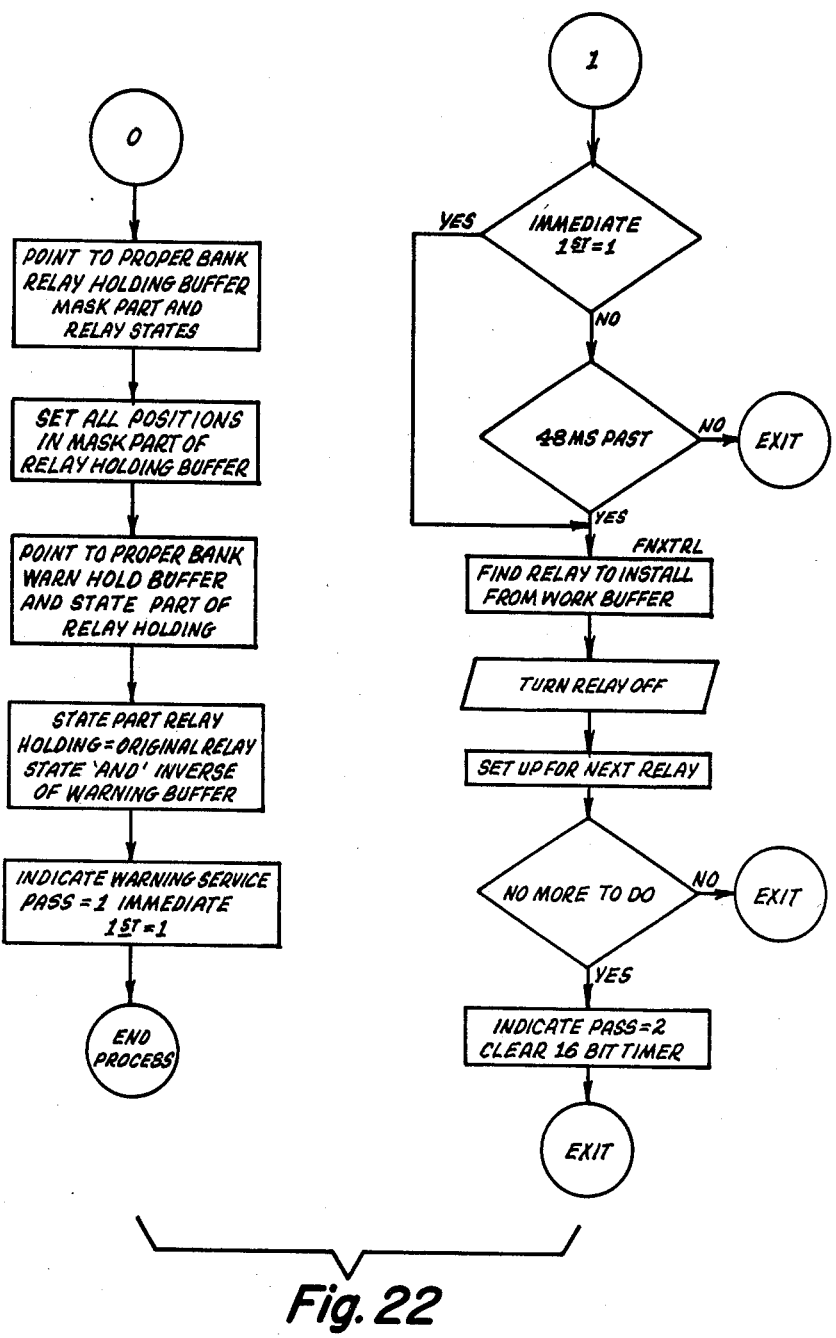

Pass 0 is described on FIG. 22 at Connector 0. The purpose of this pass is to setup the relay holding buffer with the final relay states to be installed at the end of the warning. In addition, other operations necessary to perform the warning process are carried out. On entry to Pass 0 a pointer is established to the mask portion of the proper relay holding buffer and additionally to the current relay states buffer. Following this, all positions of the mask portion of the relay holding buffer are set to 1's. Next, a pointer is established to the state portion of the relay holding buffer and proper bank warning holding buffer. The state portion of the relay holding buffer is then set equal to the original relay state word ANDed with the inverse of the warning buffer. Finally, a warning service is indicated, the immediate first service bit is set, and the pass counter is set to Pass 1.

The purpose of Pass 1 is to turn all desired relays OFF using 48 milliseconds width pulses, as indicated in FIG. 22 connector 1. The immediate first service flag is checked. If it is not set, then a test is performed to determine if 48 milliseconds has passed since the last warning service. If not, then the process exists, as indicated. Otherwise, the process continues as it would in the case where the immediate first service bit had been set to a 1. The desired relay to install is found from the mask portion of the working buffer (by invoking FNXTRL) and is then turned OFF. Following this, the relay number is incremented and a test is performed to see if there are more relays to do. If there are, then the process exits, as indicated, otherwise the 16 bit timer is cleared and the pass counter is set to Pass 2, completing the actions required for Pass 1.

Figure 23:
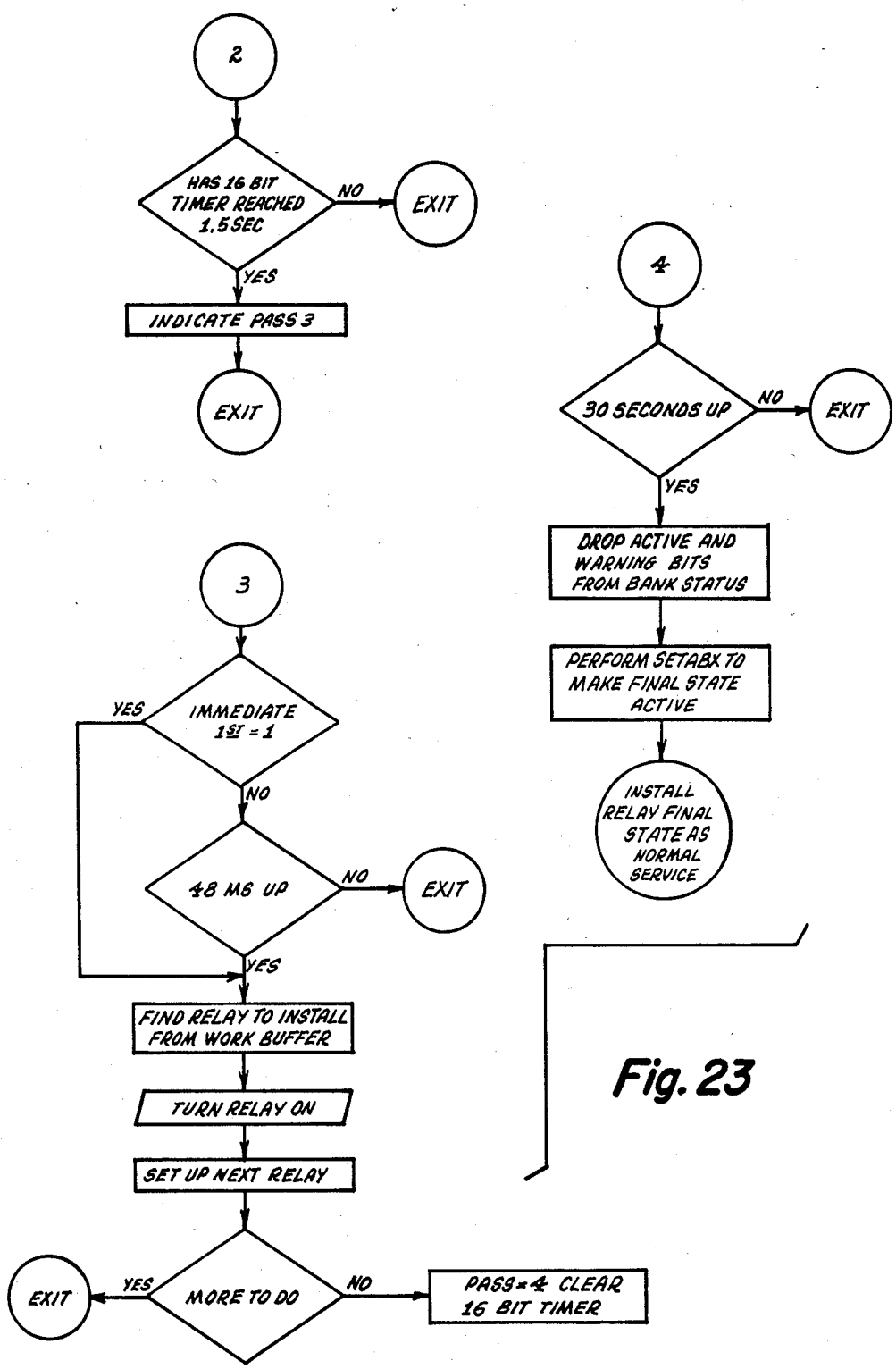

FIG. 23 describes the actions required for Pass 2. The 16 bit timer is tested to determine if 1½ seconds have transpired. If not, then the process completes. Otherwise the pass indicator is set to 3 and the routine exists.

Pass 3 is a dual of Pass 1. It is identical with the exception that relays are turned ON and that on completion of Pass 3 the pass indicator is set to number 4. Connector 3 describes the process for Pass 3.

The final actions required for warning indications are described at Connector 4 of FIG. 23. As indicated in the diagram, a test is performed to determine if 30 seconds have transpired since the relays were turned to the ON state by Pass 3. If not, then the process exits. Otherwise, all indications of active servicing and warning are removed from the bank status. Following this, the process SETABX is invoked in order to make the final relay state determined during Pass 0 active for normal relay servicing. This completes the warning service which then exits so as to allow the installation of the final relay state as a normal relay service.

This completes the description of the warning service process which allows: a means for warning a human occupant of an upcoming change in load status using a single point of control; a means for providing a 30 second delay interval for the occupant to countermand an upcoming change in load status; a means for reducing the data communication traffic requirements for indicating a warning action.

Decoder Handler

The purpose of the decoder handler is to monitor the receiver buffer and determine when a valid message has been received for decoding. When it is determined that a message is awaiting decoding, the message is verified for correctness of format, proper address and the proper check or parity word at the end of the message. Once the validity of the message has been determined, the decoder will recognize various commands for the device in question. The desired actions are then performed which might include the manipulation of internal data buffers and possible transmission of messages to the controlling device via the common data line.

The Decoder Handler includes three main routines: the DECODE routine, responsible for decoding the flag portion of the messages as well as performing other supervisory tasks; the Address Check routine, ADRCHK, responsible for verifying the proper address and checksum or parity word; and the Transmission routine, SENDIT, which is responsible of the transmission of data requiring immediate or interactive transmission.

Figure 24:
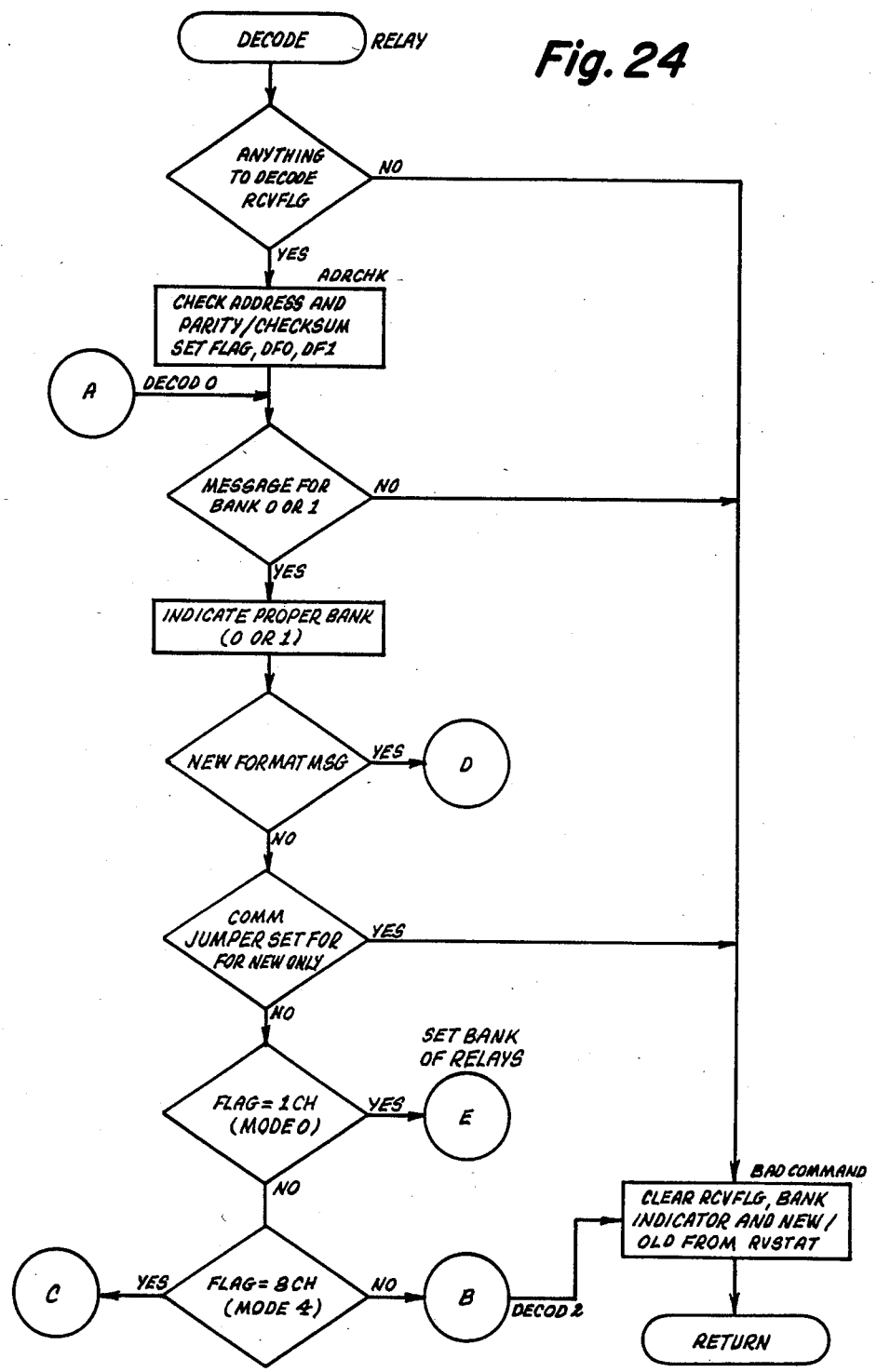

The Decode, DECODE, routine is invoked by the executive and is described in FIG. 24 for the relay transceiver. Beginning with the entry point, a test is made of the RVSTAT register to determine if the RCVFLG is set indicating the presence of a message in the receiver buffer. If not, then control continues to Connector B or DECODE2 which is an abort from the Decode utility that will clear the RCVFLG bank indicators and new/old mode bits from RVSTAT and then return to the executive. If it is determined that there is a message to be decoded in the Receiver Buffer, then the utility ADRCHK is invoked in order to check the address and parity or checksum word of the message and build the flag, DF0 and DF1 storage register as required. At Connector A, DECOD0, a test is performed on the RVSTAT register to determine if there is a message waiting decoding for either bank 0 or bank 1. If not, then the routine aborts through Connector B. Otherwise, the proper bank, either 0 or 1, is indicated (by setting or resetting the flag F0). A test is then made to determine if the message is in a new format. If so, the control continues at Connector D of FIG. 26. Otherwise, a test is made to determine if the COMM jumper has been set indicating new format messages only. If so, then the utility aborts through Connector B. Otherwise, the decoding of the two possible old mode flags continues as indicated. If the flag is equal to 1CH (Mode 0) then a command to set an entire bank of relays has been received and control continues at Connector E of FIG. 27. Otherwise, a test is performed to determine if the flag received was equal to 8CH (Mode 4). If not, then the DECODE aborts through Connector B. Otherwise, further processing of the mode 4 command is required and the procedure continues with Connector C of FIG. 25.

Figure 25:
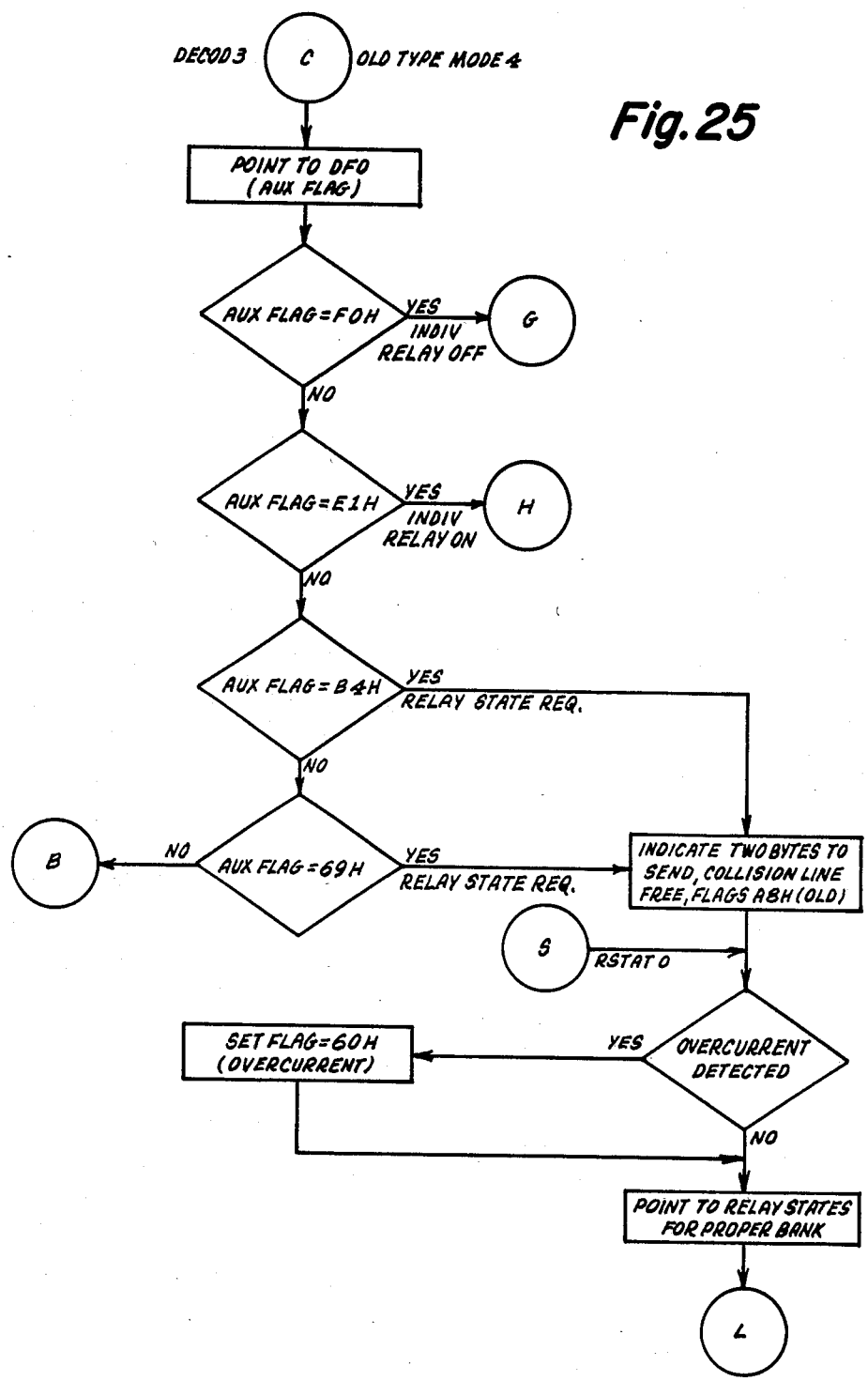

The DECODE routine continues on FIG. 25 at Connector C. The receiver buffer pointer is incremented to point the data field DF0 for decoding of the Mode 4 or auxiliary flag commands. A test is then made to determine if the auxiliary flag is equal to F0H. If so, then an individual relay OFF command is being issued and control continues with Connector G of FIG. 28. Otherwise, a test is made to determine if the auxiliary flag is equal to a value of E1H in which case an individual relay ON command is being specified and control continues at Connector H of FIG. 28. If not, then a further test is performed for an auxiliary flag value equal to B4H or 69H. If no auxiliary flag decodes, then the routine aborts as indicated by passing control to Connector B of FIG. 24. Auxiliary flags B4H and 69H correspond to a relay state request. A desire to transmit two bytes of data is indicated along with a collision line free and the flag is set to A8H (an old mode flag). Continuing, a test is then performed to determine if an overcurrent condition has been detected and so indicated in the TRD STATUS register. If so, then the flag is corrected to a value of 60H indicating an overcurrent detection in the new format for transmission. Otherwise, the proper bank of relay states is pointed to and the process continues at Connector L on FIG. 30.

Figure 26:
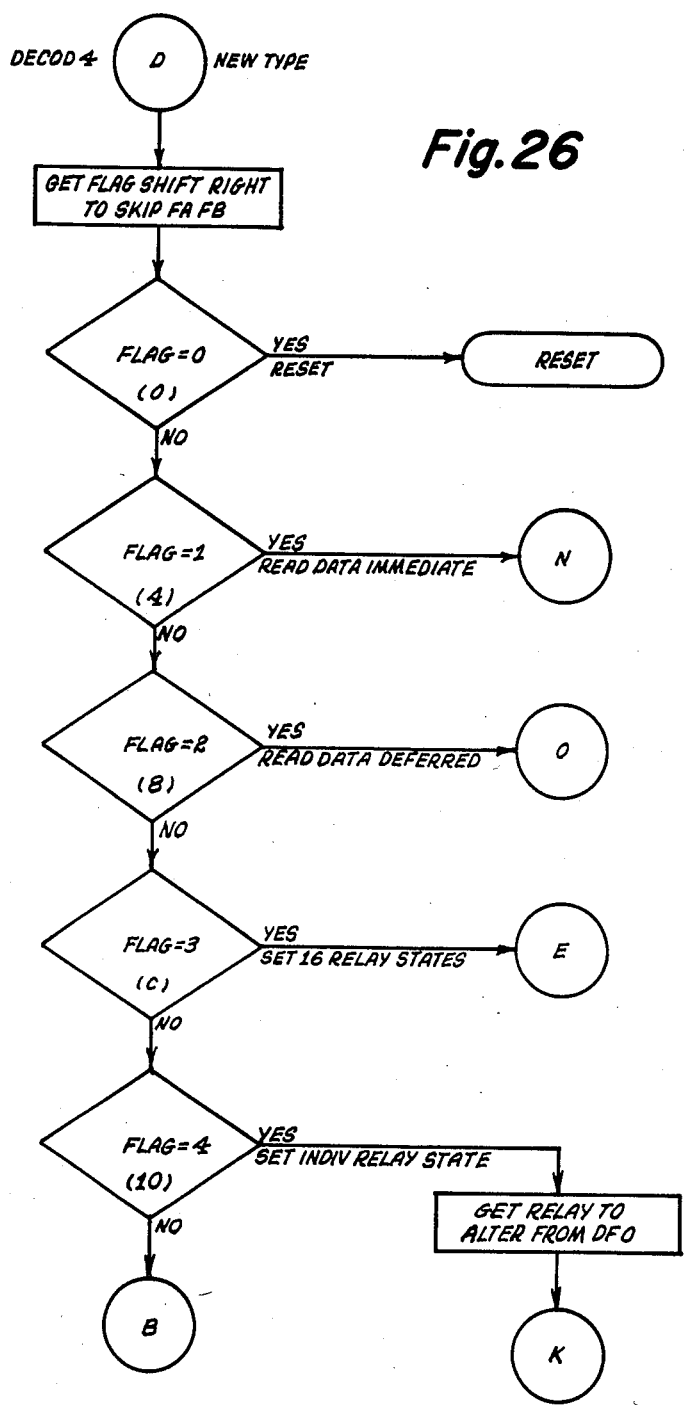

FIG. 26 describes the decoding used for new type commands. Beginning with Connector D, the received flag is shifted two positions to the right in order to skip over the FAFB bits. A test is then performed to determine if the adjusted flag is equal to a value of 0. If so, then a reset command has been issued and the procedure continues with the reset algorithm. Otherwise, a test is made to determine if the flag is equal to 1 indicating a desire to read data with an immediate or interactive transmission (continuing at Connector N of FIG. 31). If the flag is equal to a value of 2, then a command requiring data to be read and retransmitted in a deferred method is indicated and control continues at Connector 0 of FIG. 31. For a flag value equal to 3, the process continues at Connector E of FIG. 27 indicating a command to set an entire bank of 16 relay states. A final test is performed for the new type commands for a flag value equal to 4 indicating a desire to set an individual relay state. The relay and desired state are fetched from DF0 and control continues at Connector K of FIG. 28, as indicated. If it is not possible to decode a new type flag, then the procedure aborts at Connector B.

Figure 27:
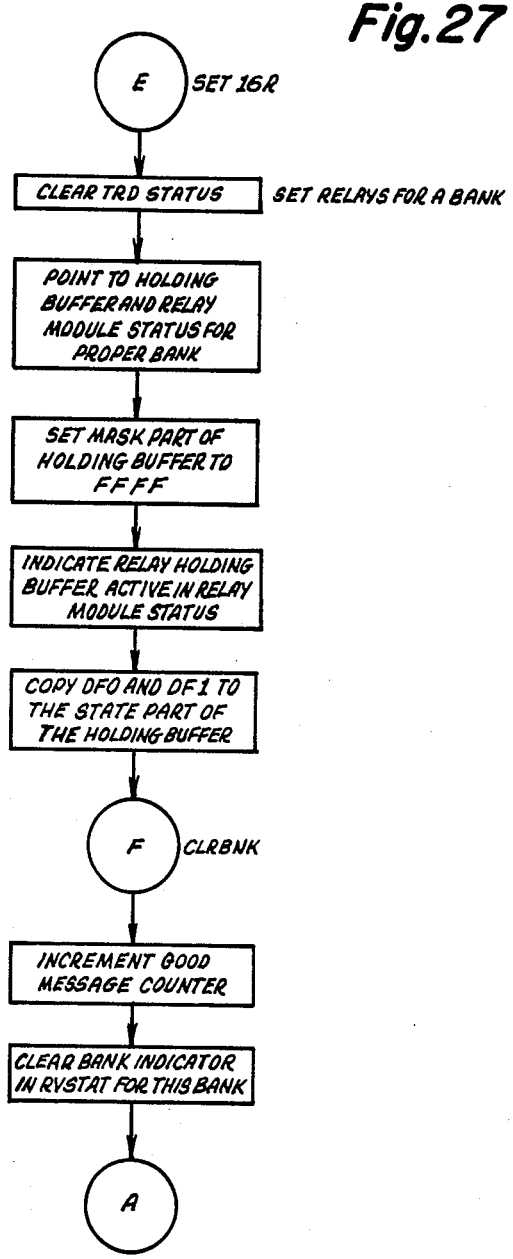

The SET16R or routine to set an entire bank of relays is described in FIG. 27. As indicated, the STATUS register of the TRD is cleared and pointers are set to the holding buffer and relay module status register for the proper bank of relays. Next, the mask portion of the holding buffer is set to a value of FFFFH indicating desired actions on all 16 relays. The relay holding buffer active flag is then set in the relay module status and data field 0 and 1 are copied into the state portion of the holding buffer. The procedure continues at Connector F which is the CLRBNK or Clear Bank process. The good message counter is incremented to indicate the decoding of a proper command and the bank indicator corresponds to the command just decoded is cleared in RVSTAT. Control then continues at Connector A of FIG. 24 in order to process any information for the other bank.

Figure 28:
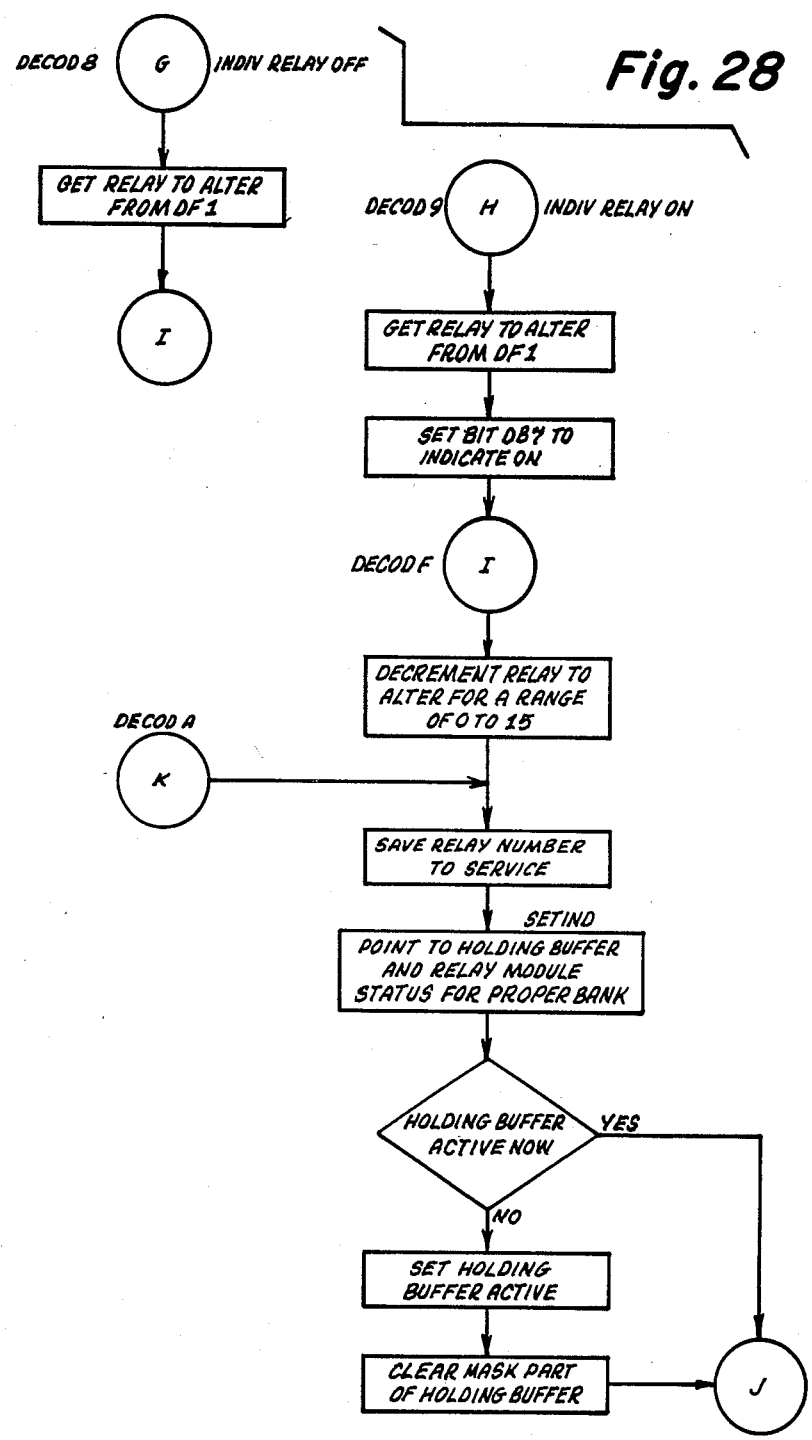
Figure 29:
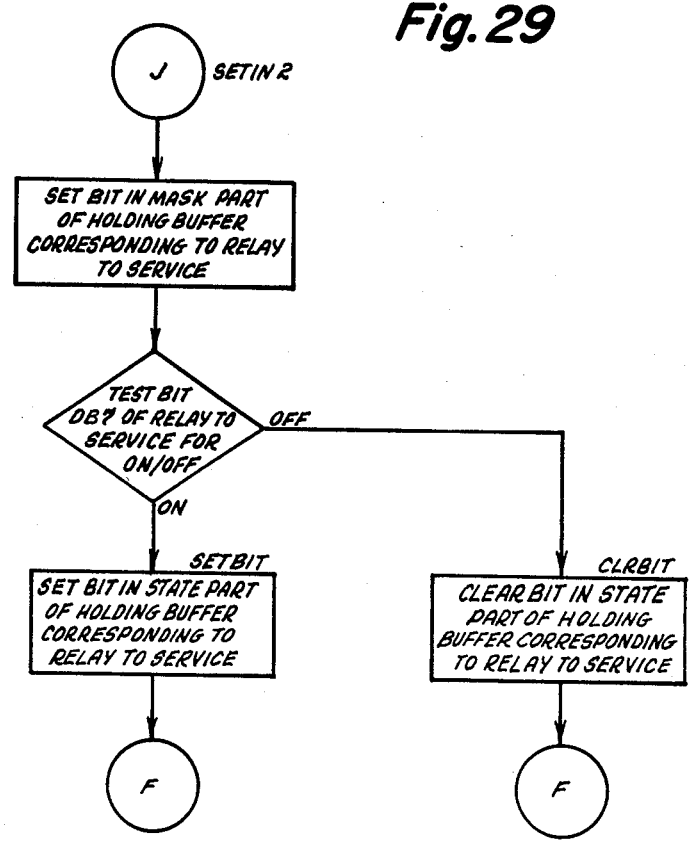

The individual relay OFF command is described in FIG. 28 at Connector G. The relay number to be altered is fetched from DF1 and control continues at Connector I. Connector H describes the individual relay ON function. The relay number to be altered is fetched from DF1 and bit DB7 is set to indicate an ON action. Control continues at Connector I where the relay number to be altered is decremented by 1 to result in a range of 0 to 15 (consistent with the new mode of individual relay control). Continuing with Connector K, the relay number to be serviced is saved and control continues to the individual relay set command SET1ND. A pointer is established for both the holding buffer and relay module status for the indicated bank. A test is then made to determine if the holding buffer is currently active. If so, then control continues at Connector J of FIG. 29. If the holding buffer was not active, then the holding buffer active bit is set within the relay module status and the mask portion of the holding buffer is cleared to eliminate any previous actions and control continues at Connector J.

At Connector J (FIG. 29), the individual relay set command continues by setting a bit in the mask portion of the holding buffer corresponding to the relay number to service. A test is then performed of bit DB7 of the relay to service to determine the ON/OFF indication. If the action is to be OFF, then the CLRBIT routine is invoked in order to clear a bit in the state portion of the holding buffer corresponding to the relay number to service, at which point control continues at Connector F of FIG. 27. On the other hand, if an ON action was desired, then the SETBIT routine is invoked in order to set a bit in the state portion of the holding buffer corresponding to the relay number to service. The process continues at Connector F.

Figure 30:
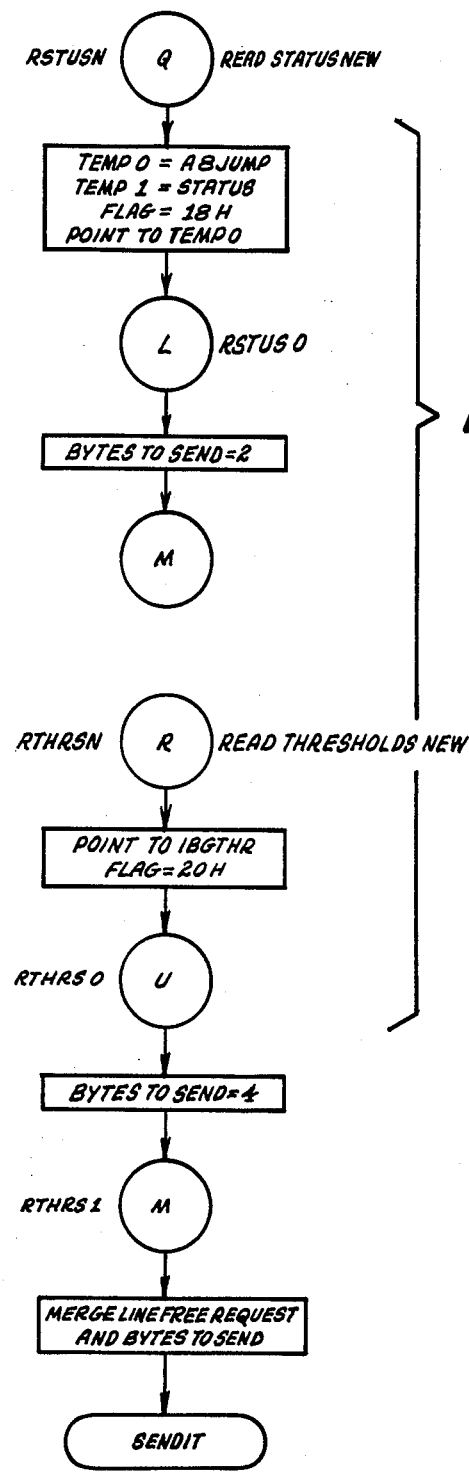

The read status in new format command is described in FIG. 30 at Connector Q. The TEMP0 register is set equal to the A8JUMP value containing address bit A8 and the jumper definition for the TRD. TEMP1 is set equal to the STATUS register of the TRD. The flag register is then set to a value of 18H and a pointer to TEMP0 is established. Continuing at Connector L, an indication is made that two bytes of data are to be transmitted and the process continues at Connector M.

Connector R describes the read threshold in new format process. The IBGTHR register is pointed to and the flag is set equal to a value of 20H. Continuing through Connector U, four bytes of data are indicated to be sent. At Connector M, the previously determined line free requirement and the number of bytes to send are merged together. The process continues with the SENDIT routine described in FIG. 33.

Figure 31:
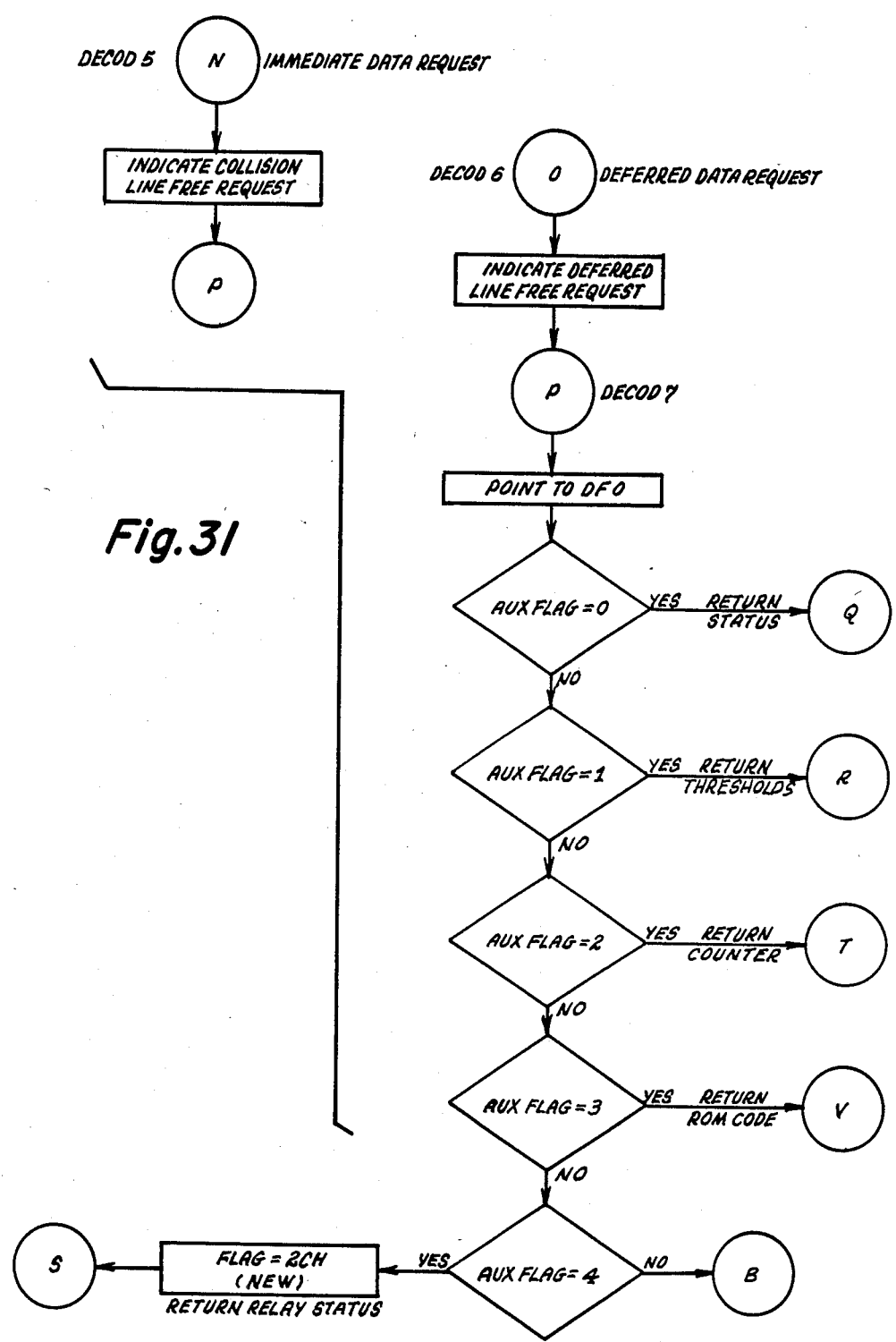

Connector N of FIG. 31 is entered whenever there is an immediate or interactive request for data. A collision line free requirement is indicated and control continues at Connector P. Connector O is entered whenever there is a deferred request for data and a deferred line free requirement is indicated when control continuing at Connector P.

Connector P describes the decoding performed on the auxiliary flags for the read data request. Data Field DF0 is pointed to and a test is made of the auxiliary flag in that position to determine if it is equal to 0. If so, then a request for system status is indicated and control continues at Connector Q of FIG. 30. If the auxiliary flag is equal to 1, then receiver thresholds are being requested and control continues at Connector R of FIG. 30. An auxiliary flag value of 2 indicates a desire to return the data line counters (good or bad message counts) and control continues at Connector T of FIG. 32. An auxiliary flag value of 3 indicates a request for ROM code version handled at Connector V of FIG. 32. Finally, an auxiliary flag equal to 4 indicates a desire to return relay states. The flag is set equal to a value of 2CH and control continues at Connector S of FIG. 25. If no auxiliary flag can be decoded, then the decode routine aborts to Connector B of FIG. 24.

Figure 32:
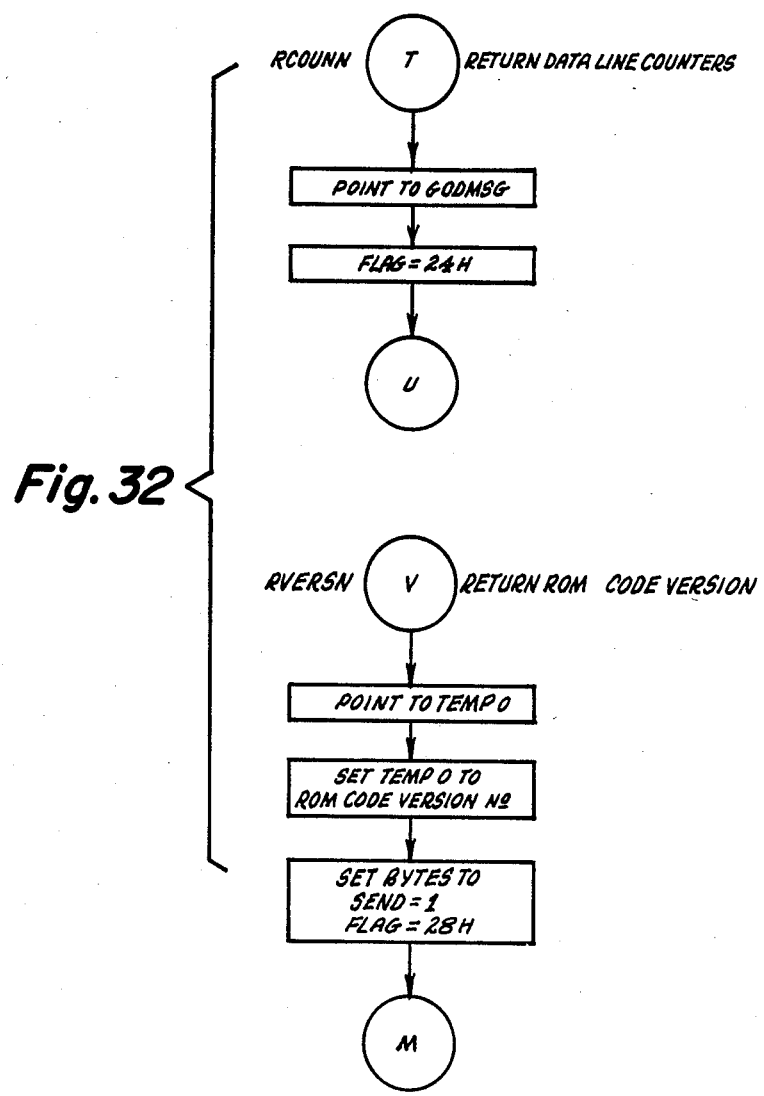

FIG. 32, Connector T describes the process for returning the data line counters. The GODMSG register is pointed to and the flag is set to a value of 24H with control continuing at Connector U of FIG. 30.

The return ROM code version request is handled at Connector V. A pointer to TEMP0 is established and TEMP0 is then set equal to the ROM code version number. One byte of data to be sent is indicated, and the flag is set to a value of 28H. Control continues at Connector M of FIG. 30.

Figure 33:
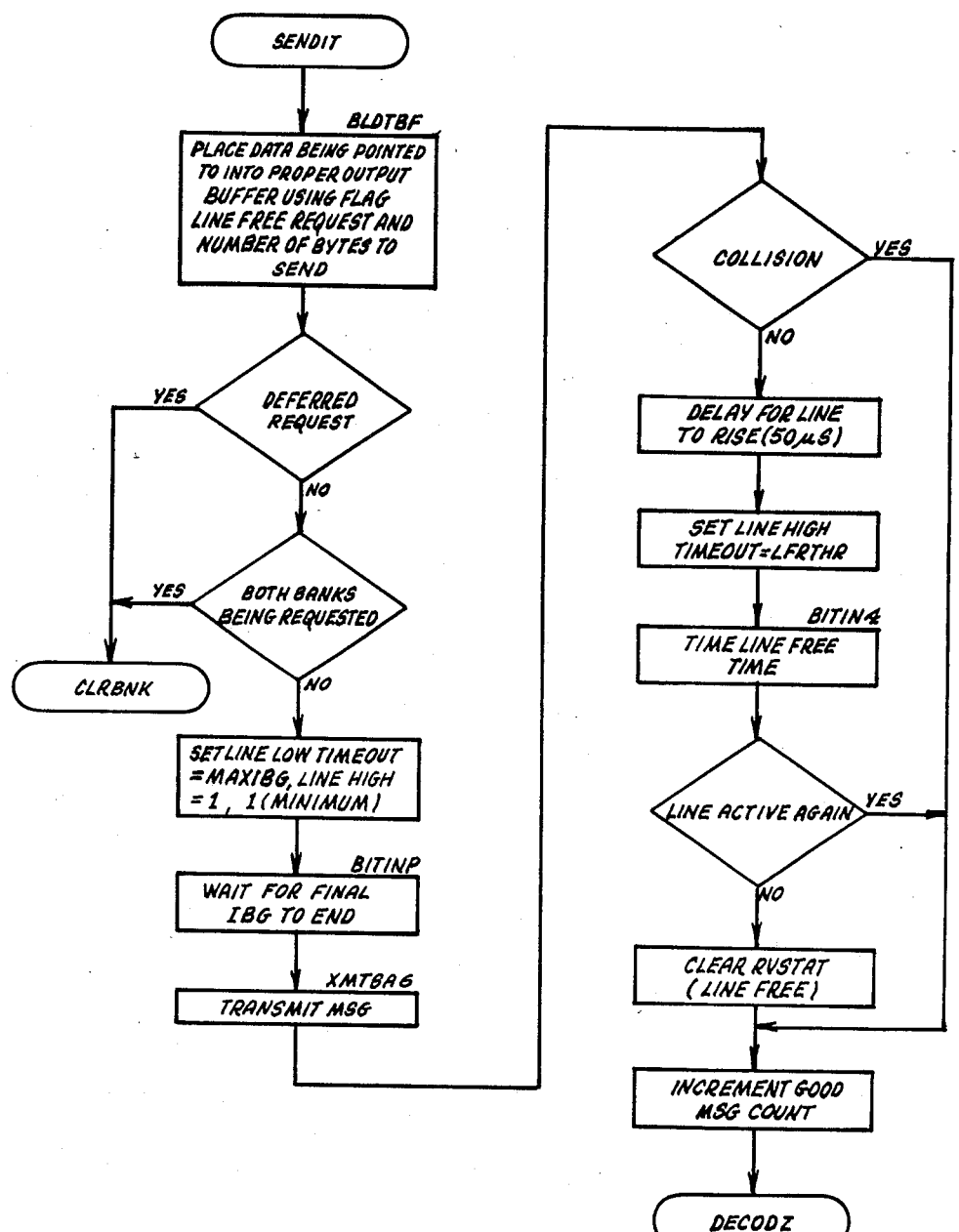

The SENDIT routine is described in FIG. 33. It is responsible for placing data required for transmission into the output buffers and then determining if immediate transmission requirements are needed. If SENDIT performs the actual transmission of a message in an interactive data transmission, then it will test the line free requirements in order to clear out previously established receiver thresholds if the line goes free upon successful transmission of the data.

SENDIT places the data being pointed to into the proper output buffer using the flag, line free request, and number of bytes to send by invoking the BLDTBF routine. A test is then performed in order to determine if a deferred line free requirement is needed. If so, then the process CLRBNK is invoked, which is described in FIG. 27 Connector F. Otherwise, if an immediate transmission is required, then a test is performed in order to determine if both banks are being requested. If so, then the immediate transmission of the first bank is postponed and the process continues with the CLRBNK routine. If only one bank of information is to be transmitted, then the line low timeout is set equal to the maximum interblock gap time and the line high timer is set to the minimum. The BITINP routine is then invoked in order to wait for the final IBG of the interactive transmission message to complete; at which point the transmit process is invoked in order to transmit out the required data. If at any time during the transmission a collision is detected, then the process will continue as indicated on the diagram. Otherwise, a delay will be invoked in order to allow the line to go from its low impedance state (from the final IBG) to the high impedance state (50 microseconds). The line high timeout is then set equal to the line free threshold value and the process BITIN4 is invoked in order to determine if the line is active. If the line does not go active, then RVSTAT is cleared indicating a line free condition and the process continues as indicated. If the line did go active then the controlling device has reestablished control of the data line. Therefore, the receiver thresholds are not to be cleared. The good message counter is incremented and the process continues at the DECOD2, FIG. 24 Connector B.

Figure 34:
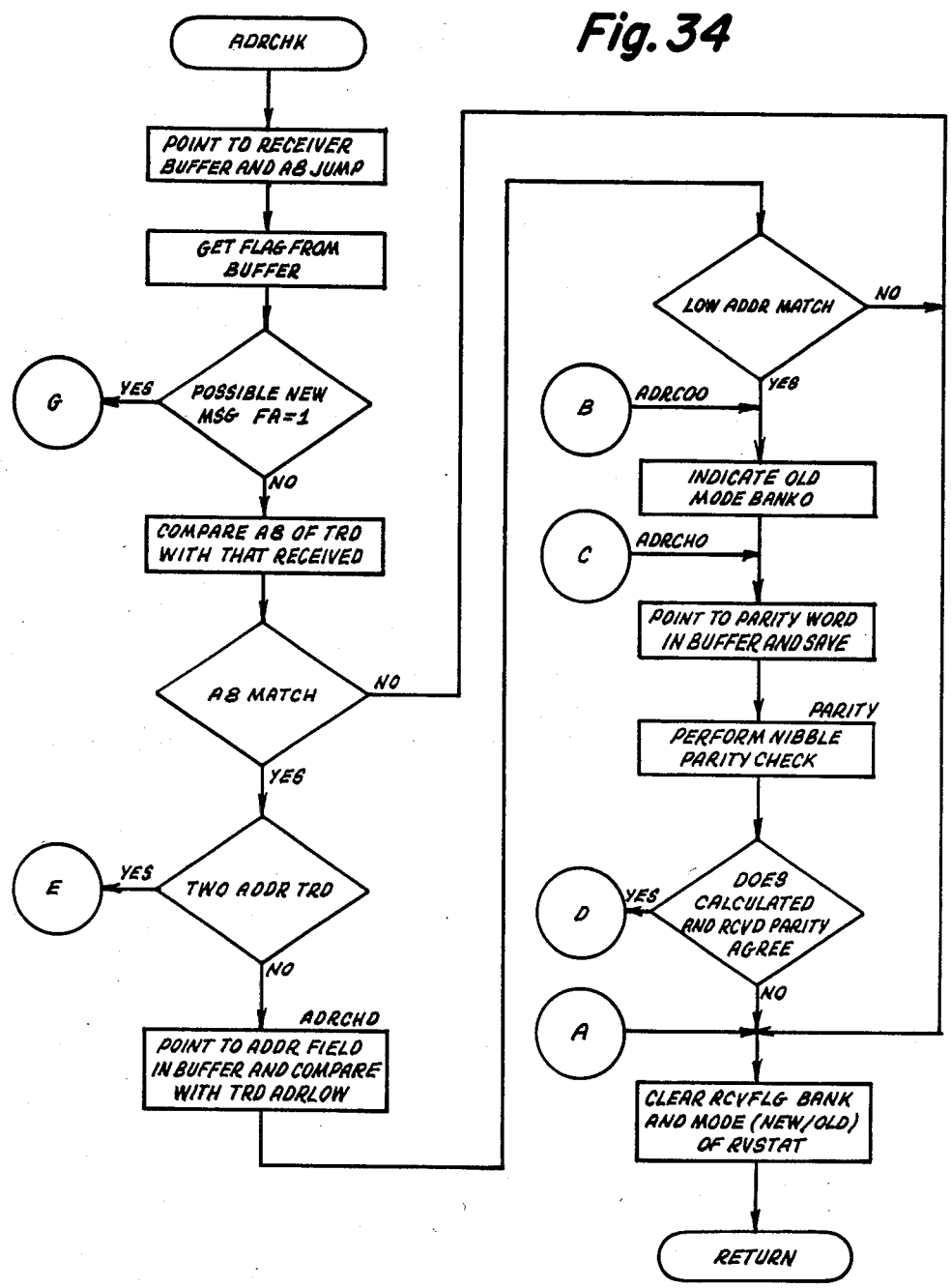

The address check routine ADRCHK is described in FIG. 34. It is responsible for verifying that a message in the receiver buffer is, in fact, addressed to the proper transceiver decoder. In addition, it will verify the correctness of the message by performing a nibble parity check or checksum verification of the message. If both the address and check portions of the message are correct, then three registers will be set to the proper values for the flag, data field 0, and data field 1.

The description of ADRCHK begins with FIG. 34. The proper receiver buffer is pointed to for the desired bank along with the A8JUMP register. The head of the buffer is fetched in order to get the flag. A test is then performed to determine if this is a possible new mode message by examining the FA bit (or bit DB1) of the flag to see if it is set. If so, then control continues at Connector G of FIG. 36. Otherwise, address bit A8 of the transceiver decoder is compared with that received. If there is not an A8 match, then continuing with Connector A, the RCVFLG bank and mode indication are cleared from RVSTAT and the address check routine returns. Otherwise, if there is an address A8 match, then a further test is performed to determine if it is a two address TRD. If so, then control continues at Connector E of FIG. 35. If the transceiver decoder is a single address device, then the address field is pointed to and compared with the TRD ADRLOW register by the ADRCHD procedure. If there is not a low address match, then the process aborts through Connector A. Otherwise, continuing through Connector B, an old mode bank 0 message is indicated. At Connector C, the parity word in the receiver buffer is pointed to and saved for later comparison. Next a nibble parity check is performed by the PARITY routine and a test is performed to determine if the received and calculated parity agree. If not, then ADRCHD aborts and clears the receiver flag RCVFLG at Connector A. Otherwise, the process continues at Connector D of FIG. 35.

Figure 35:
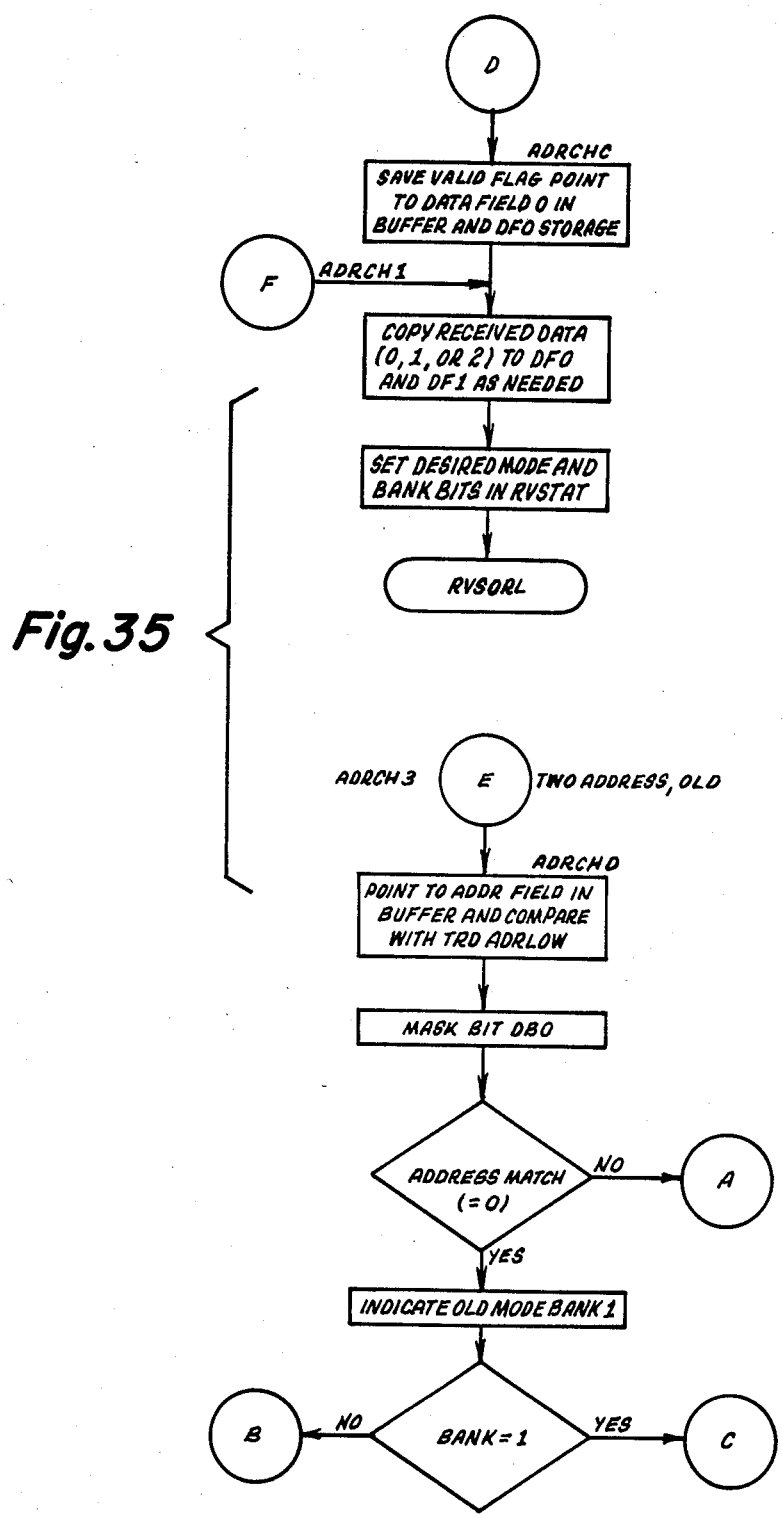

Continuing with the description of the ADRCHK process at Connector D of FIG. 35, the valid flag from the receiver buffer is saved and data field 0 in the buffer is pointed to along with DF0 storage by the ADRCHC procedure. At Connector F, the copy routine is invoked in order to copy the received data (0, 1 or 2 bytes) from the receiver buffer to the DF0 and DF1 storage registers as required. The desired mode bits and bank bits are then set within RVSTAT by dispatching through the RVSORL routine.

Connector E is entered whenever an old mode two address TRD is to be verified. The process ADRCHD is invoked in order to point to the address field in the buffer and compare this with the TRD ADRLOW. Data bit DB0 of the result is then masked out. (This least significant bit determines the bank that the message was intended for in a two addredd TRD. DB0 equals to 0 corresponds to bank 0 and DB0 equals to 1 corresponds to bank 1.) If there is no address match, then the process aborts at Connector A of FIG. 34. Otherwise, the old mode type message for bank 1 is indicated. A test is then performed to determine if the message in fact was to bank 1 by testing at DB0 of the received address field. If it was to bank 1, then the process continues at Connector C of FIG. 34. Otherwise, the process continues at Connector B of FIG. 34.

Figure 36:
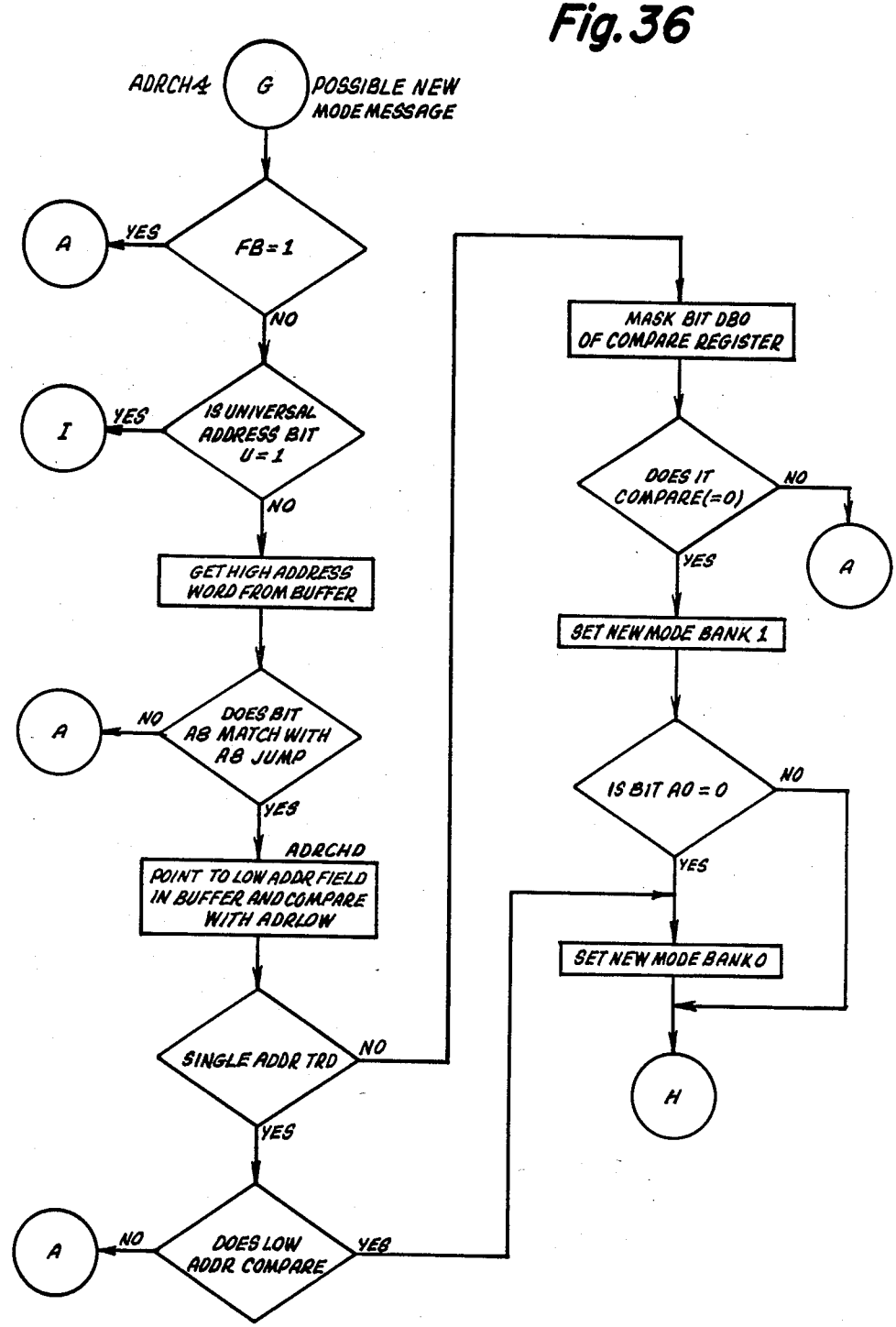

Connector G of FIG. 36 is entered whenever there is a possible new mode message. A test is performed on Bit FB (DB0 of the flag word) to determine if it is a 1. If so, then the new mode addressing is not being used and the process aborts via Connector A of FIG. 34. Otherwise, a test is performed of the universal address bit U within the high address word. If U is equal to 1, then the process continues at Connector I of FIG. 38. Otherwise, universal addressing is not being used. The high address word is fetched from the buffer and it is compared with address bit A8 of the TRD. If there is not a match, then the process aborts at Connector A. Otherwise, the low address field is pointed to in the buffer and compared to the ADRLOW storage register by the routine ADRCHD. A test is then performed to determine if the transceiver is a single address type. If so, then a test is made to determine if the low address received and that contained in the ADRLOW register compare. If not, the process aborts at Connector A. Otherwise, it continues as indicated on the diagram. If the device was a two address TRD, then Bit DB0 of the result of the comparison of ADRLOW and the received low address field is masked off. If the remaining address bits do not compare then the process aborts at Connector A. Otherwise, a new mode message for bank 1 is indicated and a test is performed on address bit A0 to see if it is set to 0 indicating a bank 0 message. If so, then the indication is changed to a new mode bank 0 message. Otherwise, it is left as a new mode bank 1 message and control continues at Connector H of FIG. 37.

Figure 37:
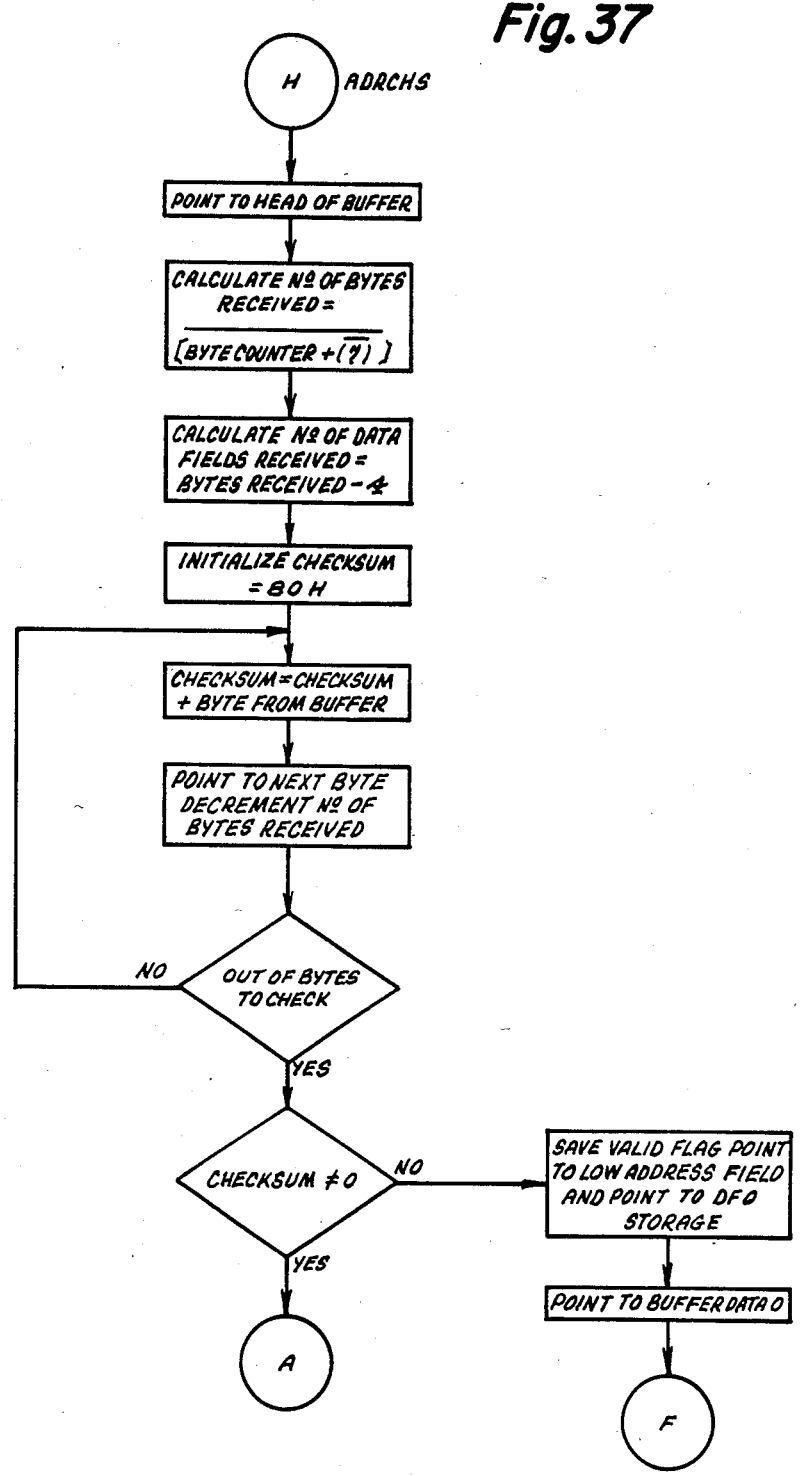

Continuing with the description of the new mode address checking at Connector H of FIG. 37, the head of the receiver buffer is pointed to. Following this, the number of bytes received is calculated by taking the 1's complement of the sum of the down-counting byte counter register plus the 1's complement of 7. The number of data fields received is calculated by subtracting 4 from the total number of bytes received. Next the checksum register is initialized to a value of 80H. A byte from the receiver buffer is then summed into the checksum register and the pointer to the receiver buffer is incremented to the next byte. The number of bytes received is decremented and a test is made to determine if there are any additional bytes to sum into the checksum. If so, then the process of summing the bytes incrementing the pointer, and decrementing the byte count continues until all bytes have been summed into the checksum. When all bytes have been checked, then a test is made to determine if the final checksum value is equal to 0. If not, then the process aborts at Connector A of FIG. 34. Otherwise, the head of the buffer is saved as a valid flag, the low address field is pointed to and data field storage register is pointed to by the process ADRCHC. Data field 0 is then pointed to in the receiver buffer by incrementing the buffer pointer and control continues at Connector F of FIG. 35.

Figure 38:
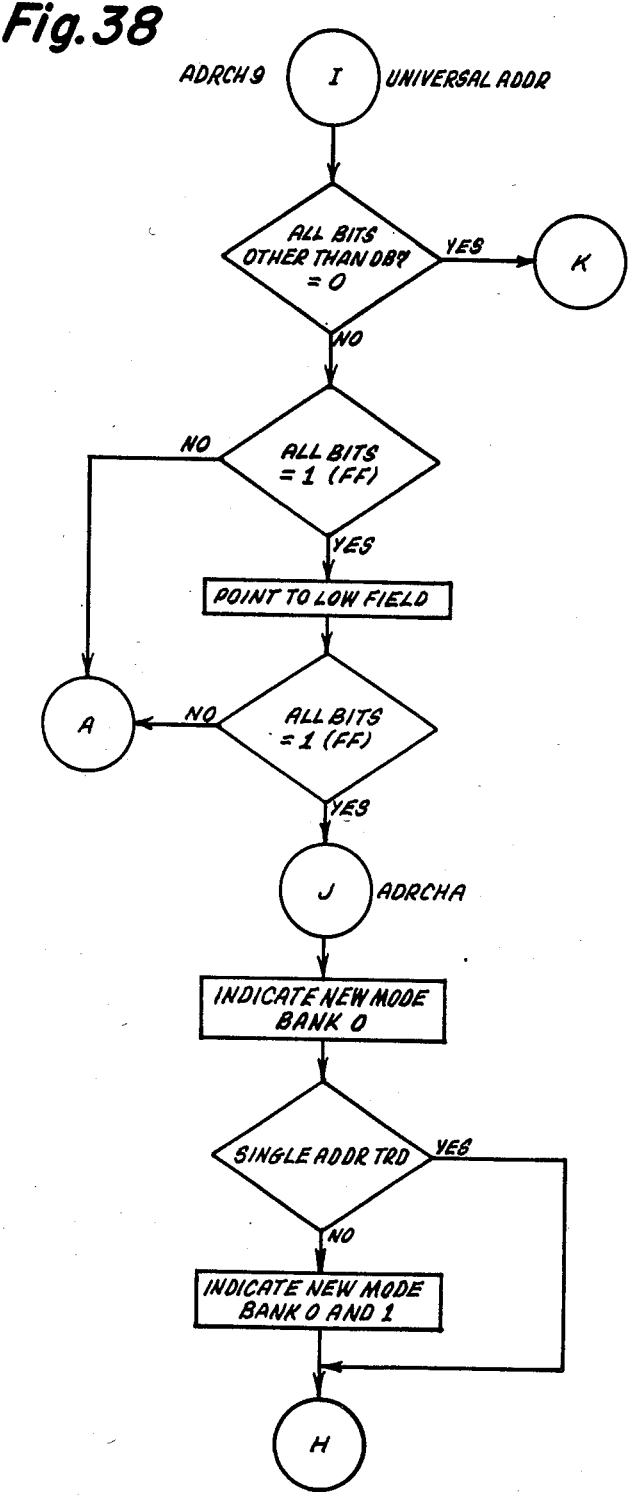

Whenever it is determined that universal addressing is being used within a new mode, Connector I of FIG. 38 is entered. A test is performed in order to determine if all bits other than the U (or DB7) bit of the high address field is equal to 0. If so, then a Family universal address is being used and control continues at Connector K of FIG. 39. Otherwise, a test is made of the high address field to determine if all of the bits are equal to 1. If not, and an improper address has been received then the routine aborts at Connector A of FIG. 34. Otherwise, the low address field is pointed to and a further test is performed to insure that it also is equal to all 1's. If not, the process aborts. Otherwise, it continues at Connector J. A new mode transmission for bank 0 is indicated and a test is performed to determine if the device is a single address TRD. If so, then control continues at Connector H of FIG. 37. Otherwise, the indicator is updated to reflect a new mode transmission for both banks 0 and 1. (A universally addressed message transmitted to a two bank TRD will result in actions being performed on both banks of that transceiver decoder.)

Figure 39:
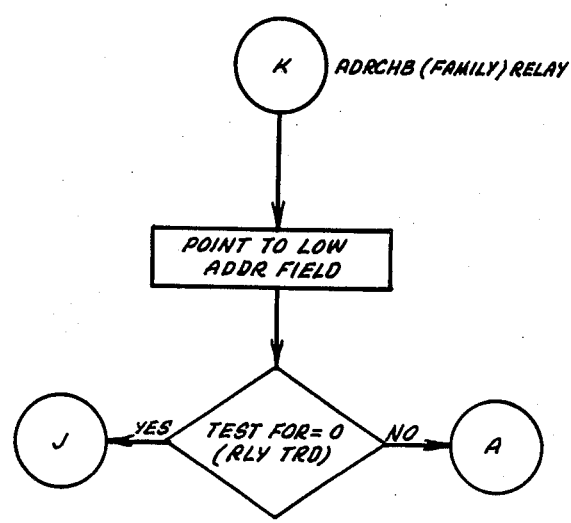

FIG. 39 describes the testing involved for a Family type universal address. At Connector K, the low address field is pointed to and a test is made of that field to determine if it is equal to 0. If so, then a Family address for a relay transceiver has been issued and control continues at Connector J of FIG. 38. Otherwise, the address check utility aborts at Connector A of FIG. 34.

Figure 40:
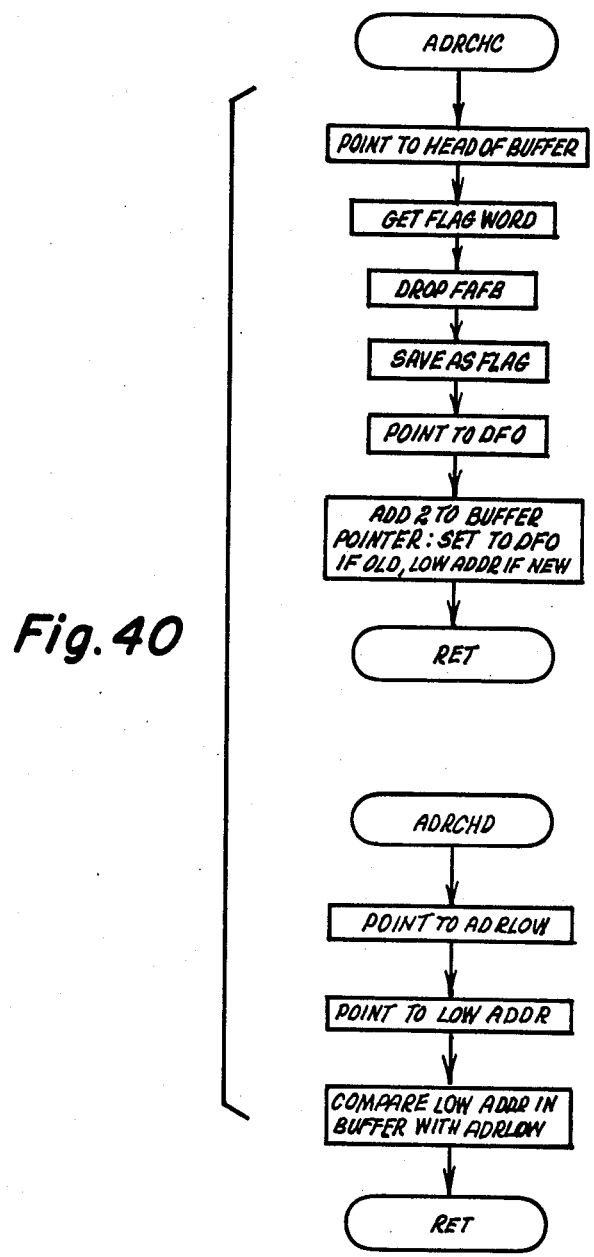

FIG. 40 describes the two subroutines required by the ADRCHK process. ADRCHC points to the head of the receiver buffer, gets the received flag word, masks out the two least significant bits FAFB and saves the result as the flag. Next, DF0 storage register is pointed to. Finally a value of 2 is added to the receiver buffer pointer such that it will point to data field 0 if an old type message or the low address field if it is a new type message. This completes the subroutine which then returns. ADRCHD is used to order the point to the ADRLOW storage register of the transceiver decoder, point to the low address field by incrementing the receiver buffer pointer and to compare the low address in the buffer with the ADRLOW storage register. This completes the routine which then returns to the invoking procedure.

This completes the description of the Decoder Handler Module which provides a means of verifying the address of a message received; a means of distinguishing between one of two banks for a message received; a means of recognizing two formats of messages (old and new); a means of aborting the decode of a message if an invalid format is used; a means of decoding multiple flag words; a means of selecting which group of flags are to be decoded based on the presence or absence of a manufacturing installed jumper; a means of eliminating the response to old format commands by evaluating the presence or absence of a COMM jumper which can be Manufacturing installed; a means of allowing multiple number of data bytes to be input from the common data line; a means for decoding auxiliary flag commands for various types of devices which may or may not be jumper selectable; a means for indicating immediate or deferred response to requests for data transmission; a means of passing control of the data line from one device to the transceiver decoder in an immediate mode of transmission; a means of determining if the controlling device desires to regain control of the data line upon completion of an immediate transmission of data from the transceiver decoder; a means of deferring an immediate request for data if that request is to both banks simultaneously (as would be the case if a universal address command was used); a means for performing a modified checksum against the received message with an initial value of 80H in order to avoid the proper decoding of a message with all 0 or all 1 values; a means of performing a nibble parity check as required for the old format messages; a means for providing the proper setup of the following buffers: the relay buffer for either 16 or individual relay commands, and the switchleg mask buffer; a means of reading the following TRD data registers: the relay state register, the transceiver status, the receiver threshold register, the data line counter register, and the ROM code version; a means of counting the number of properly decoded messages by incrementing a good message counter; a means of automatically clearing the status register of the transceiver decoder upon reception of a command to reestablish the relay data; a means of allowing individual relay control; and a means of generating a special flag on the request for relay states or automatic transmission of relay states to indicate the detection of an overcurrent condition on the relay transceiver decoder. This information can be used by a controlling device to annunciate a failure or take corrective action.

Power-Up Executive and Miscellaneous Modules

Figure 41:
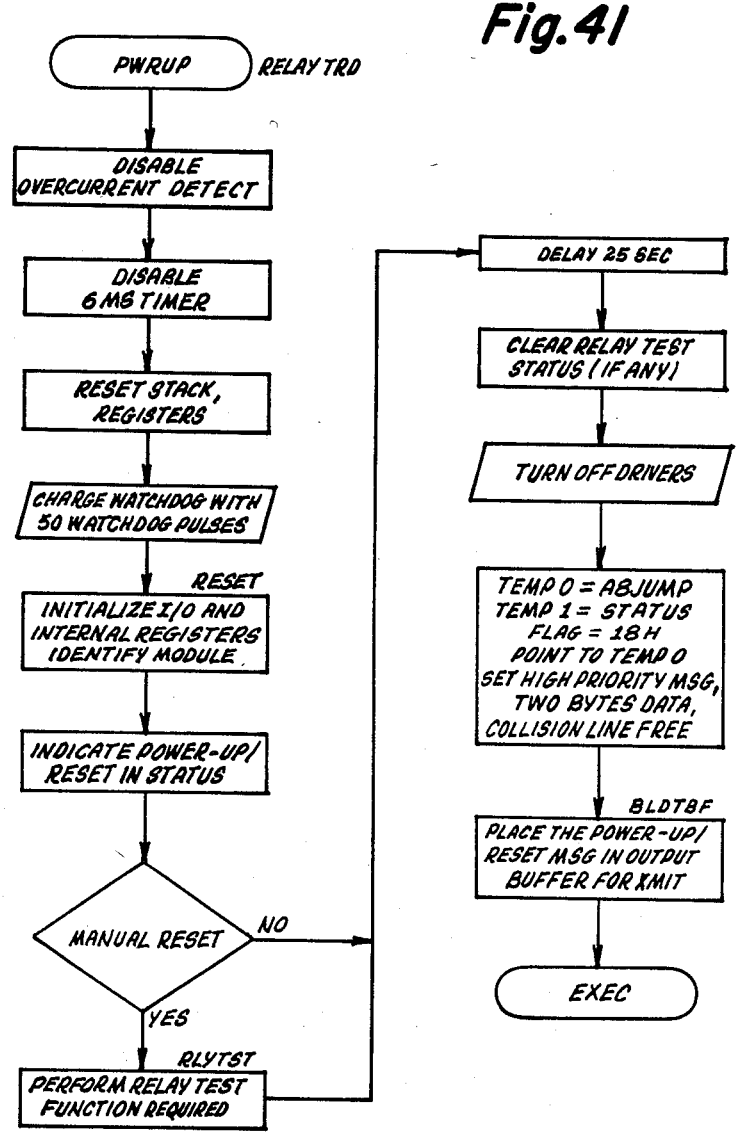
Figure 48:
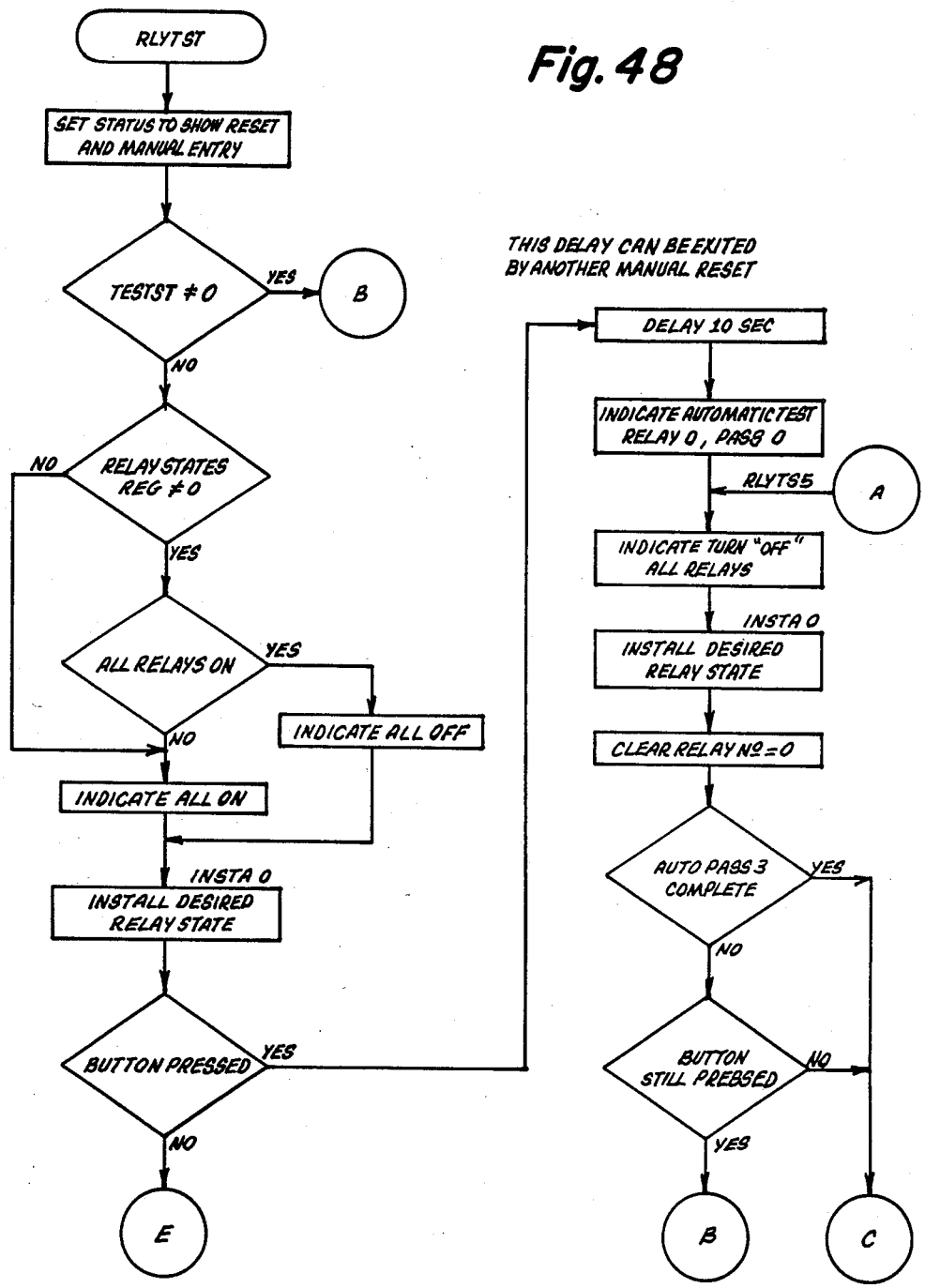

Processor 300, on Powerup or user initiated reset, begins to execute its internal ROM memory code beginning with Address 0 (which corresponds to the PWRUP routine). The powerup routine is responsible for proper initialization of the microprocessor and associated external hardware and for placing a powerup/reset message into the transmitter output buffer for subsequent transmission over the common data line. FIG. 41 describes the powerup routine, PWRUP, for the relay transceiver. The external overcurrent detection hardware is disabled by disabling the external interrupt. Next the internal timer (which is set for six millisecond timer interrupt intervals) is disabled. The stack is then reset and the proper bank of working registers is selected. Continuing with the description, the watchdog protection circuit hardware is recharged to avoid a protective reset of the microprocessor by issuing 50 pulses to the recharge line. At this point the RESET routine is invoked in order to initialize the I/O and internal registers of the microprocessor (including the proper memory registers) and identify the transceiver decoder module type. Next, powerup/reset indication is set into the status register of the TRD. A test is then made to determine if the origin of the reset was manual or not. If a manual reset (button actuated by operator) was detected then a relay test function is required and the process RLYTST is invoked (FIG. 48). Otherwise, the microprocessor enters a delay period of 25 seconds in order to allow the system to stabilize and to give the proper interval of time for the relay test functions. At the end of the 25 second delay, the relay test status is cleared and the relay drivers are turned to their OFF or no current condition. The register TEMP0 is set equal to the A8JUMP register; register TEMP1 is set equal to STATUS; the flag register is set equal to 18H; a pointer is established to the TEMP0 register; a high priority message with two data bytes and collision line free requirement is indicated and finally the powerup reset message is placed into the output buffer for transmission by the previously described BLDTBF routine. This completes the powerup procedure which then continues by entering the executive.

Figure 42:
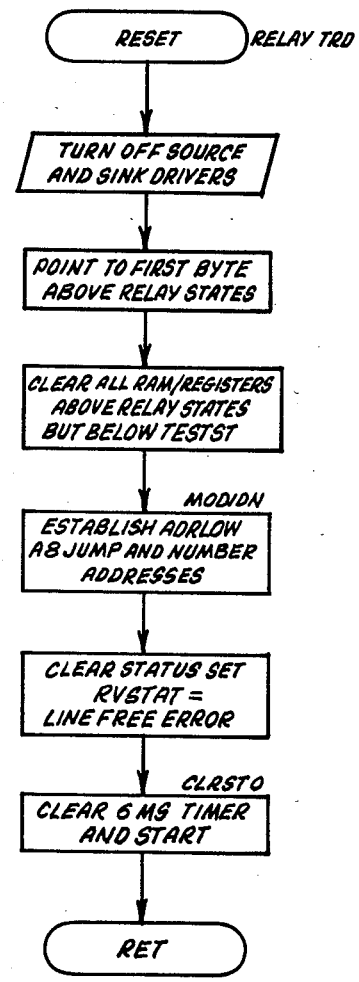

The reset procedure, RESET, is described in FIG. 42 for the relay TRD. It is responsible for initializing the I/O and all memory required by the microprocessor device. It will identify the module, indicate a line free error in order to require receiver resynchronization and start the appropriate timers. Beginning with the entry to RESET both the sink and source drivers are turned to their OFF or no current condition. A pointer is then established to the first byte in the microprocessor RAM above the relay states. All RAM and registers above the relay states but below the TESTST register arecleared to a 0 value. ADRLOW and A8JUMP along with the flag indicating single or dual address TRD's is established by the procedure MODIDN. Following this, the TRD STATUS register is cleared and RVSTAT is set equal to a line free error in order to require receiver resynchronization on a maximum line free interval before subsequent reception of any additional data over the common data line. RESET completes by restarting the 6 millisecond elapsed timer by invoking the procedure invoking procedure. It should be noted that the RESET procedure does not alter the state of either the relay states register of the TESTST register.

The executive is the main working procedure of the transceiver decoder. It is entered upon completion of the powerup procedure. Once the executive has been invoked, the only exit from the endless loop of the executive is via a reset (which would occur on power up/watchdog or operator initiated manual button reset). However, it is possible for the activity controlled by the executive to be suspended for a brief interval of time in order to service either the internal timer interrupt or an external interrupt indicating an overcurrent detection for the relay transceiver. It should be noted that the internal timer is set for a 6 millisecond interval and is always active.

Figure 43:
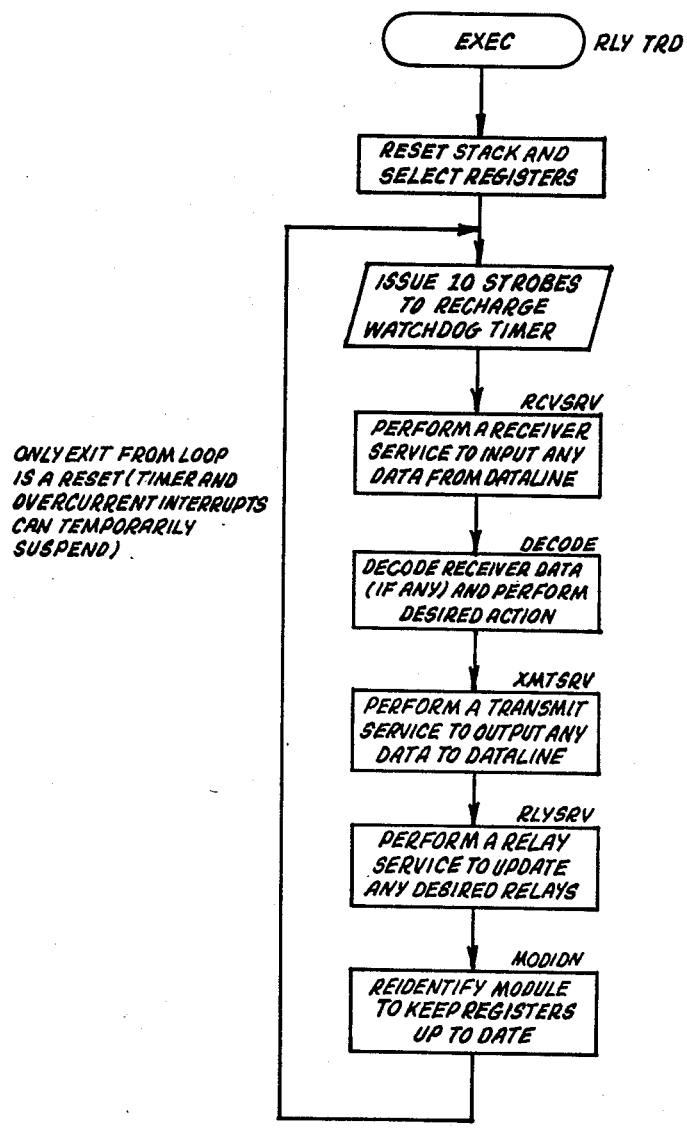

FIG. 43 describes the EXEC executive routine used by the relay transceiver. The stack is reset and the working set of registers selected. Following this, the watchdog timer is recharged by issuing 10 strobes to the appropriate hardware. At this point, a receiver service is performed in order to input any possible data from the data line by invoking the previously described RCVSRV routine (in Miller '414). On completion of this task, the DECODE process is invoked in order to decode any received data and to perform the desired actions. Following the decode of data a transmitter service is performed in order to output any possible data to the data line by calling the routine XMTSRV (described in Miller '414). Next a relay service is invoked in order to update any desired relays by the RLYSRV subroutine. Finally, the module is reidentified in order to keep the transceiver address and jumper registers set to the most current position (it is possible to change the jumper or address configuration at any time). On completion of the MODIDN process, the executive continues to recharge the watchdog timer and invoke the 5 main subroutines until such time that the microprocessor is reset due to a powerup, watchdog or operator initiated button reset.

Figure 44:
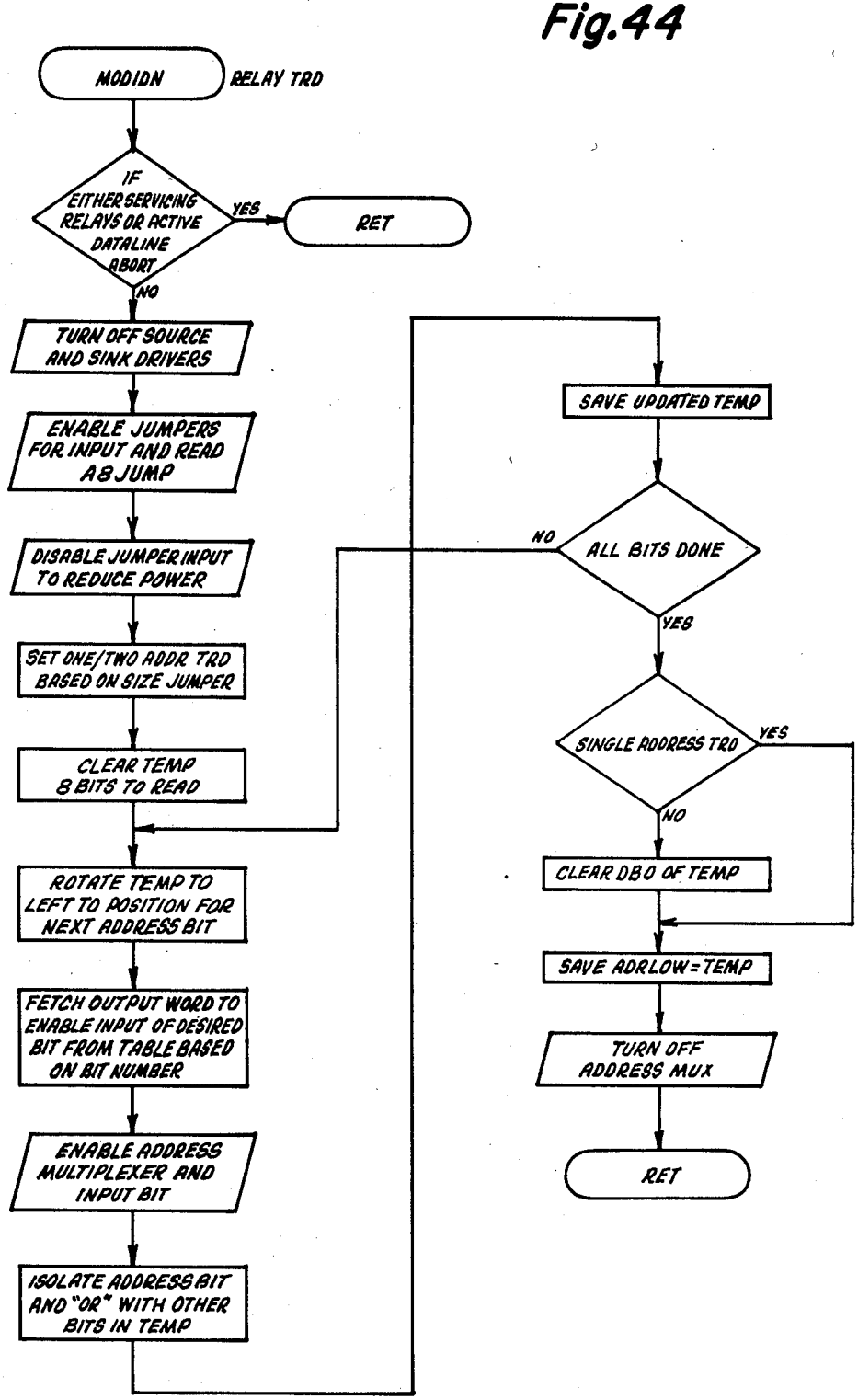

FIG. 44 describes the module identification routine used by the relay TRD. Since each transceiver decoder has a user selectable address to which it will respond as well as user and manufacturing installed jumpers which configure the method in which the transceiver decoder operates, the module identification routine is necessary in order to input the desired address and jumper configurations for subsequent later action and processing by the TRD. On entry to the MODIDN procedure, a test is performed to determine if either relays are being serviced or if the data line is active. If so, then the MODIDN process aborts as indicated. (It would not be desirable to reidentify the module due to the lengthy process involved if the data line was active. Also, due to the multiplexed time sharing nature of the address input and relay driver hardware, to attempt to identify the module while servicing relays would result in improper action on the relays themselves.) If, on the other hand, no current data line or relay activity was indicated, then the source and sink drivers would then be turned to their OFF or no current condition. The jumper hardward would be enabled for input and the A8JUMP register would be set to the value obtained by inputting the jumper configuration. The jumper input hardware is then disabled in order to reduce power consumption and a flag is set indicating a one or two address TRD based on the configuration of the size jumper. A temporary register is then established and cleared and an indication is made to input 8 bits of address data. Beginning with the loop on FIG. 44, the temporary register is rotated one bit position to the left in order to position its contents for the next address bit to be input. Following this, an input word is fetched from a table of values described in the address input multiplexing table based on the current bit number. The address multiplexer hardware is then enabled and a single bit of address data is input. This address bit is isolated and "ORed" with other bits in the temporary register. The updated temporary is then saved and a test is performed to determine if all bits have been input. This procedure of rotating the temporary, selecting an output word to enable the proper address multiplexer, inputting the bit and merging it with a temporary continues until such time that all bits have been input. Once all address bits are in, a test is made to determine if the device is a single address TRD. If not, then bit DB0 of the temporary is cleared. (A two address device will respond to two addresses. The even address, i.e., when DB0 equals 0 corresponds to Bank 0; the odd address when DB1 equals 1 corresponds to Bank 1.) On the other hand, if the device was a single address TRD, then DB0 would not be altered and the resulting address could be either even or odd. ADRLOW is then set equal to the 8 least significant address bits contained in the temporary and then the address multiplex hardware is turned off. This completes the module identification process which then returns to the invoking utility.

As mentioned above, the transceiver decoder has a continuously running internal 6 millisecond timer which is used to sequence desired actions. The timer is an internal programmable device which generates a timer interrupt whenever a programmed register has been incremented to a 0 value. This timer runs continuously and is disabled only when being serviced or updated.

Figure 45:
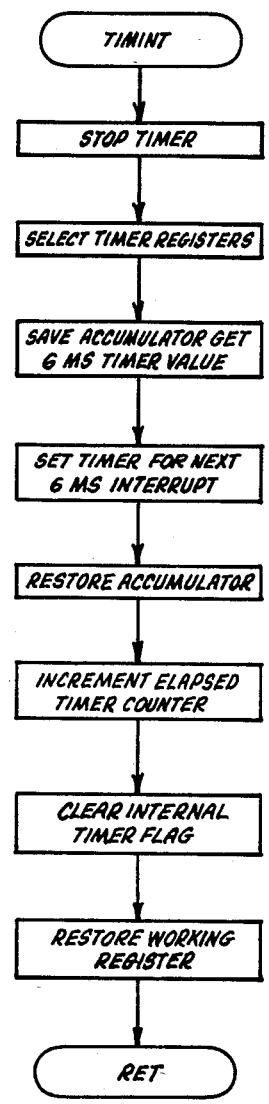
Figure 46:
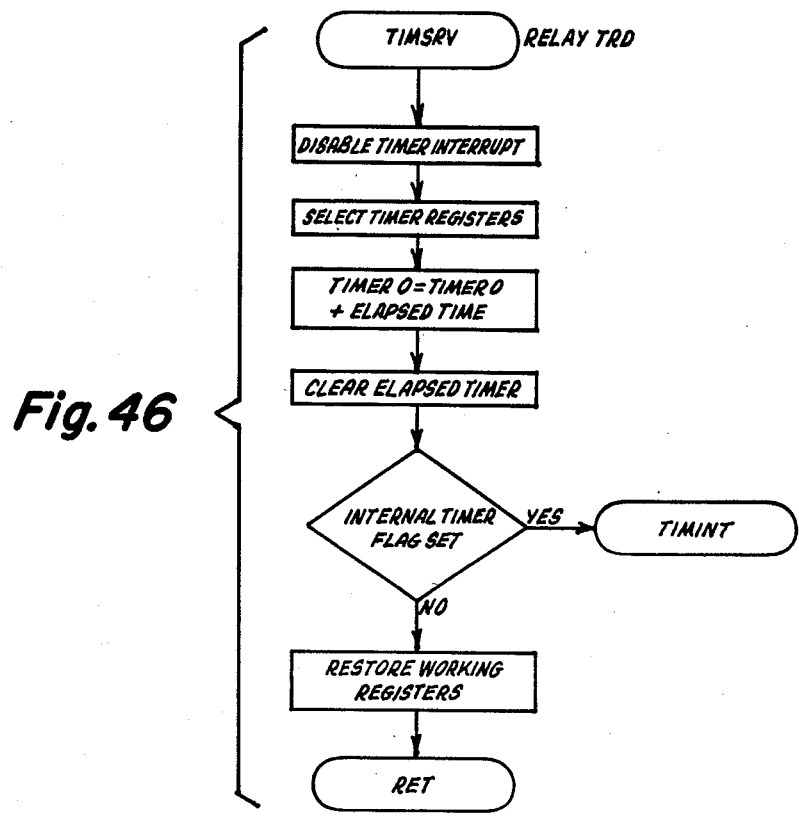

FIG. 45 describes the timer interrupt service routine TIMINT. The purpose of this routine is to service a timer interrupt which occurs every 6 milliseconds and to increment by 1 an elapsed timer counter. On detection of a timer interrupt, the timer is stopped and the timer registers are selected (this is Register Set 1 of processor 300). The current accumulator value is saved in order to free the accumulator for other usages and the 6 millisecond timer value is fetched. Following this, the timer is initialized for the next 6 millisecond interrrupt and the accumulator is restored to its value on entry to the TIMINT procedure. The elapsed timer counter is then incremented by 1 and the internal hardware timer flag is cleared in case it remains set. Upon exit from the timer interrupt service procedure, the previously active working register bank is restored (this is the standard register bank or register bank 0 of processor 300).

The elapsed timer is continuously updated by the 6 millisecond timer interrupts. One or more additional timers can be driven off this elapsed time counter in such a way that they may be maintained current by summing in the elapsed time counts. This is the responsibility of the TIMSRV procedure described in FIG. 46. On entry to the TIMSRV process the timer interrupt is disabled and the bank of timer registers are selected. Timer 0 is then set equal to the initial value of timer 0 plus the elapsed timer counter. The elapsed timer counter is then cleared and a test is made of the internal hardware timer flag to determine if it was set. If so, an immediate branch is taken to the TIMINT procedure (the internal timer flag would be set if a timer interrupt occurred coincidentally with the entry to the TIMSRV process). If the timer interrupt flag was not set, then the working register bank would be restored and the procedure would complete and return to the invoking process. It should be noted that the TIMSRV process is asynchronous of the timer interrupts and could be entered at any time. A maximum delay of up to 256 of the 6 millisecond timer counts could expire before losing accuracy in the timer 0 counter.

Figure 47:
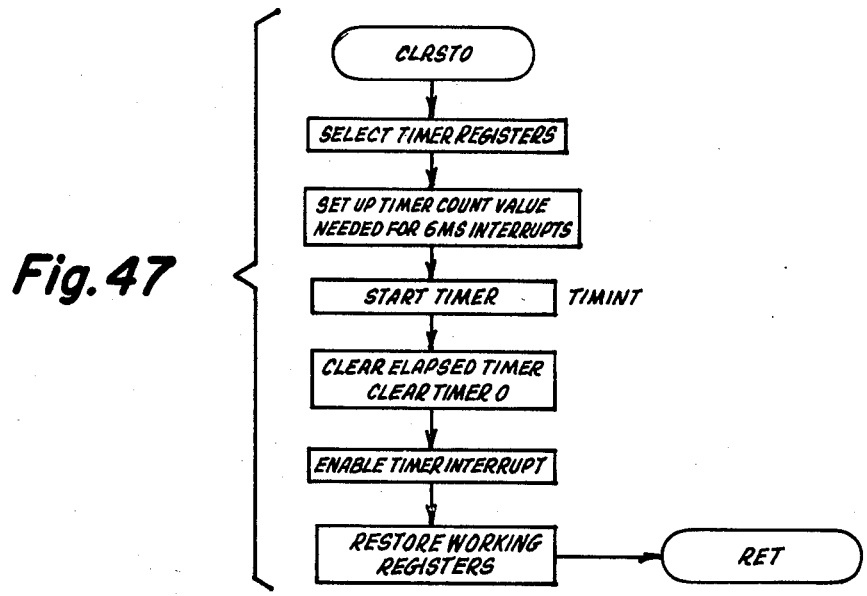

A process exists, described in FIG. 47, called CLRST0 for initializing and starting the timer 0 counter. The timer bank of registers is selected and the counts needed for the 6 millisecond interrupt duration are initialized. Following this, the timer is started by calling the TIMINT process. Next, the elapsed timer and timer 0 are both cleared and set equal to 0. Finally, the timer interrupt is enabled and on exit from the routine the working bank of registers is restored.

As described above, as part of the powerup procedure of the relay transceiver, a test is performed to determine if the reset initiating the powerup was manually invoked via an operator depressed button. If that was the case, then a procedure called RLYTST (FIG. 8) is invoked in order to test the mechanically latching relays associated with the TRD. The relay test procedure allows for three modes of testing relays. Due to the single button (i.e., the reset button) used for initiating the relay test functions, a somewhat involved sequence of actions must take place in order to change from one mode to another. The three modes of relay testing are as follows: All ON/All OFF, individual relay test and automatic relay test. In the first case, an assumption is made that the transceiver decoder was last reset at some interval in the past greater than 25 seconds. If the operator depresses the reset button and then releases it (for approximately one second) one of two actions will take place. If any relay on the transceiver decoder is in an OFF position, then all relays on the transceiver decoder will be turned ON. On the other hand, if all relays on the transceiver were already OFF, then depressing the reset button momentarily would cause all relays to turn to the ON condition. It is possible to alternate between two possible states by allowing at least 25 seconds to transpire between actuations of the reset button. This mode of testing might also be utilized by a building operator in order to turn all loads ON or OFF as desired in the emergency condition that might result from a failure of a controlling device.

The second mode of relay test is known as the individual relay test. This function is actuated by multiple depressions of the reset button the transceiver decoder was last reset in an interval of time no less than 25 seconds. The first depression of the reset button will cause all relays to turn ON or OFF as described above. However, any subsequent actuations of the reset button by the operator that occur less than 25 seconds apart will cause entry to the individual relay test. In this mode, a single relay will be turned ON and all other relays OFF. Every subsequent action of the reset button will cause the next relay to go ON and all others to go OFF. This action will continue from relay #1 to #16, in order, for each of the two possible banks of relays. (If the device is a two bank TRD, then relays 1 to 16 of the low address bank will cycle first followed by relays 1 to 16 of the high address bank.) The individual relay actuations will continue until such time that the operator allows the transceiver decoder to remain idle for a period of time greater than 25 seconds. (No reset button acutations.) It should be noted that this mode of testing would be useful during the installation of a transceiver decoder for testing individual circuit actuations.

The final test mode is the automatic test mode. Once again it is assumed that the transceiver decoder has been inactive for a period of at least 25 seconds. To enter the automatic test cycle, the operator must depress and hold the reset button for a period in excess of 10 seconds. On the initial "make" actuation of the reset switch the TRD will turn all relays ON or OFF (depending on their current state) as described for the first test mode. At the end of the 10 second period, the relays will begin to cycle automatically, in order, from relay 1 to 16 of the first bank followed by relays 1 to 16 of the second bank, if present. The button need not be held beyond the point that this automatic cycling begins. However, to continue for another pass of the automatic cycle, it would be necessary to again depress and hold the reset button before the last relay is cycled. If this is the case then another pass will take place up to a maximum of three passes. At that point, the machine will exit the relay test procedure and begin normal activities. (This is done in order to avoid a failure mechanism in which the reset button would remain in its closed condition, potentially locking out the transceiver decoder from programmable commands.) The automatic test cycle was intended for use by the Manufacturing facility in order to test the completed assembly of the transceiver decoder.

It should be noted that on completion of any of the three relay test modes the transceiver decoder will transmit a Powerup status message indicating to a controlling device that the transceiver was reset and that the reset occurred due to a manual operator initiated button actuation. Because of this, a controlling device would then be able to reestablish the proper relay patterns for the transceiver decoder that were in effect before the device was manipulated by the operator.

FIG. 48 describes the first portion of the RLYTST routine which begins by setting the TRD STATUS register to show a reset and manual button entry. A test is then performed to determine if the register TESTST (the status register for the relay test module) is not equal to 0. If this condition is met, then the process continues at Connector B of FIG. 49. On the other hand, if TESTST was equal to 0, then a test is made of the relay states register to determine if it is not equal to 0. If the relay test register is not equal to 0, then a test is made to determine if all relays are ON. If not, then the process continues as indicated on the diagram. If not, then the process continues as indicated on the diagram. Otherwise, a desire to turn all relays OFF is indicated and the process continues as indicated on the diagram. On the other hand, if the relay states register was equal to 0 (indicating that all relays were currently OFF) then it is desirable to turn all relays ON and that is so indicated. Following this, the procedure INSTA0 is invoked in order to install the desired delay state. A test is then performed to determine if the reset button is still being held by the operator. If not, then the process continues at Connector E of FIG. 49. Otherwise, if the button is still held, then the 10 second delay is entered. It should be noted that there are two possible ways to exit this 10 second delay. One would be by completing the 10 second delay which would imply that the reset button was still being held. The other would be if the reset button was released and depressed again. This would cause new entry through the beginning of the RLYTST routine until such time that the button is detected to be no longer depressed. (The inherent delay required to install 16 to 32 relays yields enough time for the operator to depress and release the button in order for it to be detected on the next pass through the RLYTST procedure. It is for this reason that it is essential that the operator depress and release the button during the first or second test mode before the last relay is updated. This corresponds to approximately a one second button depression. If this is not the case, then at the conclusion of the 10 second delay, the test will assume to be in automatic, all relays will turn OFF and the process will abort.) At the end of the 10 second delay, an automatic test is indicated for relay 0 pass 0. Following this, at Connector A, all relays are turned OFF by the INSTA0 process. The relay number is then set equal to 0 and a test is made to determine if the last pass is complete. If so, the process continues at Connector C. Otherwise, a further test is performed to determine if the button is still depressed. If not, then the process continues at Connector C. Otherwise, it continues at Connector B of FIG. 49.

Figure 49:
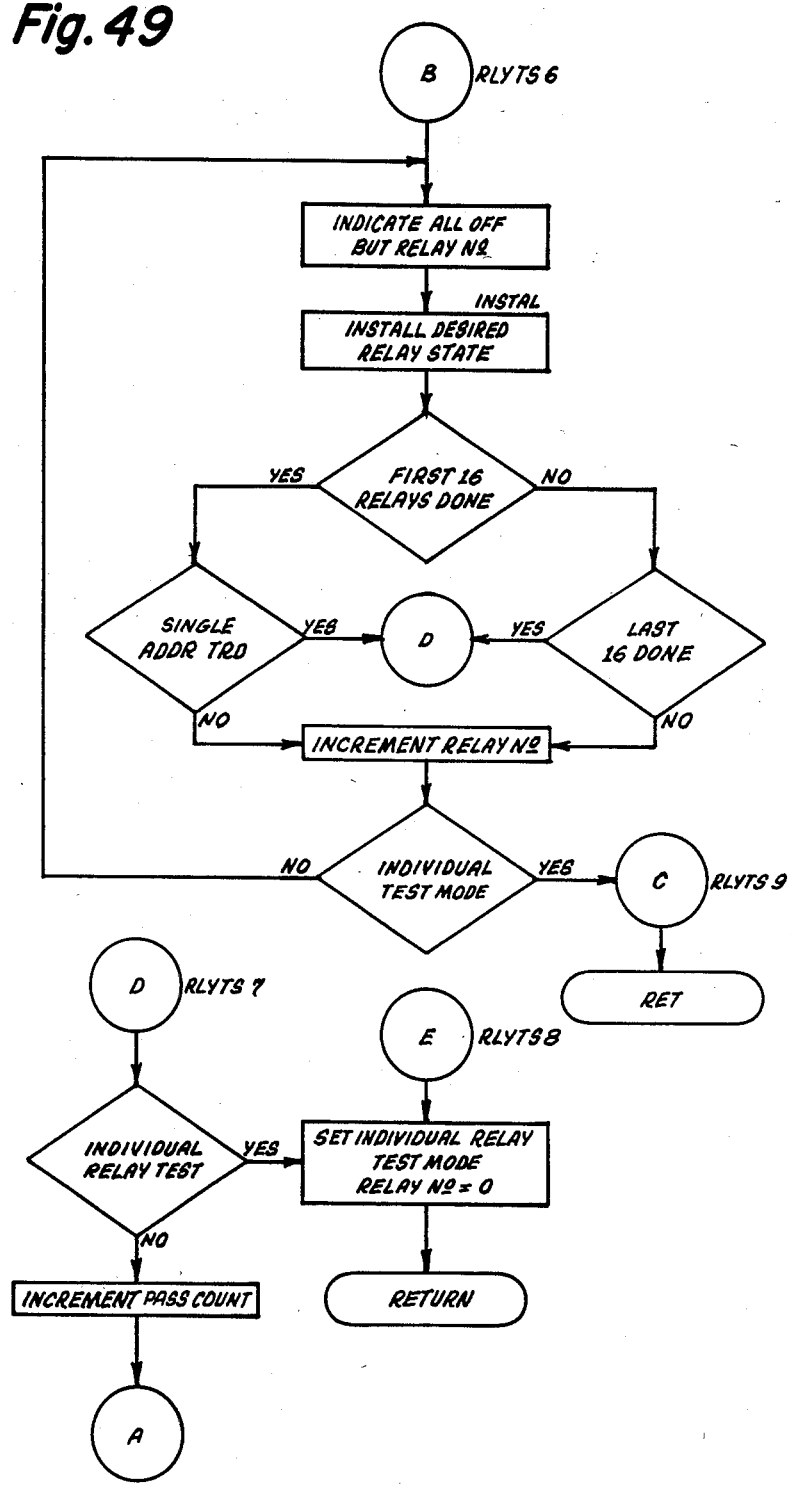

The relay test module continues at Connector B of FIG. 49 where a desire to turn OFF all relays except the relay number to be turned ON is indicated and then installed by the INSTAL process. Following this, a test is made to determine if the first bank of 16 relays has completed processing. If not, then a further test is performed to determine if the last bank of 16 relays has completed processing. If so, then the process continues at Connector D. If neither the first bank nor the last bank of 16 relays has completed processing then the procedure continues as indicated on the diagram. However, if the first bank of 16 relays had completed processing then a test is performed to determine if the device was a single address TRD. If so, a branch is taken to Connector D. Otherwise, the relay number is incremented and a test is made to determine if the individual test mode flag is ON. If not, then the process continues the loop of automatically cycling all relays until the end of either the first or second bank is detected. On the other hand, if an individual test mode was selected, then the process aborts through Connector C which returns. At Connector D, which is entered at the end of a pass of 16 or 32 relays, depending on the TRD size, a test is made of the individual relay test flag. If it is set, then the individual relay test flag is set and the relay number is set equal to 0, completing the process. On the other hand, if the individual relay test flag was not set, then the device must have been automatically cycling and the pass count is incremented with the process continuing at Connector A of FIG. 48.

Figure 50:
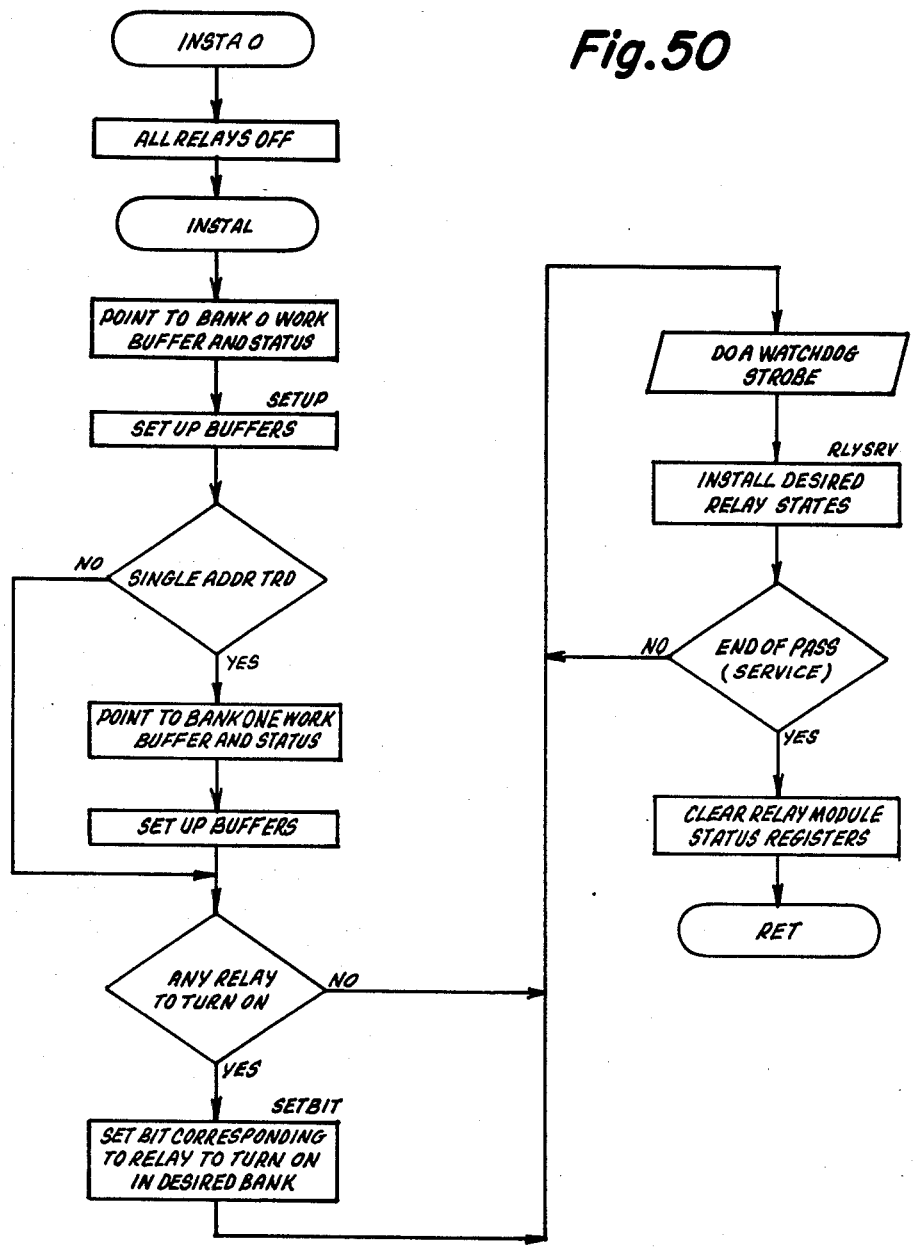

FIG. 50 describes the procedure invoked in order to install the desired relay states. At entry to INSTA0, the routine will insure that all relays are turned OFF. At entry to INSTAL, all relays with the exception of one relay to be turned ON are turned OFF. A pointer is established to bank 0 working buffers and status registers for the relay service module. The SETUP routine is invoked in order to set up the working and status buffers as required by relay service. A check is then made to determine if the device is a single address TRD. If not, the same two steps of pointing to the working buffers and status registers for bank 1 and setting up the buffers by invoking the Setup procedure for bank 1 are repeated. Otherwise, in continuing with the process, a test is made to determine if there is any relay to turn ON. If so, then a bit corresponding to the relay number to turn ON is set in the desired state portion of the relay working buffer. Otherwise, a watchdog strobe is performed followed by the installation of the desired relay states by the RLYSRV process. Next a test is made to determine if the end of the relay service has been reached. If not, the pulsing of the watchdog strobe and invocation of the RLYSRV module continues until such time that the relay service has reached its conclusion. At this time, the relay module status registers are cleared and the installation procedure returns to the invoking process.

Figure 51:
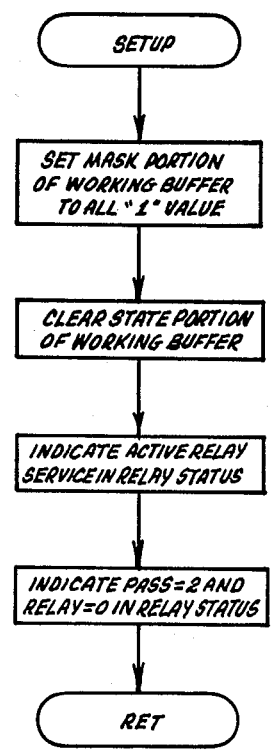

Finally, FIG. 51 describes the Setup procedure used to initialize the working register and relay module status register to their proper values for relay installation. The mask portion of the relay buffer is set to an all 1 value indicating a service requirement for all relays. The state portion of the working buffer is then cleared to 0 indicating an all OFF condition. Next an active relay service is indicated in the relay module status along with pass equals to 2 and relay number equals to 0. (It was decided to use the shorter interval of time for processing of relay cycles in order to shorten the length of time needed to make an entire pass while automatically cycling the relays.) This completes the Setup routine which then returns.

This completes the description of the Powerup, executive, reset and other miscellaneous modules. The Powerup routine provides for the following: a means of generating a Powerup/Status message for subsequent transmission to a monitoring or controlling device; a means of invoking a reset procedure to initialize I/O devices and internal registers; a means of initialing the watchdog reset heardware; a means of initializing the machine to a known internal state; a means of indicating a manually initiated reset action; and a means of invoking a relay test procedure.

The executive provides for: a means of periodically strobing a watchdog timer in order to indicate normal operation; a means of resetting the stack and working register bank in order to counteract any possible incorrect action due to spurious signals which may have altered the machine state; and a means of providing the functionality of the transceiver decoder by executing an executive loop of the desired functions forever.

The reset process provides for: a means of initializing I/O to a known condition; a means for initializing all desired memory registers to 0; a means of allowing the relay state register to retain its current value in the case of a relay TRD; a means of causing the receiver to resynchronize on a maximum line free timeout; a means of clearing the good and bad message counters to 0 values; a means of starting and clearing the proper timer counters; and a means of halting any current actions that might be pending in the transceiver decoder (such as relay processing in progress or messages awaiting decoding in the receiver buffer).

The timer routines provide for: a means of establishing a periodic 6 millisecond interval timer; a means for counting the timer interrupts and retaining a sum of the number of times the interrupt has occurred in an 8 bit elapsed timer counter; a means of providing one or more counters to which the elapsed time counter is added in order to provide for long intervals to be times; a means of clearing to 0 and restarting one or more timer counters; and a means of deferring until a convenient time the servicing of the elapsed time counter.

The module identifier provides for: a means of inputting a set of 8 user or manufacturing installed jumpers to dynamically or statically configure the transceiver decoder; a means of operating a multiplexer circuit in order to allow the inputting of 8 user selectable address lines; a means of identifying via a flag a one or two address transceiver decoder; a means of disabling the jumper input hardware in order to reduce power consumption; a means of multiplexing the address input circuit with the relay driver circuitry; a means of detecting and avoiding a conflict with the operation of the address multiplexer circuit and other external hardware; and a means of allowing the address inputs or mode selector jumpers to be dynamically varied by the user and detected and acted upon the transceiver decoder.

Finally, the relay test module provides for: a means of turning all relays ON or all relays OFF; a means of individually turning one relay ON while all others are turned OFF; and a means for automatically cycling each relay ON then OFF.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---|---|---|---|
| 0000 | 15 | 0001 | E4 |
| 0002 | B0 | 0003 | 88 |
| 0004 | FF | 0005 | 04 |
| 0006 | 11 | 0007 | D5 |
| 0008 | 65 | 0009 | 2F |
| 000A | 62 | 000B | 55 |
| 000C | 2F | 000D | 1E |
| 000E | 16 | 000F | 10 |
| 0010 | 93 | 0011 | 89 |
| 0012 | FF | 0013 | D5 |
| 0014 | 28 | 0015 | 43 |
| 0016 | 02 | 0017 | 28 |
| 0018 | 15 | 0019 | 93 |
| 001A | 35 | 001B | D5 |
| 001C | FD | 001D | 6E |
| 001E | AD | 001F | BE |
| 0020 | 00 | 0021 | 25 |
| 0022 | 16 | 0023 | 07 |
| 0024 | 93 | 0025 | 14 |
| 0026 | F6 | 0027 | F2 |
| 0028 | 91 | 0029 | FB |
| 002A | 53 | 002B | 8F |
| 002C | A1 | 002D | B9 |
| 002E | 56 | 002F | B6 |
| 0030 | 33 | 0031 | B9 |
| 0032 | 5E | 0033 | FA |
| 0034 | 12 | 0035 | 37 |
| 0036 | 19 | 0037 | FB |
| 0038 | 47 | 0039 | 53 |
| 003A | 07 | 003B | AD |
| 003C | 14 | 003D | DC |
| 003E | B9 | 003F | 54 |
| 0040 | B6 | 0041 | 44 |
| 0042 | B9 | 0043 | 5C |
| 0044 | B8 | 0045 | 4E |
| 0046 | FA | 0047 | 12 |
| 0048 | 4D | 0049 | 23 |
| 004A | 02 | 004B | 04 |
| 004C | 50 | 004D | F0 |
| 004E | 53 | 004F | 01 |
| 0050 | AF | 0051 | FA |
| 0052 | 53 | 0053 | FC |
| 0054 | 4F | 0055 | A1 |
| 0056 | 19 | 0057 | FA |
| 0058 | 12 | 0059 | 5F |
| 005A | F0 | 005B | 53 |
| 005C | 01 | 005D | A1 |
| 005E | 19 | 005F | C8 |
| 0060 | B6 | 0061 | 67 |
| 0062 | F0 | 0063 | 43 |
| 0064 | 01 | 0065 | 04 |
| 0066 | 68 | 0067 | F0 |
| 0068 | A1 | 0069 | FA |
| 006A | 12 | 006B | 71 |
| 006C | FD | 006D | 69 |
| 006E | 17 | 006F | 04 |
| 0070 | 74 | 0071 | F9 |
| 0072 | 03 | 0073 | 03 |
| 0074 | A8 | 0075 | A9 |
| 0076 | FA | 0077 | 12 |
| 0078 | 92 | 0079 | FD |
| 007A | 03 | 007B | 03 |
| 007C | AE | 007D | 23 |
| 007E | 80 | 007F | C8 |
| 0080 | 60 | 0081 | EE |
| 0082 | 7F | 0083 | 37 |
| 0084 | 17 | 0085 | A1 |
| 0086 | F8 | 0087 | 37 |
| 0088 | 17 | 0089 | 69 |
| 008A | 17 | 008B | B8 |
| 008C | 4F | 008D | B6 |
| 008E | 90 | 008F | 18 |
| 0090 | A0 | 0091 | 83 |
| 0092 | 14 | 0093 | 97 |
| 0094 | FF | 0095 | 04 |
| 0096 | 85 | 0097 | BF |
| 0098 | 00 | 0099 | BE |
| 009A | 04 | 009B | C8 |
| 009C | F0 | 009D | 47 |
| 009E | 14 | 009F | A6 |
| 00A0 | F0 | 00A1 | 14 |
| 00A2 | A6 | 00A3 | EE |
| 00A4 | 9B | 00A5 | 83 |
| 00A6 | 53 | 00A7 | 0F |
| 00A8 | 03 | 00A9 | B0 |
| 00AA | A3 | 00AB | 2F |
| 00AC | E7 | 00AD | 4F |
| 00AE | 2F | 00AF | 83 |
| 00B0 | 00 | 00B1 | 01 |
| 00B2 | 01 | 00B3 | 00 |
| 00B4 | 01 | 00B5 | 00 |
| 00B6 | 00 | 00B7 | 01 |
| 00B8 | 01 | 00B9 | 00 |
| 00BA | 00 | 00BB | 01 |
| 00BC | 00 | 00BD | 01 |
| 00BE | 01 | 00BF | 00 |
| 00C0 | F0 | 00C1 | C6 |
| 00C2 | CD | 00C3 | 37 |
| 00C4 | 17 | 00C5 | 6A |

-continued

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---|---|---|---|
| 00C6 | A0 | 00C7 | 18 |
| 00C8 | F0 | 00C9 | 37 |
| 00CA | 7B | 00CB | A0 |
| 00CC | 83 | 00CD | 6A |
| 00CE | A7 | 00CF | 04 |
| 00D0 | C6 | 00D1 | 97 |
| 00D2 | F0 | 00D3 | 67 |
| 00D4 | AB | 00D5 | A0 |
| 00D6 | C8 | 00D7 | F0 |
| 00D8 | 67 | 00D9 | AA |
| 00DA | A0 | 00DB | 83 |
| 00DC | C6 | 00DD | E5 |
| 00DE | AC | 00DF | F0 |
| 00E0 | A1 | 00E1 | 18 |
| 00E2 | 19 | 00E3 | EC |
| 00E4 | DF | 00E5 | 83 |
| 00E6 | B8 | 00E7 | 48 |
| 00E8 | 04 | 00E9 | EC |
| 00EA | B8 | 00EB | 46 |
| 00EC | F0 | 00ED | 03 |
| 00EE | 01 | 00EF | A0 |
| 00F0 | 18 | 00F1 | F0 |
| 00F2 | 13 | 00F3 | 00 |
| 00F4 | A0 | 00F5 | 83 |
| 00F6 | B9 | 00F7 | 52 |
| 00F8 | B6 | 00F9 | FB |
| 00FA | 19 | 00FB | F1 |
| 00FC | 83 | 00FD | B8 |
| 00FE | 40 | 00FF | B9 |
| 0100 | 4E | 0101 | F0 |
| 0102 | 32 | 0103 | 35 |
| 0104 | D1 | 0105 | 12 |
| 0106 | 26 | 0107 | F1 |
| 0108 | 72 | 0109 | 28 |
| 010A | 37 | 010B | 52 |
| 010C | 26 | 010D | 34 |
| 010E | 93 | 010F | 96 |
| 0110 | 26 | 0111 | BB |
| 0112 | 60 | 0113 | B8 |
| 0114 | 44 | 0115 | F0 |
| 0116 | AD | 0117 | 14 |
| 0118 | 97 | 0119 | FD |
| 011A | DF | 011B | 96 |
| 011C | 26 | 011D | 34 |
| 011E | 87 | 011F | 23 |
| 0120 | 02 | 0121 | 14 |
| 0122 | DC | 0123 | FB |
| 0124 | 44 | 0125 | A3 |
| 0126 | C4 | 0127 | 29 |
| 0128 | 34 | 0129 | 93 |
| 012A | 53 | 012B | FE |
| 012C | 96 | 012D | 26 |
| 012E | BB | 012F | A0 |
| 0130 | F0 | 0131 | 12 |
| 0132 | 13 | 0133 | 24 |
| 0134 | 11 | 0135 | 12 |
| 0136 | 26 | 0137 | 18 |
| 0138 | F0 | 0139 | F2 |
| 013A | 6C | 013B | F1 |
| 013C | D0 | 013D | 12 |
| 013E | 26 | 013F | 34 |
| 0140 | 93 | 0141 | 76 |
| 0142 | 68 | 0143 | 53 |
| 0144 | FE | 0145 | 96 |
| 0146 | 26 | 0147 | BB |
| 0148 | 80 | 0149 | F0 |
| 014A | 12 | 014B | 4E |
| 014C | BB | 014D | 40 |
| 014E | B8 | 014F | 40 |
| 0150 | 23 | 0151 | F8 |
| 0152 | 6E | 0153 | 37 |
| 0154 | AE | 0155 | 03 |
| 0156 | FC | 0157 | E6 |
| 0158 | 26 | 0159 | AA |
| 015A | 23 | 015B | 80 |
| 015C | 60 | 015D | 18 |
| 015E | EE | 015F | 5C |

-continued

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---|---|---|---|
| 0160 | 96 | 0161 | 26 |
| 0162 | 34 | 0163 | 87 |
| 0164 | 18 | 0165 | FA |
| 0166 | 24 | 0167 | 21 |
| 0168 | 96 | 0169 | 26 |
| 016A | 24 | 016B | 4C |
| 016C | 53 | 016D | 7E |
| 016E | C6 | 016F | 81 |
| 0170 | F0 | 0171 | 17 |
| 0172 | 96 | 0173 | 26 |
| 0174 | 18 | 0175 | F0 |
| 0176 | 17 | 0177 | 96 |
| 0178 | 26 | 0179 | BB |
| 017A | 40 | 017B | 76 |
| 017C | 4E | 017D | BB |
| 017E | C0 | 017F | 24 |
| 0180 | 4E | 0181 | 18 |
| 0182 | F0 | 0183 | 96 |
| 0184 | 26 | 0185 | 24 |
| 0186 | 79 | 0187 | B8 |
| 0188 | 40 | 0189 | B9 |
| 018A | 4A | 018B | F0 |
| 018C | 53 | 018D | FC |
| 018E | A1 | 018F | 18 |
| 0190 | 18 | 0191 | 19 |
| 0192 | 83 | 0193 | C9 |
| 0194 | 18 | 0195 | F0 |
| 0196 | D1 | 0197 | 83 |
| 0198 | B8 | 0199 | 24 |
| 019A | F0 | 019B | B8 |
| 019C | 39 | 019D | 40 |
| 019E | 96 | 019F | D4 |
| 01A0 | 34 | 01A1 | E9 |
| 01A2 | 3A | 01A3 | 0A |
| 01A4 | B8 | 01A5 | 4E |
| 01A6 | A0 | 01A7 | 9A |
| 01A8 | 80 | 01A9 | A5 |
| 01AA | 72 | 01AB | AD |
| 01AC | B5 | 01AD | BF |
| 01AE | 00 | 01AF | BE |
| 01B0 | 08 | 01B1 | FF |
| 01B2 | E7 | 01B3 | AF |
| 01B4 | 23 | 01B5 | C7 |
| 01B6 | 6E | 01B7 | A3 |
| 01B8 | 39 | 01B9 | 09 |
| 01BA | 53 | 01BB | 10 |
| 01BC | 4F | 01BD | AF |
| 01BE | EE | 01BF | B1 |
| 01C0 | 76 | 01C1 | C4 |
| 01C2 | 53 | 01C3 | FE |
| 01C4 | C8 | 01C5 | A0 |
| 01C6 | 24 | 01C7 | E9 |
| 01C8 | F0 | 01C9 | F4 |
| 01CA | F2 | 01CB | F6 |
| 01CC | D1 | 01CD | D5 |
| 01CE | D3 | 01CF | D7 |
| 01D0 | EF | 01D1 | D0 |
| 01D2 | EE | 01D3 | D0 |
| 01D4 | 83 | 01D5 | 34 |
| 01D6 | E9 | 01D7 | B8 |
| 01D8 | 24 | 01D9 | BC |
| 01DA | 42 | 01DB | B4 |
| 01DC | F1 | 01DD | 34 |
| 01DE | 98 | 01DF | B8 |
| 01E0 | 39 | 01E1 | B0 |
| 01E2 | 03 | 01E3 | B8 |
| 01E4 | 18 | 01E5 | B0 |
| 01E6 | 00 | 01E7 | 84 |
| 01E8 | 21 | 01E9 | 23 |
| 01EA | FF | 01EB | 02 |
| 01EC | 39 | 01ED | 83 |
| 01EE | BA | 01EF | 4D |
| 01F0 | BB | 01F1 | 02 |
| 01F2 | BC | 01F3 | 0A |
| 01F4 | BD | 01F5 | 02 |
| 01F6 | 44 | 01F7 | BB |
| 01FA | 8A | 01FB | 80 |

-continued

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---------|------|---------|------|
| 01FC | BB | 01FD | 0F |
| 01FE | EB | 01FF | FE |
| 0200 | 56 | 0201 | 0A |
| 0202 | EE | 0203 | 00 |
| 0204 | 9A | 0205 | 00 |
| 0206 | EF | 0207 | 04 |
| 0208 | 97 | 0209 | 83 |
| 020A | BB | 020B | 03 |
| 020C | 46 | 020D | 00 |
| 020E | EB | 020F | 0C |
| 0210 | 97 | 0211 | A7 |
| 0212 | 83 | 0213 | BE |
| 0214 | 04 | 0215 | BF |
| 0216 | 3F | 0217 | 34 |
| 0218 | D0 | 0219 | 8A |
| 021A | 80 | 021B | 83 |
| 021C | B8 | 021D | 39 |
| 021E | F0 | 021F | 12 |
| 0220 | 2D | 0221 | 46 |
| 0222 | 2C | 0223 | B9 |
| 0224 | 03 | 0225 | 46 |
| 0226 | 2C | 0227 | E9 |
| 0228 | 25 | 0229 | 43 |
| 022A | 01 | 022B | A0 |
| 022C | 83 | 022D | 32 |
| 022E | 43 | 022F | 52 |
| 0230 | 33 | 0231 | 44 |
| 0232 | 51 | 0233 | 72 |
| 0234 | 41 | 0235 | 54 |
| 0236 | AE | 0237 | E6 |
| 0238 | 2C | 0239 | 32 |
| 023A | 3F | 023B | 23 |
| 023C | 08 | 023D | 44 |
| 023E | A3 | 023F | 54 |
| 0240 | A8 | 0241 | 44 |
| 0242 | EC | 0243 | 8A |
| 0244 | 80 | 0245 | 56 |
| 0246 | 2C | 0247 | BC |
| 0248 | 14 | 0249 | BD |
| 024A | 03 | 024B | 54 |
| 024C | D3 | 024D | E6 |
| 024E | 2C | 024F | 44 |
| 0250 | A8 | 0251 | BC |
| 0252 | 0C | 0253 | B8 |
| 0254 | 3A | 0255 | B4 |
| 0256 | F1 | 0257 | BA |
| 0258 | C8 | 0259 | BB |
| 025A | 20 | 025B | 34 |
| 025C | F2 | 025D | F6 |
| 025E | A1 | 025F | BE |
| 0260 | 04 | 0261 | 34 |
| 0262 | EE | 0263 | F6 |
| 0264 | A1 | 0265 | B8 |
| 0266 | 3A | 0267 | F0 |
| 0268 | 6A | 0269 | A0 |
| 026A | 18 | 026B | F0 |
| 026C | 7B | 026D | A0 |
| 026E | 18 | 026F | F0 |
| 0270 | 6C | 0271 | A0 |
| 0272 | 18 | 0273 | F0 |
| 0274 | 7D | 0275 | A0 |
| 0276 | EE | 0277 | 61 |
| 0278 | B8 | 0279 | 3A |
| 027A | BA | 027B | 4A |
| 027C | BB | 027D | 09 |
| 027E | 14 | 027F | C0 |
| 0280 | 14 | 0281 | D1 |
| 0282 | B8 | 0283 | 3C |
| 0284 | BA | 0285 | 28 |
| 0286 | BB | 0287 | 08 |
| 0288 | 14 | 0289 | C0 |
| 028A | 14 | 028B | D1 |
| 028C | B8 | 028D | 3E |
| 028E | FA | 028F | A0 |
| 0290 | 18 | 0291 | FB |
| 0292 | A0 | 0293 | 14 |
| 0294 | D1 | 0295 | 18 |

-continued

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---------|------|---------|------|
| 0296 | 10 | 0297 | B8 |
| 0298 | 3B | 0299 | 10 |
| 029A | B8 | 029B | 3D |
| 029C | 10 | 029D | 23 |
| 029E | 04 | 029F | 44 |
| 02A0 | A3 | 02A1 | 23 |
| 02A2 | 02 | 02A3 | B8 |
| 02A4 | 39 | 02A5 | 40 |
| 02A6 | A0 | 02A7 | 83 |
| 02A8 | 27 | 02A9 | B8 |
| 02AA | 39 | 02AB | 50 |
| 02AC | A0 | 02AD | 83 |
| 02AE | B8 | 02AF | 3A |
| 02B0 | F0 | 02B1 | AA |
| 02B2 | 18 | 02B3 | F0 |
| 02B4 | AB | 02B5 | 18 |
| 02B6 | F0 | 02B7 | AC |
| 02B8 | 18 | 02B9 | F0 |
| 02BA | AD | 02BB | FA |
| 02BC | C6 | 02BD | C2 |
| 02BE | 46 | 02BF | C9 |
| 02C0 | EA | 02C1 | BE |
| 02C2 | EB | 02C3 | BE |
| 02C4 | 23 | 02C5 | 01 |
| 02C6 | 97 | 02C7 | A7 |
| 02C8 | 83 | 02C9 | B8 |
| 02CA | 03 | 02CB | 56 |
| 02CC | BE | 02CD | E8 |
| 02CE | CB | 02CF | FA |
| 02D0 | 96 | 02D1 | D3 |
| 02D2 | 1B | 02D3 | FC |
| 02D4 | C6 | 02D5 | DA |
| 02D6 | 56 | 02D7 | E0 |
| 02D8 | EC | 02D9 | D6 |
| 02DA | ED | 02DB | D6 |
| 02DC | 23 | 02DD | 02 |
| 02DE | 44 | 02DF | C6 |
| 02E0 | B8 | 02E1 | 03 |
| 02E2 | 46 | 02E3 | D6 |
| 02E4 | E8 | 02E5 | E2 |
| 02E6 | FC | 02E7 | 96 |
| 02E8 | EA | 02E9 | 1D |
| 02EA | 97 | 02EB | 83 |
| 02EC | B9 | 02ED | 40 |
| 02EE | BE | 02EF | 06 |
| 02F0 | BF | 02F1 | 80 |
| 02F2 | BA | 02F3 | C8 |
| 02F4 | BB | 02F5 | 20 |
| 02F6 | B8 | 02F7 | 3C |
| 02F8 | F0 | 02F9 | AC |
| 02FA | 18 | 02FB | F0 |
| 02FC | AD | 02FD | 54 |
| 02FE | BB | 02FF | E6 |
| 0300 | 07 | 0301 | 64 |
| 0302 | 3F | 0303 | 54 |
| 0304 | AE | 0305 | F6 |
| 0306 | 3B | 0307 | B8 |
| 0308 | 3E | 0309 | FC |
| 030A | C6 | 030B | 28 |
| 030C | 37 | 030D | 17 |
| 030E | 60 | 030F | 18 |
| 0310 | FD | 0311 | 37 |
| 0312 | 70 | 0313 | FF |
| 0314 | 67 | 0315 | AF |
| 0316 | E6 | 0317 | 03 |
| 0318 | A1 | 0319 | 19 |
| 031A | BF | 031B | 80 |
| 031C | 54 | 031D | AE |
| 031E | F6 | 031F | 2C |
| 0320 | EE | 0321 | 07 |
| 0322 | 23 | 0323 | F7 |
| 0324 | 54 | 0325 | A9 |
| 0326 | 04 | 0327 | E6 |
| 0328 | 60 | 0329 | A7 |
| 032A | 64 | 032B | 0F |
| 032C | 12 | 032D | 32 |
| 032E | 14 | 032F | E6 |

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---------|------|---------|------|
| 0330 | 44 | 0331 | A8 |
| 0332 | 23 | 0333 | FC |
| 0334 | 6E | 0335 | F6 |
| 0336 | 26 | 0337 | 23 |
| 0338 | 10 | 0339 | 44 |
| 033A | A3 | 033B | 32 |
| 033C | 2E | 033D | 04 |
| 033E | E6 | 033F | 32 |
| 0340 | 30 | 0341 | 23 |
| 0342 | 02 | 0343 | 54 |
| 0344 | A3 | 0345 | 04 |
| 0346 | E6 | 0347 | B8 |
| 0348 | 51 | 0349 | B9 |
| 034A | 39 | 034B | F1 |
| 034C | C6 | 034D | 54 |
| 034E | B0 | 034F | 00 |
| 0350 | 23 | 0351 | 01 |
| 0352 | 44 | 0353 | A3 |
| 0354 | 74 | 0355 | AD |
| 0356 | 96 | 0357 | 92 |
| 0358 | F0 | 0359 | 52 |
| 035A | BA | 035B | 32 |
| 035C | 7F | 035D | 12 |
| 035E | 77 | 035F | B8 |
| 036C | 04 | 0361 | B9 |
| 0362 | 3D | 0363 | 27 |
| 0364 | 21 | 0365 | AD |
| 0366 | C6 | 0367 | 69 |
| 0368 | CD | 0369 | C9 |
| 036A | 27 | 036B | 21 |
| 036C | AC | 036D | BA |
| 036E | CA | 036F | BB |
| 0370 | 08 | 0371 | 14 |
| 0372 | C0 | 0373 | BA |
| 0374 | 01 | 0375 | 64 |
| 0376 | 85 | 0377 | BC |
| 0378 | F4 | 0379 | BD |
| 037A | 02 | 037B | BA |
| 037C | 03 | 037D | 64 |
| 037E | 85 | 037F | BC |
| 0380 | 3F | 0381 | BD |
| 0382 | 04 | 0383 | BA |
| 0384 | 07 | 0385 | 54 |
| 0386 | D3 | 0387 | E6 |
| 0388 | 4E | 0389 | B8 |
| 038A | 51 | 038B | F0 |
| 038C | 4A | 038D | A0 |
| 038E | 74 | 038F | AD |
| 0390 | C6 | 0391 | BA |
| 0392 | 9A | 0393 | 00 |
| 0394 | 14 | 0395 | F6 |
| 0396 | 74 | 0397 | DE |
| 0398 | F6 | 0399 | A1 |
| 039A | B8 | 039B | 51 |
| 039C | 27 | 039D | A0 |
| 039E | A1 | 039F | 44 |
| 03A0 | 13 | 03A1 | B8 |
| 03A2 | 51 | 03A3 | F1 |
| 03A4 | F2 | 03A5 | A8 |
| 03A6 | 64 | 03A7 | 4E |
| 03A8 | 43 | 03A9 | 01 |
| 03AA | A1 | 03AB | 64 |
| 03AC | 4E | 03AD | F0 |
| 03AE | B9 | 03AF | 53 |
| 03B0 | 85 | 03B1 | 76 |
| 03B2 | B6 | 03B3 | 51 |
| 03B4 | 96 | 03B5 | BB |
| 03B6 | 95 | 03B7 | C9 |
| 03B8 | F0 | 03B9 | 51 |
| 03BA | 83 | 03BB | 12 |
| 03BC | BA | 03BD | C9 |
| 03BE | F1 | 03BF | 19 |
| 03C0 | 12 | 03C1 | B6 |
| 03C2 | F1 | 03C3 | 32 |
| 03C4 | BA | 03C5 | C9 |
| 03C6 | F1 | 03C7 | 19 |
| 03C8 | 32 | 03C9 | B6 |
| 03CA | F1 | 03CB | 83 |
| 03DE | BD | 03DF | 07 |
| 03E0 | BE | 03E1 | 08 |
| 03E2 | BF | 03E3 | CA |
| 03E4 | 34 | 03E5 | D0 |
| 03E6 | BE | 03E7 | 29 |
| 03E8 | BF | 03E9 | 29 |
| 03EA | 34 | 03EB | FA |
| 03EC | F6 | 03ED | BA |
| 03EE | ED | 03EF | E6 |
| 03F0 | BE | 03F1 | 04 |
| 03F2 | BF | 03F3 | 3F |
| 03F4 | 34 | 03F5 | D0 |
| 03F6 | B8 | 03F7 | 4F |
| 03F8 | B6 | 03F9 | FB |
| 03FA | 18 | 03FB | F0 |
| 03FC | AD | 03FD | B8 |
| 03FE | 54 | 03FF | B6 |
| 0400 | 03 | 0401 | B8 |
| 0402 | 5C | 0403 | BC |
| 0404 | 08 | 0405 | F0 |
| 0406 | AA | 0407 | FA |
| 0408 | 77 | 0409 | AA |
| 040A | F2 | 040B | 12 |
| 040C | BE | 040D | 1B |
| 040E | BF | 040F | 29 |
| 0410 | 84 | 0411 | 16 |
| 0412 | BE | 0413 | 37 |
| 0414 | BF | 0415 | 29 |
| 0416 | 34 | 0417 | FA |
| 0418 | F6 | 0419 | 20 |
| 041A | EC | 041B | 07 |
| 041C | 18 | 041D | ED |
| 041E | 03 | 041F | 97 |
| 0420 | 83 | 0421 | D5 |
| 0422 | BF | 0423 | 83 |
| 0424 | 14 | 0425 | 07 |
| 0426 | BD | 0427 | 00 |
| 0428 | BE | 0429 | 00 |
| 042A | 25 | 042B | 93 |
| 042C | BB | 042D | 00 |
| 042E | 23 | 042F | 01 |
| 0430 | 50 | 0431 | 96 |
| 0432 | 6C | 0433 | 84 |
| 0434 | 3E | 0435 | 23 |
| 0436 | F1 | 0437 | 6B |
| 0438 | F6 | 0439 | 6E |
| 043A | 03 | 043B | 08 |
| 043C | F6 | 043D | 56 |
| 043E | FB | 043F | 03 |
| 0440 | 79 | 0441 | A3 |
| 0442 | 50 | 0443 | 96 |
| 0444 | 49 | 0445 | BB |
| 0446 | 07 | 0447 | 84 |
| 0448 | 56 | 0449 | 1B |
| 044A | FB | 044B | 72 |
| 044C | 55 | 044D | 03 |
| 044E | 71 | 044F | A3 |
| 0450 | 50 | 0451 | C6 |
| 0452 | 49 | 0453 | 84 |
| 0454 | 6C | 0455 | CB |
| 0456 | 18 | 0457 | FB |
| 0458 | 53 | 0459 | 07 |
| 045A | 03 | 045B | 79 |
| 045C | A3 | 045D | 50 |
| 045E | C6 | 045F | 6E |
| 0460 | 1B | 0461 | FB |
| 0462 | 92 | 0463 | 6E |
| 0464 | 53 | 0465 | 07 |
| 0466 | 03 | 0467 | 71 |
| 0468 | A3 | 0469 | 50 |
| 046A | C6 | 046B | 60 |
| 046C | 97 | 046D | 83 |
| 046E | 97 | 046F | A7 |
| 0470 | 83 | 0471 | 01 |
| 0472 | 02 | 0473 | 04 |
| 0474 | 08 | 0475 | 10 |

-continued

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---|---|---|---|
| 0476 | 20 | 0477 | 40 |
| 0478 | 80 | 0479 | FE |
| 047A | FC | 047B | F8 |
| 047C | F0 | 047D | E0 |
| 047E | C0 | 047F | 80 |
| 0480 | FF | 0481 | 72 |
| 0482 | 85 | 0483 | 84 |
| 0484 | 86 | 0485 | 18 |
| 0486 | 53 | 0487 | 07 |
| 0488 | 03 | 0489 | 71 |
| 048A | A3 | 048B | 83 |
| 048C | 94 | 048D | 81 |
| 048E | 40 | 048F | A0 |
| 0490 | 83 | 0491 | 94 |
| 0492 | 81 | 0493 | 37 |
| 0494 | 50 | 0495 | A0 |
| 0496 | 83 | 0497 | 53 |
| 0498 | 0C | 0499 | 77 |
| 049A | 77 | 049B | 03 |
| 049C | A4 | 049D | A3 |
| 049E | B6 | 049F | A1 |
| 04A0 | 47 | 04A1 | 02 |
| 04A2 | 05 | 04A3 | 83 |
| 04A4 | EF | 04A5 | DF |
| 04A6 | BF | 04A7 | 7F |
| 04A8 | 53 | 04A9 | 03 |
| 04AA | 03 | 04AB | B3 |
| 04AC | A3 | 04AD | ED |
| 04AE | B0 | 04AF | 77 |
| 04B0 | 39 | 04B1 | 1D |
| 04B2 | 83 | 04B3 | FD |
| 04B4 | F7 | 04B5 | DF |
| 04B6 | 7F | 04B7 | F4 |
| 04B8 | E9 | 04B9 | F0 |
| 04BA | 12 | 04BB | C0 |
| 04BC | 52 | 04BD | DB |
| 04BE | 84 | 04BF | 6E |
| 04C0 | 18 | 04C1 | F0 |
| 04C2 | 53 | 04C3 | 0F |
| 04C4 | AB | 04C5 | F0 |
| 04C6 | 47 | 04C7 | 53 |
| 04C8 | 0F | 04C9 | AC |
| 04CA | B8 | 04CB | 24 |
| 04CC | 23 | 04CD | 05 |
| 04CE | B6 | 04CF | D2 |
| 04D0 | 23 | 04D1 | 09 |
| 04D2 | A0 | 04D3 | B8 |
| 04D4 | 31 | 04D5 | B6 |
| 04D6 | D9 | 04D7 | B8 |
| 04D8 | 35 | 04D9 | 97 |
| 04DA | 83 | 04DB | 36 |
| 04DC | 01 | 04DD | 18 |
| 04DE | B0 | 04DF | 90 |
| 04E0 | B9 | 04E1 | 31 |
| 04E2 | B8 | 04E3 | 29 |
| 04E4 | B6 | 04E5 | EA |
| 04E6 | B9 | 04E7 | 35 |
| 04E8 | B8 | 04E9 | 2D |
| 04EA | 23 | 04EB | 04 |
| 04EC | 14 | 04ED | DC |
| 04EE | BB | 04EF | 00 |
| 04F0 | BC | 04F1 | 09 |
| 04F2 | 84 | 04F3 | CA |
| 0500 | B8 | 0501 | 24 |
| 0502 | F0 | 0503 | 12 |
| 0504 | 13 | 0505 | 85 |
| 0506 | 95 | 0507 | 94 |
| 0508 | B7 | 0509 | E6 |
| 050A | 1B | 050B | 76 |
| 050C | 12 | 050D | 85 |
| 050E | 94 | 050F | B7 |
| 0510 | E6 | 0511 | 1B |
| 0512 | 83 | 0513 | 85 |
| 0514 | 72 | 0515 | 17 |
| 0516 | 95 | 0517 | 94 |
| 0518 | B7 | 0519 | F6 |
| 051A | 7A | 051B | FC |

-continued

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---|---|---|---|
| 051C | AF | 051D | 72 |
| 051E | 2E | 051F | 14 |
| 0520 | 1A | 0521 | 23 |
| 0522 | 01 | 0523 | E7 |
| 0524 | EF | 0525 | 23 |
| 0526 | B9 | 0527 | 1D |
| 0528 | 37 | 0529 | 17 |
| 052A | 61 | 052B | F6 |
| 052C | 38 | 052D | 83 |
| 052E | FC | 052F | 53 |
| 0530 | 07 | 0531 | AC |
| 0532 | 94 | 0533 | 2C |
| 0534 | F6 | 0535 | 66 |
| 0536 | A4 | 0537 | 3C |
| 0538 | 94 | 0539 | 35 |
| 053A | F6 | 053B | 66 |
| 053C | 18 | 053D | 18 |
| 053E | BD | 053F | 00 |
| 0540 | 50 | 0541 | C6 |
| 0542 | 44 | 0543 | 1D |
| 0544 | B4 | 0545 | 8F |
| 0546 | FB | 0547 | 94 |
| 0548 | A8 | 0549 | FB |
| 054A | 94 | 054B | 97 |
| 054C | B8 | 054D | 20 |
| 054E | B6 | 054F | 52 |
| 0550 | B8 | 0551 | 22 |
| 0552 | FB | 0553 | ED |
| 0554 | 59 | 0555 | 94 |
| 0556 | 8C | 0557 | A4 |
| 0558 | 5B | 0559 | 94 |
| 055A | 91 | 055B | 94 |
| 055C | 21 | 055D | F4 |
| 055E | E9 | 055F | 18 |
| 0560 | F0 | 0561 | 53 |
| 0562 | 70 | 0563 | 6B |
| 0564 | A0 | 0565 | 83 |
| 0566 | B4 | 0567 | 8F |
| 0568 | FC | 0569 | 53 |
| 056A | 03 | 056B | 17 |
| 056C | 52 | 056D | 7A |
| 056E | 43 | 056F | 08 |
| 0570 | 47 | 0571 | F4 |
| 0572 | E9 | 0573 | 18 |
| 0574 | A0 | 0575 | 76 |
| 0576 | 65 | 0577 | 95 |
| 0578 | 84 | 0579 | B7 |
| 057A | F4 | 057B | E9 |
| 057C | F0 | 057D | 53 |
| 057E | 04 | 057F | A0 |
| 0580 | B8 | 0581 | 24 |
| 0582 | B0 | 0583 | 00 |
| 0584 | 14 | 0585 | F6 |
| 0586 | F1 | 0587 | 96 |
| 0588 | 75 | 0589 | BB |
| 058A | 04 | 058B | B4 |
| 058C | A4 | 058D | A4 |
| 058E | 75 | 058F | 15 |
| 0590 | 26 | 0591 | 97 |
| 0592 | D5 | 0593 | 28 |
| 0594 | 43 | 0595 | 04 |
| 0596 | 28 | 0597 | 34 |
| 0598 | E9 | 0599 | 93 |
| 059A | B8 | 059B | 64 |
| 059C | B0 | 059D | 27 |
| 059E | BA | 059F | 28 |
| 05A0 | 23 | 05A1 | 10 |
| 05A2 | C4 | 05A3 | E4 |
| 05A4 | BA | 05A5 | 2C |
| 05A6 | B8 | 05A7 | 18 |
| 05A8 | F0 | 05A9 | 37 |
| 05AA | 32 | 05AB | AE |
| 05AC | BA | 05AD | 60 |
| 05AE | B8 | 05AF | 20 |
| 05B0 | B6 | 05B1 | B4 |
| 05B2 | B8 | 05B3 | 22 |
| 05B4 | C4 | 05B5 | DA |

ENHANCED TRD RELAY MODULE ROM
CODE - VER 2.7 - GEC PROPRIETARY
ALL DATA VALUES ARE IN HEXADECIMAL FORMAT

| ADDRESS | DATA | ADDRESS | DATA |
|---------|------|---------|------|
| Ø5B6 | 14 | Ø5B7 | 25 |
| Ø5B8 | FB | Ø5B9 | 52 |
| Ø5BA | EB | Ø5BB | B8 |
| Ø5BC | 39 | Ø5BD | FØ |
| Ø5BE | 53 | Ø5BF | CØ |
| Ø5CØ | D3 | Ø5C1 | CØ |
| Ø5C2 | C6 | Ø5C3 | EB |
| Ø5C4 | BA | Ø5C5 | C8 |
| Ø5C6 | BB | Ø5C7 | 2Ø |
| Ø5C8 | BC | Ø5C9 | Ø1 |
| Ø5CA | BD | Ø5CB | Ø1 |
| Ø5CC | 54 | Ø5CD | BB |
| Ø5CE | 74 | Ø5CF | 92 |
| Ø5DØ | F6 | Ø5D1 | E5 |
| Ø5D2 | 46 | Ø5D3 | D8 |
| Ø5D4 | BB | Ø5D5 | ØF |
| Ø5D6 | EB | Ø5D7 | D6 |
| Ø5D8 | B8 | Ø5D9 | 3C |
| Ø5DA | FØ | Ø5DB | AC |
| Ø5DC | 18 | Ø5DD | FØ |
| Ø5DE | AD | Ø5DF | 54 |
| Ø5EØ | D3 | Ø5E1 | E6 |
| Ø5E2 | E5 | Ø5E3 | 54 |
| Ø5E4 | A8 | Ø5E5 | 14 |
| Ø5E6 | EA | Ø5E7 | B8 |
| Ø5E8 | 39 | Ø5E9 | C4 |
| Ø5EA | 29 | Ø5EB | C4 |
| Ø5EC | 9B | Ø5ED | 23 |
| Ø5EE | FF | Ø5EF | A4 |
| Ø5FØ | F3 | Ø5F1 | 23 |
| Ø5F2 | ØØ | Ø5F3 | AØ |
| Ø5F4 | 18 | Ø5F5 | EC |
| Ø5F6 | F3 | Ø5F7 | 83 |
| Ø6ØØ | B8 | Ø6Ø1 | 39 |
| Ø6Ø2 | FØ | Ø6Ø3 | 37 |
| Ø6Ø4 | 92 | Ø6Ø5 | 29 |
| Ø6Ø6 | 14 | Ø6Ø7 | FD |
| Ø6Ø8 | B9 | Ø6Ø9 | 4E |
| Ø6ØA | F1 | Ø6ØB | 37 |
| Ø6ØC | AF | Ø6ØD | B9 |
| Ø6ØE | 4A | Ø6ØF | FØ |
| Ø61Ø | 53 | Ø611 | CØ |
| Ø612 | C6 | Ø613 | 29 |
| Ø614 | 85 | Ø615 | F2 |
| Ø616 | 18 | Ø617 | 95 |
| Ø618 | FØ | Ø619 | 37 |
| Ø61A | B2 | Ø61B | 44 |
| Ø61C | FF | Ø61D | 52 |
| Ø61E | 29 | Ø61F | F1 |
| Ø62Ø | D3 | Ø621 | 1C |
| Ø622 | C6 | Ø623 | 85 |
| Ø624 | F1 | Ø625 | D3 |
| Ø626 | 8C | Ø627 | C6 |
| Ø628 | 2D | Ø629 | 23 |
| Ø62A | ØF | Ø62B | 44 |
| Ø62C | A9 | Ø62D | 19 |
| Ø62E | F1 | Ø62F | D3 |
| Ø63Ø | FØ | Ø631 | C6 |
| Ø632 | 6F | Ø633 | F1 |
| Ø634 | D3 | Ø635 | E1 |
| Ø636 | C6 | Ø637 | 73 |
| Ø638 | F1 | Ø639 | D3 |
| Ø63A | B4 | Ø63B | C6 |
| Ø63C | 7F | Ø63D | F1 |
| Ø63E | D3 | Ø63F | 69 |
| Ø64Ø | C6 | Ø641 | 7F |
| Ø642 | C4 | Ø643 | 29 |
| Ø644 | F1 | Ø645 | 77 |
| Ø646 | 77 | Ø647 | C6 |
| Ø648 | FE | Ø649 | Ø7 |
| Ø64A | C6 | Ø64B | 57 |
| Ø64C | Ø7 | Ø64D | C6 |
| Ø64E | 5B | Ø64F | Ø7 |
| Ø65Ø | C6 | Ø651 | 85 |
| Ø652 | Ø7 | Ø653 | C6 |
| Ø654 | 7B | Ø655 | C4 |
| Ø656 | 29 | Ø657 | BB |
| Ø658 | Ø1 | Ø659 | C4 |
| Ø65A | 5D | Ø65B | BB |
| Ø65C | Ø4 | Ø65D | 19 |
| Ø65E | F1 | Ø65F | C6 |
| Ø66Ø | D8 | Ø661 | Ø7 |
| Ø662 | C6 | Ø663 | DE |
| Ø664 | Ø7 | Ø665 | C6 |
| Ø666 | E8 | Ø667 | Ø7 |
| Ø668 | C6 | Ø669 | FC |
| Ø66A | Ø7 | Ø66B | 96 |
| Ø66C | 29 | Ø66D | A4 |
| Ø66E | A4 | Ø66F | 19 |
| Ø67Ø | F1 | Ø671 | C4 |
| Ø672 | 77 | Ø673 | 19 |
| Ø674 | F1 | Ø675 | 43 |
| Ø676 | 8Ø | Ø677 | Ø7 |
| Ø678 | AA | Ø679 | C4 |
| Ø67A | B6 | Ø67B | 19 |
| Ø67C | F1 | Ø67D | C4 |
| Ø67E | 78 | Ø67F | BB |
| Ø68Ø | 21 | Ø681 | BA |
| Ø682 | A9 | Ø683 | A4 |
| Ø684 | A6 | Ø685 | B8 |
| Ø686 | 18 | Ø687 | BØ |
| Ø688 | ØØ | Ø689 | D4 |
| Ø68A | AB | Ø68B | BC |
| Ø68C | Ø2 | Ø68D | B4 |
| Ø68E | ED | Ø68F | F1 |
| Ø69Ø | 43 | Ø691 | Ø4 |
| Ø692 | A1 | Ø693 | F8 |
| Ø694 | A9 | Ø695 | B8 |
| Ø696 | 4B | Ø697 | 23 |
| Ø698 | Ø2 | Ø699 | 14 |
| Ø69A | DC | Ø69B | 14 |
| Ø69C | EA | Ø69D | B8 |
| Ø69E | 39 | Ø69F | FØ |
| Ø6AØ | B6 | Ø6A1 | A6 |
| Ø6A2 | 53 | Ø6A3 | 7F |
| Ø6A4 | C4 | Ø6A5 | A8 |
| Ø6A6 | 53 | Ø6A7 | BF |
| Ø6A8 | AØ | Ø6A9 | C4 |
| Ø6AA | Ø8 | Ø6AB | B8 |
| Ø6AC | 29 | Ø6AD | B9 |
| Ø6AE | 25 | Ø6AF | B6 |
| Ø6BØ | B5 | Ø6B1 | B8 |
| Ø6B2 | 2D | Ø6B3 | B9 |
| Ø6B4 | 27 | Ø6B5 | 83 |
| Ø6B6 | D4 | Ø6B7 | AB |
| Ø6B8 | F1 | Ø6B9 | 52 |
| Ø6BA | C4 | Ø6BB | 43 |
| Ø6BC | Ø4 | Ø6BD | A1 |
| Ø6BE | BC | Ø6BF | Ø2 |
| Ø6CØ | B4 | Ø6C1 | F1 |
| Ø6C2 | C8 | Ø6C3 | C8 |
| Ø6C4 | FA | Ø6C5 | 94 |
| Ø6C6 | 8C | Ø6C7 | FA |
| Ø6C8 | B8 | Ø6C9 | 2B |
| Ø6CA | B6 | Ø6CB | CE |
| Ø6CC | B8 | Ø6CD | 2F |
| Ø6CE | F2 | Ø6CF | D4 |
| Ø6DØ | 94 | Ø6D1 | 91 |
| Ø6D2 | C4 | Ø6D3 | 9B |
| Ø6D4 | 94 | Ø6D5 | 8C |
| Ø6D6 | C4 | Ø6D7 | 9B |
| Ø6D8 | D4 | Ø6D9 | EE |
| Ø6DA | 23 | Ø6DB | 2Ø |
| Ø6DC | C4 | Ø6DD | E4 |
| Ø6DE | B8 | Ø6DF | 3A |
| Ø6EØ | BA | Ø6E1 | 2Ø |
| Ø6E2 | 23 | Ø6E3 | 4Ø |
| Ø6E4 | 4B | Ø6E5 | AB |
| Ø6E6 | A4 | Ø6E7 | B6 |
| Ø6E8 | B8 | Ø6E9 | 46 |
| Ø6EA | BA | Ø6EB | 24 |
| Ø6EC | C4 | Ø6ED | E2 |
| Ø6EE | BA | Ø6EF | 18 |
| Ø6FØ | B8 | Ø6F1 | 65 |

ENHANCED TRD RELAY MODULE ROM CODE - VER 2.7 - GEC PROPRIETARY
ALL DATA VALUES ARE IN HEXADECIMAL FORMAT

| ADDRESS | DATA | ADDRESS | DATA |
|---|---|---|---|
| 06F2 | B9 | 06F3 | 18 |
| 06F4 | F1 | 06F5 | A0 |
| 06F6 | C8 | 06F7 | B9 |
| 06F8 | 4E | 06F9 | F1 |
| 06FA | A0 | 06FB | 83 |
| 06FC | A4 | 06FD | 9A |
| 06FE | 24 | 06FF | D5 |
| 0700 | B1 | 0701 | 09 |
| 0702 | F0 | 0703 | 96 |
| 0704 | 32 | 0705 | B8 |
| 0706 | 20 | 0707 | F0 |
| 0708 | 96 | 0709 | 0E |
| 070A | 97 | 070B | A7 |
| 070C | E4 | 070D | 17 |
| 070E | 37 | 070F | 96 |
| 0710 | 0A | 0711 | 18 |
| 0712 | F0 | 0713 | 37 |
| 0714 | 96 | 0715 | 0A |
| 0716 | 97 | 0717 | F4 |
| 0718 | 5D | 0719 | B8 |
| 071A | 66 | 071B | BC |
| 071C | 64 | 071D | 36 |
| 071E | 5A | 071F | F4 |
| 0720 | A4 | 0721 | B0 |
| 0722 | 00 | 0723 | 97 |
| 0724 | F4 | 0725 | 5D |
| 0726 | B8 | 0727 | 66 |
| 0728 | F0 | 0729 | 53 |
| 072A | 60 | 072B | A0 |
| 072C | D3 | 072D | 60 |
| 072E | C6 | 072F | 5C |
| 0730 | 36 | 0731 | 5C |
| 0732 | B8 | 0733 | 66 |
| 0734 | F0 | 0735 | 53 |
| 0736 | 1F | 0737 | 17 |
| 0738 | AA | 0739 | 97 |
| 073A | F4 | 073B | 5F |
| 073C | B8 | 073D | 66 |
| 073E | F0 | 073F | 53 |
| 0740 | 1F | 0741 | D3 |
| 0742 | 0F | 0743 | 96 |
| 0744 | 4E | 0745 | 76 |
| 0746 | 52 | 0747 | F0 |
| 0748 | 17 | 0749 | A0 |
| 074A | F2 | 074B | 5C |
| 074C | E4 | 074D | 32 |
| 074E | D3 | 074F | 10 |
| 0750 | 96 | 0751 | 47 |
| 0752 | F0 | 0753 | F2 |
| 0754 | 5A | 0755 | 03 |
| 0756 | 20 | 0757 | A0 |
| 0758 | E4 | 0759 | 23 |
| 075A | B0 | 075B | 80 |
| 075C | 83 | 075D | BA |
| 075E | 00 | 075F | B8 |
| 0760 | 31 | 0761 | B9 |
| 0762 | 25 | 0763 | F4 |
| 0764 | 94 | 0765 | 76 |
| 0766 | 6D | 0767 | B8 |
| 0768 | 35 | 0769 | B9 |
| 076A | 27 | 076B | F4 |
| 076C | 94 | 076D | FA |
| 076E | C6 | 076F | 79 |
| 0770 | 07 | 0771 | B8 |
| 0772 | 37 | 0773 | 92 |
| 0774 | 77 | 0775 | B8 |
| 0776 | 33 | 0777 | 94 |
| 0778 | 8C | 0779 | 8C |
| 077A | B4 | 077B | 00 |
| 077C | BA | 077D | 30 |
| 077E | 76 | 077F | 87 |
| 0780 | B8 | 0781 | 28 |
| 0782 | F0 | 0783 | 5A |
| 0784 | DA | 0785 | 96 |
| 0786 | 79 | 0787 | B8 |
| 0788 | 26 | 0789 | F0 |
| 078A | 5A | 078B | DA |
| 078C | 96 | 078D | 79 |
| 078E | B8 | 078F | 24 |
| 0790 | BC | 0791 | 05 |
| 0792 | A4 | 0793 | F1 |
| 0794 | BC | 0795 | 02 |
| 0796 | B4 | 0797 | ED |
| 0798 | F6 | 0799 | 9B |
| 079A | 37 | 079B | A0 |
| 079C | 18 | 079D | A0 |
| 079E | B1 | 079F | 01 |
| 07A0 | 19 | 07A1 | B1 |
| 07A2 | A0 | 07A3 | 83 |
| 07A4 | BB | 07A5 | 64 |
| 07A6 | BA | 07A7 | A6 |
| 07A8 | 8C | 07A9 | EA |
| 07AA | A8 | 07AB | EB |
| 07AC | A6 | 07AD | EC |
| 07AE | A4 | 07AF | 83 |
| 07B0 | 35 | 07B1 | 27 |
| 07B2 | D7 | 07B3 | 34 |
| 07B4 | E9 | 07B5 | BC |
| 07B6 | 32 | 07B7 | 8C |
| 07B8 | EC | 07B9 | B7 |
| 07BA | 34 | 07BB | D5 |
| 07BC | B8 | 07BD | 66 |
| 07BE | B9 | 07BF | 18 |
| 07C0 | B1 | 07C1 | 01 |
| 07C2 | 36 | 07C3 | C6 |
| 07C4 | F4 | 07C5 | 00 |
| 07C6 | BC | 07C7 | FA |
| 07C8 | F4 | 07C9 | A4 |
| 07CA | B0 | 07CB | 00 |
| 07CC | 34 | 07CD | E9 |
| 07CE | D4 | 07CF | EE |
| 07D0 | BB | 07D1 | A1 |
| 07D2 | 85 | 07D3 | 95 |
| 07D4 | 14 | 07D5 | 25 |
| 07D6 | 27 | 07D7 | D7 |
| 07D8 | BA | 07D9 | 0A |
| 07DA | 8C | 07DB | EA |
| 07DC | DA | 07DD | 54 |
| 07DE | 1C | 07DF | D4 |
| 07E0 | 00 | 07E1 | 74 |
| 07E2 | 47 | 07E3 | B4 |
| 07E4 | 00 | 07E5 | 34 |
| 07E6 | 98 | 07E7 | E4 |
| 07E8 | D6 | 07E9 | B8 |
| 07EA | 25 | 07EB | B6 |
| 07EC | EF | 07ED | B8 |
| 07EE | 27 | 07EF | 83 |
| 07F0 | 28 | 07F1 | 43 |
| 07F2 | 29 | 07F3 | 20 |
| 07F4 | 47 | 07F5 | 45 |
| 07F6 | 20 | 07F7 | 31 |
| 07F8 | 39 | 07F9 | 38 |
| 07FA | 32 | | |

NOTE: ALL UNSPECIFIED ADDRESSES FROM 0 TO 7FFH ARE FILLED WITH DATA BYTE = 00.

What we claim is:

1. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for determining which relays are required to be state changed in order to bring about the requested load control state;

means, responsive to said determining means, for applying power in sequence to said relays to be state changed, with power being applied to each relay in sequence for a first duration of time, and after power has been applied once to each of said relays to be state changed, then again applying power in sequence to each of said relays to be state changed, each application of power being for a second duration of time greater than said first duration of time, said first duration of time being selected such that a substantial number of said relays to be state changed will respond to the initial application of power, allowing a user to perceive a substantially immediate response of the system to said data signal, the further application of power being for state changing relays not state changed by the first application of power thereto.

2. An improved transceiver device according to claim 1, wherein said power applying means comprises means for sequentially applying power to said relays to be state changed more than two complete cycles of a sequence, each cycle having a longer duration of time of applying power to each relay than the previous cycle.

3. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for determining which relays are required to be state changed in order to bring about the requested load control state;

means, responsive to said determining means, for actuating relays to achieved the load control state defined by said data signal;

means for resetting a transceiver device upon the occurrence of a particular condition, the relays under the control of a reset transceiver not necessarily being in a desired state as defined by a previous data signal to said reset transceiver; and means responsive to the occurrence of a reset, for annunciating to said central controller that a reset has taken place, so that the central controller can check the status of relays controlled by the reset transceiver and take corrective action if necessary.

4. An improved transceiver according to claim 3 wherein said particular condition is a power-up of said transceiver.

5. An improved transceiver according to claim 3 wherein said particular condition is a power loss to said transceiver.

6. An improved transceiver according to claim 5 wherein said power loss is a partial power loss.

7. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for identifying a particular three terminal, two coil relay to be state changed in order to bring about the requested load control state; and means, responsive to said determining means, for driving said identifying relay including means for sourcing current to a common terminal of said two coils and sinking current from one of said two coils, said driving means being organized in matrix form to selectively energize two of the three terminals of any relay controlled by said transceiver device.

8. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for determining which relays are required to be state changed in order to bring about the requested load control state;

means, responsive to said determining means, for applying power in sequence to said relays to be state changed; and power clamp limiting circuit means for monitoring power to said power applying means and limiting power thereto when the monitored power exceeds a predetermined level.

9. An improved transceiver device according to claim 8 further including means, responsive to a current limiting, for annunciating to the central controller via the data line that a current limiting function has been carried out.

10. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for determining which relays are required to be state changed in order to bring about the requested load control state;

means, responsive to said determining means, for applying power in sequence to said relays to be state changed; and power detecting circuit means for monitoring power to said power applying means and indicating when power is below a predetermined level thereby detecting a missing relay.

11. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for determining which relays are required to be state changed in order to bring about the requested load control state;

means, responsive to said determining means, for applying power in sequence to said relays to be state changed; and a watchdog reset circuit coupled to said microprocessor for monitoring the operation thereof, and providing a reset signal thereto in the event of a failure of proper operation thereof, said watchdog reset circuit being AC coupled to said microprocessor so that its operation is not defeated by a malfunction that would cause a DC condition in a signal resetting a watchdog timer of the watchdog reset circuit.

12. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for determining which relays are required to be state changed in order to bring about the requested load control state;

means, responsive to said determining means, for applying power in sequence to said relays to be state changed; and means for causing a brief period of intermittent operation of said relays to be state changed before they are permanently state changed to warn a user of an impending state change.

13. In a system for controlling distributed electrical loads including a central controller for providing a data signal defining the manner in which said loads are to be controlled; plural transceiver devices, each device being connected to control a subset of said loads by controlling relays in respective power circuits of said loads; and a single data line connecting said central controller with each transceiver device, and improved transceiver device, comprising:

means for receiving, from said data line, said data signal requesting that the transceiver device cause a particular load control state to exist;

means, responsive to said receiving means, for determining which relays are required to be state changed in order to bring about the requested load control state;

means, responsive to said determining means, for applying power in sequence to said relays to be state changed; and means for resetting said transceiver device to a state of predetermined conditions of relays associated therewith, said resetting means being operable in any one of the following three models;

all on or all off relays;

individual relay test wherein a particular relay can be manually state controlled; and automatically cycling wherein the relays are reset in a predetermined sequence, one after another.

* * * * *